US011167518B2

(12) United States Patent
O'Hagan et al.

(10) Patent No.: US 11,167,518 B2
(45) Date of Patent: Nov. 9, 2021

(54) SYSTEM FOR FORMING CONSTRUCTS THAT INCLUDE MICROWAVE INTERACTIVE MATERIAL

(71) Applicant: Graphic Packaging International, LLC, Atlanta, GA (US)

(72) Inventors: Brian R. O'Hagan, Appleton, WI (US); Laurence M. C. Lai, Mississauga (CA); Joseph Walsh, Boulder, CO (US); William Cox, West Bloomfield, MI (US); George Hackel, Appleton, WI (US); Neilson Zeng, North York (CA); Michael Shaw, Thornhill (CA); Timothy Henry Bohrer, Chicago, IL (US)

(73) Assignee: Graphic Packaging International, LLC, Atlanta, GA (US)

( * ) Notice: Subject to any disclaimer, the term of this patent is extended or adjusted under 35 U.S.C. 154(b) by 373 days.

(21) Appl. No.: 15/901,293

(22) Filed: Feb. 21, 2018

(65) Prior Publication Data
US 2018/0169989 A1    Jun. 21, 2018

Related U.S. Application Data

(62) Division of application No. 14/313,749, filed on Jun. 24, 2014, now Pat. No. 9,944,036, which is a division
(Continued)

(51) Int. Cl.
*B29C 51/10* (2006.01)
*B65D 81/34* (2006.01)
(Continued)

(52) U.S. Cl.
CPC .............. *B31B 50/26* (2017.08); *B23K 26/38* (2013.01); *B29C 51/10* (2013.01); *B29C 51/162* (2013.01);
(Continued)

(58) Field of Classification Search
CPC ....... B29C 51/12; B29C 51/24; B29C 51/162; B29C 51/32; B29C 51/167
See application file for complete search history.

(56) References Cited

U.S. PATENT DOCUMENTS 2,736,065 A * 2/1956 Wilcox ................. B65D 25/14
156/160
3,014,234 A * 12/1961 Koppehele ............. B29C 55/20
264/290.2
(Continued)

FOREIGN PATENT DOCUMENTS

DE    1 786 135    11/1971
DE    203 06 120    8/2003
(Continued)

OTHER PUBLICATIONS

Communication from the European Patent Office for corresponding European Patent Application No. 07752467.6; Filed Mar. 6, 2007; in re: Graphic Packaging International, Inc. entitled Container With Microwave Interactive Web.
(Continued)

*Primary Examiner* — Benjamin A Schiffman
(74) *Attorney, Agent, or Firm* — Womble Bond Dickinson (US) LLP

(57) ABSTRACT

A container that includes a microwave interactive web at least partially overlying and joined to a three-dimensional support, wherein the three-dimensional support may be formed prior to having the microwave interactive web mounted thereto. The three-dimensional support may be a preformed container that is sufficiently rigid and dimensionally stable for use in containing food.

23 Claims, 30 Drawing Sheets

Related U.S. Application Data of application No. 11/715,556, filed on Mar. 8, 2007, now Pat. No. 8,803,049.

(60) Provisional application No. 60/781,229, filed on Mar. 10, 2006, provisional application No. 60/834,402, filed on Jul. 31, 2006.

(51) Int. Cl.

| | |
|---|---|
| *B31B 50/26* | (2017.01) |
| *B29C 51/16* | (2006.01) |
| *B29C 65/76* | (2006.01) |
| *H05B 6/64* | (2006.01) |
| *B29C 65/00* | (2006.01) |
| *B23K 26/38* | (2014.01) |
| *B29C 51/20* | (2006.01) |
| *B31B 50/74* | (2017.01) |
| *B31B 50/59* | (2017.01) |
| *B31B 105/00* | (2017.01) |
| *B31B 120/40* | (2017.01) |
| *B29C 51/08* | (2006.01) |
| *B29C 51/22* | (2006.01) |
| *B29C 51/46* | (2006.01) |
| *B29C 65/48* | (2006.01) |
| *B29K 1/00* | (2006.01) |
| *B29K 67/00* | (2006.01) |
| *B29L 31/00* | (2006.01) |

(52) U.S. Cl.
CPC .............. *B29C 51/20* (2013.01); *B29C 65/76* (2013.01); *B29C 66/723* (2013.01); *B31B 50/74* (2017.08); *B65D 81/3453* (2013.01); *H05B 6/6494* (2013.01); *B29C 51/082* (2013.01); *B29C 51/22* (2013.01); *B29C 51/46* (2013.01); *B29C 65/48* (2013.01); *B29C 66/71* (2013.01); *B29C 66/72325* (2013.01); *B29C 66/72328* (2013.01); *B29C 66/72341* (2013.01); *B29C 66/72343* (2013.01); *B29C 2791/001* (2013.01); *B29C 2791/006* (2013.01); *B29K 2001/00* (2013.01); *B29K 2067/00* (2013.01); *B29L 2031/712* (2013.01); *B31B 50/592* (2018.05); *B31B 2105/00* (2017.08); *B31B 2120/406* (2017.08); *B31B 2120/407* (2017.08); *B65D 2581/344* (2013.01); *B65D 2581/3472* (2013.01); *B65D 2581/3477* (2013.01); *B65D 2581/3479* (2013.01); *B65D 2581/3493* (2013.01); *B65D 2581/3498* (2013.01); *Y10T 29/49826* (2015.01)

(56) References Cited

U.S. PATENT DOCUMENTS

| | | | |
|---|---|---|---|
| 3,302,632 A | 2/1967 | Fichtner | |
| 3,436,007 A | 4/1969 | Rausing | |
| 3,547,661 A | 12/1970 | Stevenson | |
| 3,697,369 A * | 10/1972 | Amberg et al. | B29C 51/06 428/513 |
| 3,779,447 A * | 12/1973 | Bemiss | B29C 33/10 229/117.35 |
| 3,865,301 A | 2/1975 | Pothier et al. | |
| 3,936,626 A | 2/1976 | Moore | |
| 4,013,798 A | 3/1977 | Goltsos | |
| 4,020,310 A | 4/1977 | Souder, Jr. et al. | |
| RE29,940 E * | 3/1979 | Knoell | B29C 51/162 425/504 |
| 4,257,530 A | 3/1981 | Faller | |
| 4,337,116 A * | 6/1982 | Foster | B29C 51/162 156/212 |
| 4,440,702 A * | 4/1984 | Susnjara | B29C 51/08 264/153 |
| 4,529,464 A * | 7/1985 | Jones | B29C 51/162 156/244.11 |
| 4,551,366 A * | 11/1985 | Maruhashi | B29C 51/162 229/123.1 |
| 4,574,174 A | 3/1986 | McGonigle | |
| 4,676,857 A | 6/1987 | Scharr et al. | |
| 4,775,771 A | 10/1988 | Pawlowski et al. | |
| 4,779,758 A * | 10/1988 | Chazal | B29C 51/162 229/5.84 |
| 4,865,921 A | 9/1989 | Hollenberg et al. | |
| 4,890,439 A | 1/1990 | Smart et al. | |
| 4,936,935 A | 6/1990 | Beckett | |
| 4,963,424 A | 10/1990 | Beckett | |
| 5,039,364 A | 8/1991 | Beckett et al. | |
| 5,043,130 A * | 8/1991 | Fujio | B29C 49/22 156/245 |
| 5,079,397 A * | 1/1992 | Keefer | B65D 81/3446 219/730 |
| 5,094,865 A | 3/1992 | Levinson | |
| 5,117,078 A | 5/1992 | Beckett | |
| 5,149,396 A | 9/1992 | Wilson | |
| 5,213,902 A | 5/1993 | Beckett | |
| 5,221,419 A | 6/1993 | Beckett | |
| 5,239,153 A | 8/1993 | Beckett | |
| 5,260,537 A | 11/1993 | Beckett | |
| 5,266,386 A | 11/1993 | Beckett | |
| 5,317,119 A | 5/1994 | Ayres | |
| RE34,683 E | 8/1994 | Maynard et al. | |
| 5,340,436 A | 8/1994 | Beckett | |
| 5,354,973 A | 10/1994 | Beckett | |
| 5,410,135 A | 4/1995 | Pollart et al. | |
| 5,424,517 A | 6/1995 | Habeger, Jr. et al. | |
| 5,519,195 A | 5/1996 | Keefer et al. | |
| 5,628,921 A | 5/1997 | Beckett | |
| 5,672,407 A | 9/1997 | Beckett | |
| 5,759,422 A | 6/1998 | Schmelzer et al. | |
| 5,800,724 A | 9/1998 | Habeger et al. | |
| 5,858,487 A | 1/1999 | Boehler et al. | |
| 5,864,123 A | 1/1999 | Keefer | |
| 5,910,268 A | 6/1999 | Keefer | |
| 6,114,679 A | 9/2000 | Lai et al. | |
| 6,150,646 A | 11/2000 | Lai et al. | |
| 6,204,492 B1 | 3/2001 | Zeng et al. | |
| 6,251,451 B1 | 6/2001 | Zeng | |
| 6,414,290 B1 | 7/2002 | Cole et al. | |
| 6,433,322 B2 | 8/2002 | Zeng et al. | |
| 6,455,827 B2 | 9/2002 | Zeng | |
| 6,552,315 B2 | 4/2003 | Zeng et al. | |
| 6,677,563 B2 | 1/2004 | Lai | |
| 6,717,121 B2 | 4/2004 | Zeng et al. | |
| 6,765,182 B2 | 7/2004 | Cole et al. | |
| 7,019,271 B2 | 3/2006 | Wriek et al. | |
| 8,696,854 B2 * | 4/2014 | van de Weijer | B29C 45/14811 156/212 |
| 8,803,049 B2 * | 8/2014 | O'Hagan | B29C 51/162 219/730 |
| 2004/0262322 A1 | 12/2004 | Middleton et al. | |
| 2005/0211387 A1* | 9/2005 | Suzuki | F26B 25/004 156/382 |
| 2006/0049190 A1 | 3/2006 | Middleton et al. | |
| 2006/0289521 A1 | 12/2006 | Bohme et al. | |
| 2006/0289522 A1 | 12/2006 | Middleton et al. | |
| 2007/0215611 A1 | 9/2007 | O'Hagan et al. | |

FOREIGN PATENT DOCUMENTS

| | | |
|---|---|---|
| EP | 0 317 203 A1 | 5/1989 |
| EP | 0 336 325 | 10/1989 |
| GB | 2 280 342 A | 1/1995 |
| JP | 63-116327 | 7/1963 |
| JP | 62-182032 | 8/1987 |
| JP | 2000-142825 | 5/2000 |
| JP | 2005-519819 | 7/2005 |
| WO | WO 91/11893 | 8/1991 |
| WO | WO 01/39968 | 6/2001 |
| WO | WO 03/043474 | 5/2003 |

(56) References Cited

FOREIGN PATENT DOCUMENTS

| WO | WO 03/066435 | 8/2003 |
|---|---|---|
| WO | WO 03/078012 | 9/2003 |
| WO | WO 2005/068321 A2 | 7/2005 |

OTHER PUBLICATIONS

English translation of Office Action dated Jul. 4, 2011 in corresponding Japanese Patent Application No. 2009-500384.
Office Action for U.S. Appl. No. 14/313,749 dated Mar. 21, 2017.
Response to Restriction Requirement for U.S. Appl. No. 14/313,749 dated Apr. 17, 2017.
Office Action for U.S. Appl. No. 14/313,749 dated May 16, 2017.
Amendment A and Response to Office Action for U.S. Appl. No. 14/313,749 dated Jun. 30, 2017.
Office Action for U.S. Appl. No. 14/313,749 dated Oct. 11, 2017.
Request for Continued Examination (RCE) Transmittal for U.S. Appl. No. 14/313,749 dated Nov. 21, 2017.
Amendment B and Response to Final Office Action for U.S. Appl. No. 14/313,749 dated Nov. 21, 2017.
Notice of Allowance and Fee(s) Due for U.S. Appl. No. 14/313,749 dated Dec. 21, 2017.
Issue Fee Transmittal Form for U.S. Appl. No. 14/313,749 dated Mar. 6, 2018.
Issue Notification for U.S. Appl. No. 14/313,749 dated Mar. 28, 2018.

* cited by examiner

SYSTEM FOR FORMING CONSTRUCTS THAT INCLUDE MICROWAVE INTERACTIVE MATERIAL

CROSS-REFERENCE TO RELATED APPLICATIONS

The present application is a divisional of U.S. patent application Ser. No. 14/313,749, filed Jun. 24, 2014, which is a divisional of U.S. patent application Ser. No. 11/715,556, filed Mar. 8, 2007, now U.S. Pat. No. 8,803,049, which claims the benefit of both U.S. Provisional Patent Application No. 60/781,229, filed Mar. 10, 2006, and U.S. Provisional Patent Application No. 60/834,402, filed Jul. 31, 2006.

INCORPORATION BY REFERENCE

The disclosures of U.S. patent application Ser. No. 14/313,749, filed Jun. 24, 2014, U.S. patent application Ser. No. 11/715,556, filed Mar. 8, 2007, U.S. Provisional Patent Application No. 60/781,229, filed Mar. 10, 2006, and U.S. Provisional Patent Application No. 60/834,402, filed Jul. 31, 2006, are hereby incorporated by reference for all purposes as if presented herein in its entirety.

BACKGROUND OF THE INVENTION

The present invention relates to constructs for heating, browning and/or crisping food items and, more specifically, relates to containers for heating, browning and/or crisping food items in microwave ovens.

Microwave ovens have become a principle form of heating food in a rapid and effective manner. A variety of containers for heating, browning and/or crisping food items in microwave ovens are known. For example, in a conventional manufacturing process, a microwave interactive web is positioned over a flat paperboard blank and laminated to the blank, and then the blank with the attached microwave interactive web is erected into a package. Such packages have been successfully commercialized. Nonetheless, there is a continuing need for containers that provide a new balance of properties and for improved methods of forming such containers.

BRIEF SUMMARY OF SOME ASPECTS OF THE INVENTION

One aspect of the present invention is the provision of a container that includes a microwave interactive web at least partially overlying and joined to a three-dimensional support, wherein the three-dimensional support may be formed prior to having the microwave interactive web mounted thereto. The three-dimensional support may be a preformed container that is sufficiently rigid and dimensionally stable for use in containing food. Accordingly and in accordance with one aspect of the present invention, the microwave interactive web is mounted to the preformed container so that the preformed container with the microwave interactive web can be used to contain a food item being heated in a microwave oven. The microwave energy interactive web typically includes a microwave interactive material, for example a metal, supported on a substrate, typically a polymer film. The microwave interactive material includes one or more features that interact with microwave energy to enhance or reduce the effects of the microwave energy on the food. For example, the feature may shield the food item, direct microwave energy to particular areas of the food item, and/or promote browning and/or crisping of the surface of the food item.

According to one aspect of the present invention, the preformed container may be formed of polymeric material and/or paperboard, or the like. More specifically, the preformed container can be a polymeric tray or bowl formed by injection molding or vacuum forming (e.g., vacuum thermal-forming), or a tray or bowl that includes paperboard panels (e.g., walls) that are held together by an injection-molded frame. In one particular example, the container may consist essentially of polymeric material, or even more specifically it may consist solely of polymeric material. Other types of preformed containers are also within the scope of the present invention.

In accordance with one aspect of the present invention, a construct includes a three-dimensional support (e.g., container) and a microwave interactive web mounted to the container, with the web including a plurality of pleats. The pleats may be positioned in and extend along an interior corner of the container. The interior corner of the container may be at least partially defined by a substantially smooth surface of the container, with the pleats extend across the substantially smooth surface.

The container may include a base and a plurality of side walls. The side walls may extend upwardly from the base and at least partially around a cavity of the container. The web may be positioned in the cavity so that it at least partially covers the base and/or at least one of the side walls. More specifically, the microwave interactive material of the web may at least partially cover the base and/or one or more of the side walls. The microwave interactive material of the web may extend at least partially around, or substantially all the way around, the cavity of the container. The web may include a peripheral edge that comprises a bead, and the bead may extend substantially all the way around the cavity of the container.

The container may include a plurality of compartments, with the web being in a first of the compartments. There may be a second microwave interactive web mounted in a second compartment of the container. The first and second webs may be distinct from one another.

One aspect of the present invention relates to a method of making a construct that includes microwave interactive material. The method may include providing a preformed container, and then mounting a microwave interactive web to the preformed container. In accordance with one aspect, the mounting of the web to the preformed container comprises mounting the web within the cavity of the preformed container.

The method may include cutting the web with a laser. This cutting may occur after the mounting of the web within the cavity of the container. In accordance with one aspect, the cutting of the web with the laser comprises directing a laser beam through an opening of the container.

In accordance with one aspect of the present invention, a method of making a container includes reconfiguring a microwave interactive web and mounting the web to a three-dimensional support (e.g., a preformed container) while the web extends at least partially around and at least partially defines a cavity. The reconfiguring of the web may include forming pleats in the web.

The method may further include heating at least a flap-like edge portion of the web to transform the flap-like edge portion of the web into a bead. This heating typically occurs after the mounting and prior to placing food in the container.

In accordance with one aspect of the present invention, a system may include a container transporting apparatus for serially moving containers (e.g., preformed containers) along a first path of travel, a web transporting apparatus for serially moving microwave interactive webs along a second path of travel so that the containers and microwave interactive webs are superposed with respect to one another in a serial fashion, and a mounting apparatus for respectively mounting the microwave interactive webs to the containers while they are in superposed arrangements with respect to one another. The mounting apparatus may include a forming tool for at least partially forming a cavity in a microwave interactive web that is being mounted to container.

The container transporting apparatus can be a conveyor including a plurality of receptacles configured for serially traveling along an endless path. The system may further include a supplying apparatus for respectively depositing the containers in the receptacles. The mounting apparatus may be positioned along the endless path so that the receptacles carry the containers, with the microwave interactive webs respectively mounted thereto, in a downstream direction along the endless path and away from the mounting apparatus. The system may further include a receiving apparatus that is positioned along the endless path at a position downstream from the mounting apparatus. The receiving apparatus may be for receiving the containers, with the microwave interactive webs respectively mounted thereto, from the receptacles.

As mentioned above, the preformed containers can be more generally referred to as "supports". In accordance with one aspect of the present invention, a system for forming containers includes a support transporting apparatus for serially supplying supports to an installing apparatus, and a web transporting apparatus for serially providing microwave interactive webs to the installing apparatus. The installing apparatus may be operative to serially combine the microwave interactive webs and the supports to form containers. Each of the containers may include a support supporting a microwave interactive web, with the microwave interactive web extending at least partially around and at least partially defining a cavity of the container. The installing apparatus may include a forming tool that extends at least partially into the cavity of the container to at least partially facilitate the mounting of the microwave interactive web to the support.

The support transporting apparatus may include at least one receptacle. The forming tool and the receptacle may be mounted with respect to one another so that there can be relative movement between the forming tool and the receptacle, so that the forming tool and the receptacle can be transitioned between an inserted configuration and a retracted configuration. The inserted configuration may be characterized by the forming tool being at least partially inserted into the cavity of the receptacle. The retracted configuration may be characterized by the forming tool being at least partially retracted from the cavity of the receptacle. The installing apparatus may include at least one actuator for causing relative movement between the forming tool and the receptacle to transition between the retracted and inserted configurations.

In accordance with one aspect of the present invention, a system for forming at least one container, which includes microwave interactive material, includes a holder for releasably holding at least one microwave interactive web, an apparatus (e.g., a receptacle) for supporting at least one support (e.g., preformed container), and a forming tool mounted for moving the microwave interactive web relative to the support to at least partially form the container, so that the forming tool extends at least partially into a cavity of the container. The holder is configured for at least tensioning the microwave interactive web while the forming tool moves the microwave interactive web relative to the support. The holder may define at least one gap for slidingly receiving the microwave interactive web. A distance extending across and perpendicular to the gap may be about the same as a thickness of the microwave interactive web. The gap may define an undulating shape, and the undulating shape may be suited for at least partially forming pleats in the microwave interactive web. The gap may be defined between a pair of dies. One of the pair of dies may be a somewhat plate-like female pleating die, and a second of the pair of dies may be a somewhat plate-like male pleating die.

Other aspects and advantages of the present invention will become apparent from the following.

BRIEF DESCRIPTION OF THE DRAWINGS

Having described some aspects of the invention in general terms, reference will now be made to the accompanying drawings that illustrate exemplary embodiments of the present invention and are not necessarily drawn to scale.

FIG. 14 is illustrative of how this microwave interactive web would appear, in isolation, while in the installing apparatus with the installing apparatus being in the configuration shown in FIG. 12.

DETAILED DESCRIPTION OF EXEMPLARY EMBODIMENTS

Figure 1:
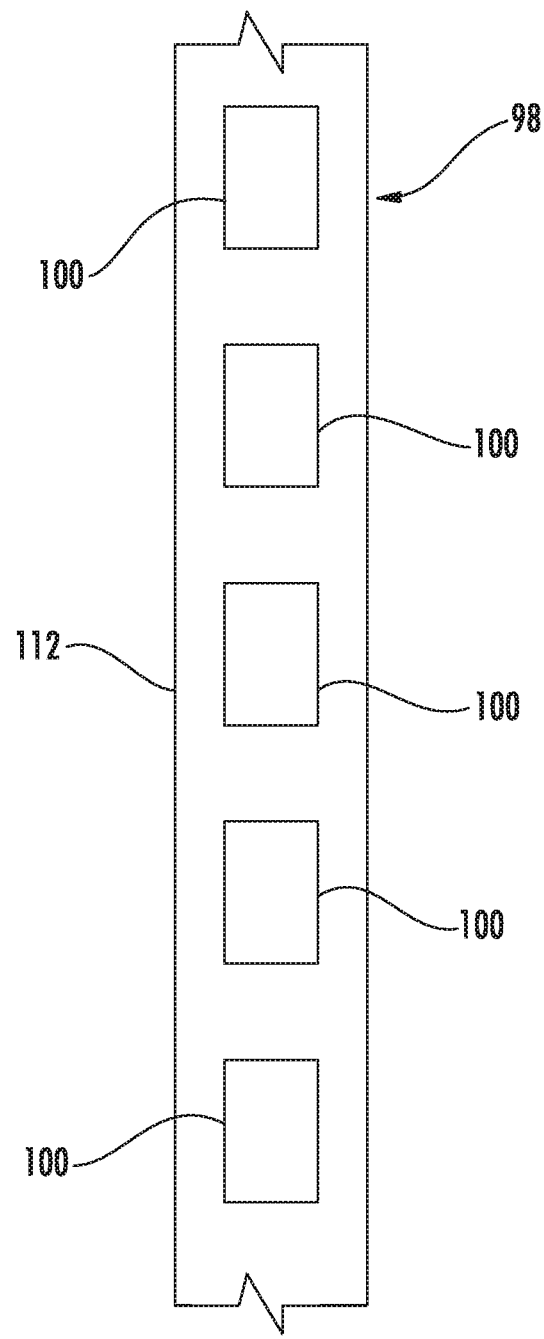
FIG. 1 is a schematic plan view of a piece of a composite web that includes a series of microwave interactive webs that can be cut from the composite web and be respectively mounted to structures such as, but not limited to, preformed containers, in accordance with exemplary embodiments of the present invention.
Figure 2:
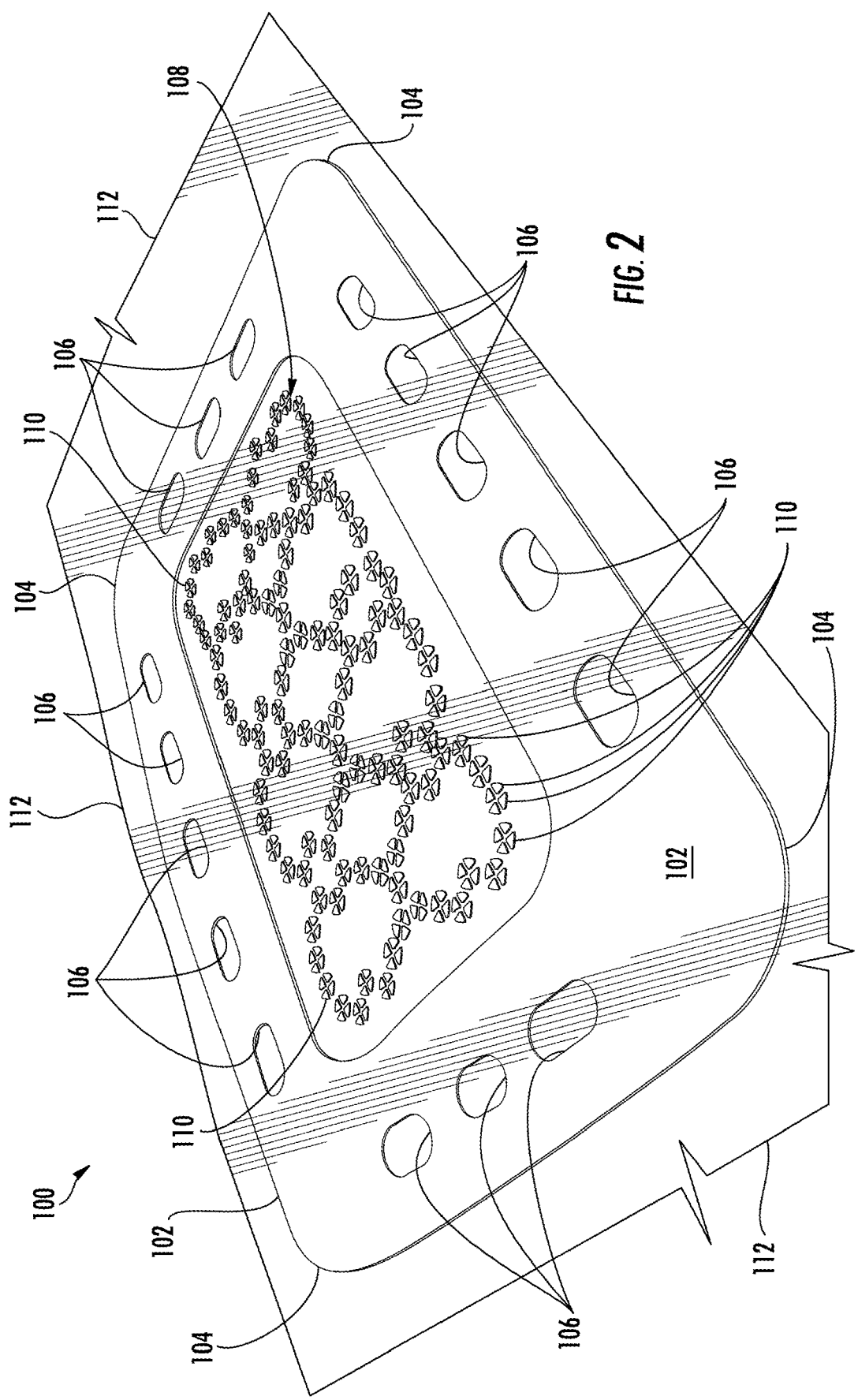
FIG. 2 is a perspective view of an example of a microwave interactive web of the composite web of FIG. 1.

Referring now in greater detail to the drawings, in which like numerals refer to like parts throughout the several views, FIG. 1 is a schematic plan view of a piece of a composite web 98 that includes a series of microwave energy interactive webs 100 (or simply "microwave interactive webs") that can be cut from the composite web 98 and be respectively mounted to supports, in accordance with exemplary embodiments of the present invention. FIG. 2 is a perspective view of an acceptable example of a microwave interactive web 100 of the composite web 98 of FIG. 1. The microwave interaction interactive web 100 of FIG. 2 can be representative of each of the microwave interactive webs 100 of the composite web 98. As shown in FIG. 2, the microwave interactive web 100 is substantially flat.

Figure 3:
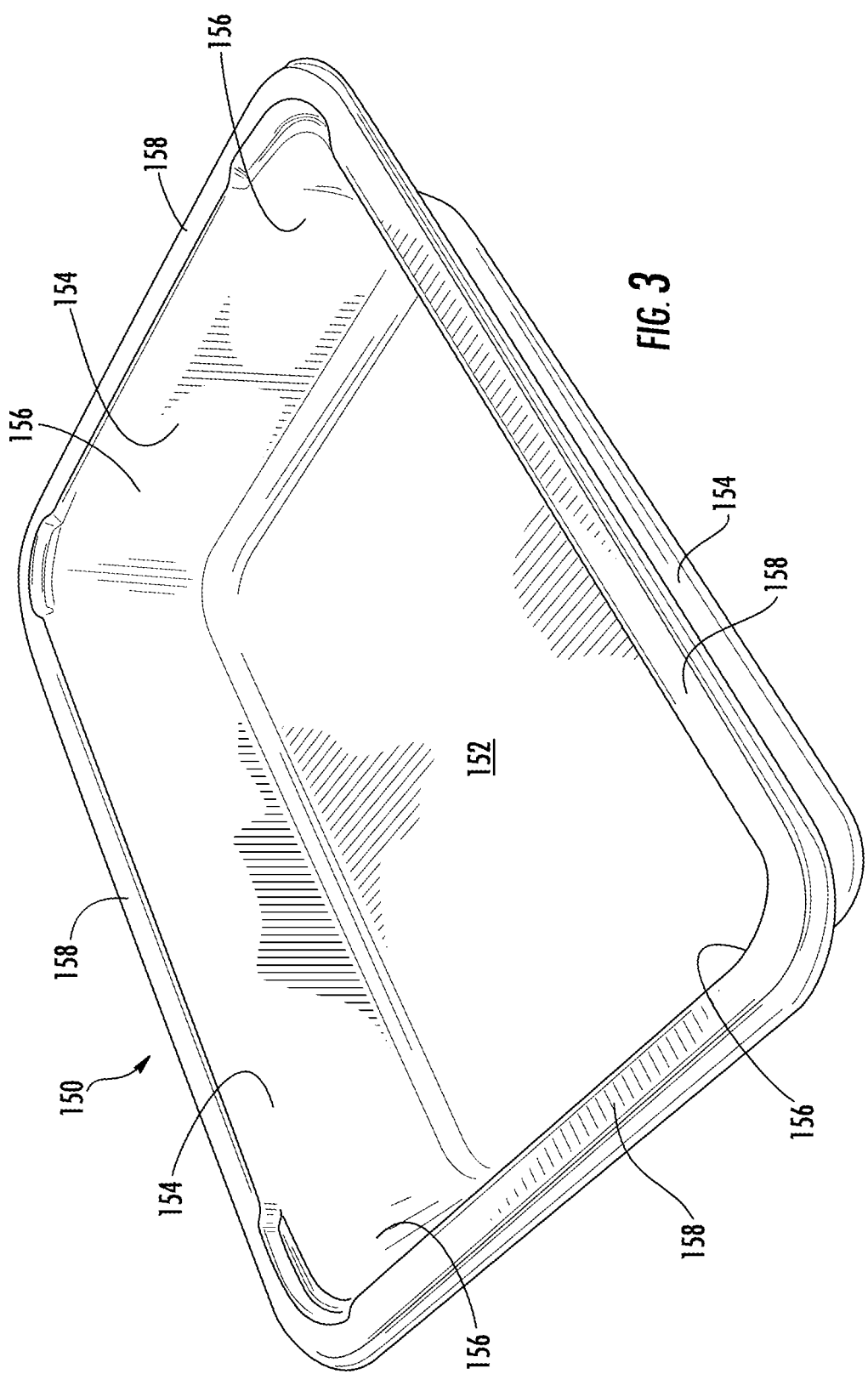
FIG. 3 is a perspective view of a conventional, polymeric, preformed container to which the microwave interactive web of FIG. 2 can be mounted, in accordance with a first exemplary embodiment of the present invention.

Referring to FIG. 2 in greater detail and in accordance with one example of a first exemplary embodiment of the present invention, the microwave interactive web 100 can be mounted to a conventional preformed container 150 (FIG. 3). The microwave interactive web 100 shown in FIG. 2 includes a first microwave interactive element 102 comprising a metal foil band including somewhat rounded corners 104 and obround apertures 106 in a spaced apart configuration. In accordance with the first embodiment, as used herein, the term "obround" refers to a shape substantially consisting of two semicircles connected by parallel lines tangent to their endpoints. The microwave interactive web 100 also includes a second microwave interactive element 108 comprising microwave interactive foil segments 110 arranged in clusters in a lattice-like configuration. Only a few of the foil segments 110 are identified by their reference numeral in FIG. 2. The first microwave interactive element 102 is spaced from and forms a border around the second microwave interactive element 108. The first microwave interactive element 102 and the second microwave interactive element 108 are supported on a polymer film substrate 112. Referring back to FIG. 1, the polymer film substrate 112 extends between the opposite ends of the composite web 98.

Although a particular microwave interactive web 100 with first and second microwave interactive elements 102, 108 is shown and described with reference to FIGS. 1 and 2, each of the exemplary embodiments of the present invention can incorporate a wide variety of microwave interactive webs (e.g., the microwave interactive web 100 of FIG. 2) that include features that alter the effect of microwave energy during heating or cooking of a food item. For example, the microwave interactive webs of the exemplary embodiments may be formed at least partially from one or more microwave energy interactive elements (hereinafter referred to as "microwave interactive elements") (e.g., see the microwave interactive elements 102, 108 of FIG. 2) that promote browning and/or crisping of a particular area of the food item, shield a particular area of the food item from microwave energy to prevent overcooking thereof, or transmit microwave energy towards or away from a particular area of the food item. Each microwave interactive element comprises one or more microwave energy interactive materials or segments arranged in a particular configuration to absorb microwave energy, transmit microwave energy, reflect microwave energy, or direct microwave energy, as needed or desired for a particular microwave heating container and food item. The microwave interactive element may be supported on a microwave inactive or transparent substrate (e.g., see the polymer film substrate 112 of FIGS. 1 and 2) for ease of handling and/or to prevent contact between the microwave interactive material and the food item. As a matter of convenience and not limitation, and although it is understood that a microwave interactive element supported on a microwave transparent substrate includes both microwave interactive and microwave inactive elements or components, such constructs are referred to herein as "microwave interactive webs".

The microwave energy interactive material may be an electroconductive or semiconductive material, for example, a metal or a metal alloy provided as a metal foil; a vacuum deposited metal or metal alloy; or a metallic ink, an organic ink, an inorganic ink, a metallic paste, an organic paste, an inorganic paste, or any combination thereof. Examples of metals and metal alloys that may be suitable for use with the present invention include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide. Examples of metal oxides that may be suitable for use with the present invention include, but are not limited to, oxides of aluminum, iron, and tin, used in conjunction with an electrically conductive material where needed. Another example of a metal oxide that may be suitable for use with the present invention is indium tin oxide (ITO). ITO can be used as a microwave energy interactive material to provide a heating effect, a shielding effect, a browning and/or crisping effect, or a combination thereof. For example, to form a susceptor, ITO may be sputtered onto a clear polymer film. The sputtering process typically occurs at a lower temperature than the evaporative deposition process used for metal deposition. ITO has a more uniform crystal structure and, therefore, is clear at most coating thicknesses. Additionally, ITO can be used for either heating or field management effects. ITO also may have fewer defects than metals, thereby making thick coatings of ITO more suitable for field management than thick coatings of metals, such as aluminum.

Alternatively, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

In one example, the microwave interactive element may comprise a thin layer of microwave interactive material that tends to absorb microwave energy, thereby generating heat at the interface with a food item. Such elements often are used to promote browning and/or crisping of the surface of a food item (sometimes referred to as a "browning and/or crisping element"). When supported on a film or other substrate, such an element may be referred to as a "susceptor" or "susceptor film".

As another example, the microwave interactive element may comprise a foil having a thickness sufficient to shield one or more selected portions of the food item from microwave energy (sometimes referred to as a "shielding element"). Such shielding elements may be used where the food item is prone to scorching or drying out during heating.

The shielding element may be formed from various materials and may have various configurations, depending on the particular application for which the shielding element is used. Typically, the shielding element is formed from a conductive, reflective metal or metal alloy, for example, aluminum, copper, or stainless steel. The shielding element generally may have a thickness of from about 0.000285 inches to about 0.05 inches. In one aspect, the shielding element has a thickness of from about 0.0003 inches to about 0.03 inches. In another aspect, the shielding element has a thickness of from about 0.00035 inches to about 0.020 inches, for example, 0.016 inches.

As still another example, the microwave interactive element may comprise a segmented foil, such as, but not limited to, those described in U.S. Pat. Nos. 6,204,492, 6,433,322, 6,552,315, and 6,677,563, each of which is incorporated by reference in its entirety. Although segmented foils are not continuous, appropriately spaced groupings of such segments often act as a transmitting element to direct microwave energy to specific areas of the food item. Such foils also may be used in combination with browning and/or crisping elements, for example, susceptors.

Any of the numerous microwave interactive elements described herein or contemplated hereby may be substantially continuous, that is, without substantial breaks or interruptions, or may be discontinuous, for example, by including one or more breaks or apertures that transmit microwave energy therethrough. The breaks or apertures may be sized and positioned to heat particular areas of the food item selectively. The number, shape, size, and positioning of such breaks or apertures may vary for a particular application depending on type of container being formed, the food item to be heated therein or thereon, the desired degree of shielding, browning, and/or crisping, whether direct exposure to microwave energy is needed or desired to attain uniform heating of the food item, the need for regulating the change in temperature of the food item through direct heating, and whether and to what extent there is a need for venting.

The aperture may be a physical aperture or void in the material used to form the container, or may be a non-physical "aperture". A non-physical aperture may be a portion of the container that is microwave energy inactive by deactivation, removal, or otherwise, or one that is otherwise transparent to microwave energy. Thus, for example, where a microwave energy interactive material is used to form at least a portion of the container, the aperture may be a portion of the container formed without a microwave energy active material or, alternatively, may be a portion of the container formed with a microwave energy active material that has been deactivated or removed. While both physical and non-physical apertures allow the food item to be heated directly by the microwave energy, a physical aperture may also provide a venting function to allow steam or other vapors to escape from the interior of the container.

As stated above, any of the above elements and numerous others contemplated hereby may be supported on a substrate. The substrate typically comprises an electrical insulator, for example, a polymer film. The thickness of the film may typically be from about 35 gauge to about 10 mil. In one aspect, the thickness of the film is from about 40 gauge to about 80 gauge. In another aspect, the thickness of the film is from about 45 to about 50 gauge. In still another aspect, the thickness of the film is about 48 gauge. Examples of polymer films that may be suitable include, but are not limited to, polyolefins, polyesters, polyamides, polyimides, polysulfones, polyether ketones, cellophanes, or any combination thereof. Other non-conducting substrate materials such as paper and paper laminates, metal oxides, silicates, cellulosics, or any combination thereof, also may be used.

In one aspect, the polymer film may comprise polyethylene terephthalate. Examples of polyethylene terephthalate films that may be suitable for use as the substrate include, but are not limited to, MELINEX®, commercially available from DuPont Teijan Films (Hopewell, Va.), and SKYROL, commercially available from SKC, Inc. (Covington, Ga.). Polyethylene terephthalate films are used in commercially available susceptors, for example, the QWIKWAVE® Focus susceptor and the MICRORITE® susceptor, both available from Graphic Packaging International, Inc. (Marietta, Ga.).

In another aspect, the polymer film may be selected to provide a water barrier, oxygen barrier, or a combination thereof. Such barrier film layers may be formed from a polymer film having barrier properties or from any other barrier layer or coating as desired. Suitable polymer films may include, but are not limited to, ethylene vinyl alcohol, barrier nylon, polyvinylidene chloride, barrier fluoropolymer, nylon 6, nylon 6,6, coextruded nylon 6/EVOH/nylon 6, silicon oxide coated film, or any combination thereof.

One example of a barrier film that may be suitable for use with the present invention is CAPRAN® EMBLEM 1200M nylon 6, commercially available from Honeywell International (Pottsville, Pa.). Another example of a barrier film that may be suitable is CAPRAN® OXYSHIELD OBS monoaxially oriented coextruded nylon 6/ethylene vinyl alcohol (EVOH)/nylon 6, also commercially available from Honeywell International. Yet another example of a barrier film that may be suitable for use with the present invention is DARTEK® N-201 nylon 6,6, commercially available from Enhance Packaging Technologies (Webster, N.Y.).

Still other barrier films include silicon oxide coated films, such as those available from Sheldahl Films (Northfield, Minn.). Thus, in one example, a susceptor may have a structure including a film, for example, polyethylene terephthalate, with a layer of silicon oxide coated onto the film, and ITO or other material deposited over the silicon oxide. If needed or desired, additional layers or coatings may be provided to shield the individual layers from damage during processing.

The barrier film may have an oxygen transmission rate (OTR) as measured using ASTM D3985 of less than about 20 cc/m2/day. In one aspect, the barrier film has an OTR of less than about 10 cc/m2/day. In another aspect, the barrier film has an OTR of less than about 1 cc/m2/day. In still another aspect, the barrier film has an OTR of less than about 0.5 cc/m2/day. In yet another aspect, the barrier film has an OTR of less than about 0.1 cc/m2/day.

The barrier film may have a water vapor transmission rate (WVTR) as measuring using ASTM F1249 of less than about 100 g/m2/day. In one aspect, the barrier film has a WVTR of less than about 50 g/m2/day. In another aspect, the barrier film has a WVTR of less than about 15 g/m2/day. In yet another aspect, the barrier film has a WVTR of less than about 1 g/m2/day. In still another aspect, the barrier film has a WVTR of less than about 0.1 g/m2/day. In a still further aspect, the barrier film has a WVTR of less than about 0.05 g/m2/day.

The microwave energy interactive material may be applied to the substrate (e.g., polymer film substrate 112 of FIGS. 1 and 2) in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food item.

For example, the microwave energy interactive material may be provided as a continuous or discontinuous layer or coating including circles, loops, hexagons, islands, squares, rectangles, octagons, and so forth. Examples of various patterns and methods that may be suitable for use with the present invention are provided in U.S. Pat. Nos. 6,765,182; 6,717,121; 6,677,563; 6,552,315; 6,455,827; 6,433,322; 6,414,290; 6,251,451; 6,204,492; 6,150,646; 6,114,679; 5,800,724; 5,759,422; 5,672,407; 5,628,921; 5,519,195; 5,424,517; 5,410,135; 5,354,973; 5,340,436; 5,266,386; 5,260,537; 5,221,419; 5,213,902; 5,117,078; 5,039,364; 4,963,424; 4,936,935; 4,890,439; 4,775,771; 4,865,921; and Re. 34,683, each of which is incorporated by reference herein in its entirety. Although particular examples of patterns of microwave energy interactive material are shown and described herein, it should be understood that other patterns of microwave energy interactive material are contemplated by the present invention.

In the exemplary microwave interactive web 100 schematically shown in FIG. 2, the microwave interactive elements 102 and 108 typically have a grey or silver color and are visually distinguishable from the transparent, colorless polymer film substrate 112. However, in some instances, it may be desirable to provide a microwave interactive web having a uniform color and/or appearance. Such a microwave interactive web may be more aesthetically pleasing to a consumer, particularly when the consumer is accustomed to containers having certain visual attributes, for example, a solid color, a particular pattern, and so on. Thus, for example, the present invention contemplates using a silver or grey toned adhesive to join the microwave interactive elements to the substrate, using a silver or grey toned substrate to mask the presence of the silver or grey toned microwave interactive elements, using a dark toned substrate, for example, a black toned substrate, to conceal the presence of the silver or grey toned microwave interactive elements, overprinting the metallized side of the microwave interactive web with a silver or grey toned ink to obscure the color variation, printing the non-metallized side of the microwave interactive web with a silver or grey ink or other concealing color in a suitable pattern or as a solid color layer to mask or conceal the presence of the microwave interactive elements, or any other suitable technique or combination thereof.

In accordance with the exemplary embodiments of the present invention and very generally described, the microwave interactive element or microwave interactive web (e.g., the microwave interactive web 100 of FIG. 2) is mounted to a three-dimensional support (e.g., the preformed container 150 of FIG. 3) that is typically dimensionally stable and microwave energy transparent. Various materials may be used to form the support (e.g., the preformed container 150 of FIG. 3). The support, like the microwave interactive web, will typically be constructed from materials that are resistant to softening, scorching, combusting, or degrading at typical microwave oven heating temperatures, for example, at about 250° F. These items may also be constructed from materials that are resistant to softening, scorching, combusting, or degrading at typical conventional oven heating temperatures, for example, from about 450° F. to about 550° F. For example, the support may be formed at least partially from a polymer or polymeric material. As used herein the term "polymer" or "polymeric material" includes, but is not limited to, homopolymers, copolymers, such as for example, block, graft, random, and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic, and random symmetries. One polymer that may be suitable for use with the present invention is polycarbonate. Other examples of polymers that may be suitable for use with the present invention include, but are not limited to, polyolefins, e.g. polyethylene, polypropylene, polybutylene, and copolymers thereof; polytetrafluoroethylene; polyesters, e.g. polyethylene terephthalate, e.g., coextruded polyethylene terephthalate; vinyl polymers, e.g., polyvinyl chloride, polyvinyl alcohol, ethylene vinyl alcohol, polyvinylidene chloride, polyvinyl acetate, polyvinyl chloride acetate, polyvinyl butyral; acrylic resins, e.g. polyacrylate, polymethylacrylate, and polymethylmethacrylate; polyamides, e.g., nylon 6,6; polystyrenes; polyurethanes; cellulosic resins, e.g., cellulosic nitrate, cellulosic acetate, cellulosic acetate butyrate, ethyl cellulose; copolymers of any of the above materials; or any blend or combination thereof.

Alternatively, all or a portion of the support (e.g., the preformed container 150 of FIG. 3) may be formed at least partially from a paper or paperboard material, which may be cut into a blank prior to use in the container. In one aspect, the support is formed from paper generally having a basis weight of from about 15 to about 60 lbs/ream (i.e., lbs/3,000 ft$^2$), for example, from about 20 to about 40 lbs/ream. In one particular example, the paper has a basis weight of about 25 lbs/ream. In another aspect, the support is formed from paperboard having a basis weight of from about 60 to about 330 lbs/ream, for example, from about 80 to about 140 lbs/ream. The paperboard generally may have a thickness of from about 6 to about 30 mils, for example, from about 12 to about 28 mils. In one particular example, the paperboard has a thickness of about 12 mils. Any suitable paperboard may be used, for example, a solid bleached or solid unbleached sulfate board, such as SUS® board, commercially available from Graphic Packaging International, Inc. If needed or desired, one or more portions of the support may be laminated to or coated with one or more different or similar sheet-like materials at selected panels (e.g. walls) or panel sections.

Optionally, one or more panels (e.g., walls) of the various blanks, supports, or containers described herein or contemplated hereby may be coated with varnish, clay, or other materials, either alone or in combination. The coating may then be printed over with product advertising or other information or images. The blanks, supports, or containers also may be coated to protect any information printed thereon.

Furthermore, the blanks, supports, or containers may be coated with, for example, a moisture and/or oxygen barrier layer, on either or both sides, such as those described above. Any suitable moisture and/or oxygen barrier material may be used in accordance with the present invention. Examples of materials that may be suitable include, but are not limited to, polyvinylidene chloride, ethylene vinyl alcohol, and DuPont DARTEK™ nylon 6,6.

Alternatively or additionally, any of the blanks, supports, or containers of the present invention may be coated or laminated with other materials to impart other properties, such as absorbency, repellency, opacity, color, printability, stiffness, or cushioning. For example, absorbent susceptors are described in U.S. Provisional Application No. 60/604,637, filed Aug. 25, 2004, and U.S. patent application Ser. No. 11/211,858, to Middleton, et al., titled "Absorbent Microwave Interactive Packaging", filed Aug. 25, 2005, both of which are incorporated herein by reference in their entirety. Additionally, the blanks, supports, or containers may include graphics or indicia printed thereon.

In accordance with several versions of the first embodiment, the microwave interactive webs are respectively mounted to preformed supports (e.g., three-dimensional supports) that can more specifically be referred to as preformed containers, and even more specifically they can be conventional, polymeric, preformed containers 150. FIG. 3 is an isolated perspective view of a conventional, polymeric, preformed container 150 to which the microwave interactive web of FIG. 2 can be mounted, in accordance with one version of the first embodiment. As shown in FIG. 3, the preformed container 150 is substantially rectangular in shape (e.g., is tray-shaped) and includes a food-supporting panel or base 152, upstanding walls 154 and somewhat rounded corners 156 that together extend around the cavity of the preformed container, and a flange 158 that protrudes outwardly from the upper edges of the walls. The walls 154 and corners 156 extend upwardly/obliquely/outwardly from the base 152. That is, typically, the outer walls 154 are inclined outwardly so that a series of the preformed containers 150 can be arranged in a nested stack. However, the containers (e.g., preformed containers 150) described herein or contemplated hereby may have any shape as desired, for example, a partial sphere or bowl, polygon, circle, oval, cylinder, prism, sphere, polyhedron, ellipsoid, or any other regular or irregular shape. As an additional example, and as will be discussed in greater detail below, the containers (e.g., preformed containers 150) described herein or contemplated hereby may include one or more interior walls or dividers that separate food items or multiple servings of a particular food item.

One specific example of the preformed container 150 is a tray that is made from a polyester material, for example, polyethylene terephthalate, (e.g., one hundred percent polyester material by weight) through the use of a vacuum thermal-formed process. Nonetheless and as mentioned above, a wide variety of preformed containers are within the scope of the present invention. For example and for each of the examples and/or versions of the first embodiment of the present invention, the preformed container 150 constructed substantially solely of polymeric material can be replaced with a support comprising a frame that is injection molded onto a group of panels (e.g., with the panels (e.g., walls) comprising paperboard, or the like) to form a container, namely a bowl or tray in which the panels extend at least partially around, and at least partially define, a cavity of the container. In this regard, incorporated herein by reference is the entire disclosure of a U.S. patent application that: is entitled "Injection-Molded Composite Construct"; is being filed on the same day, or at least about the same day, as the present application; claims the benefit of the same U.S. provisional patent applications as the present application, and as originally filed names as inventors Brian O'Hagan, Peter Blaas, Scott Middleton, Kevin Hjort and Bruce Barnard. Throughout the Detailed Description section of this disclosure, the preformed container 150 can be replaced with any of the containers disclosed by the patent application that is incorporated by reference in the immediately preceding sentence.

In accordance with an exemplary method of the first embodiment of the present invention, the microwave interactive webs 100 (FIGS. 1 and 2) are cut from the composite web 98 and respectively mounted to multiple of the preformed containers 150 in a serial fashion to create composite containers, as will be discussed in greater detail below beginning with reference to FIG. 10. A wide variety of microwave interactive webs, preformed containers and composite containers are within the scope of the present invention. Therefore, and for example, a few examples of the wide variety of the composite containers of the first embodiment of the present invention are discussed in the following with reference to FIGS. 4-9.

Figure 4:
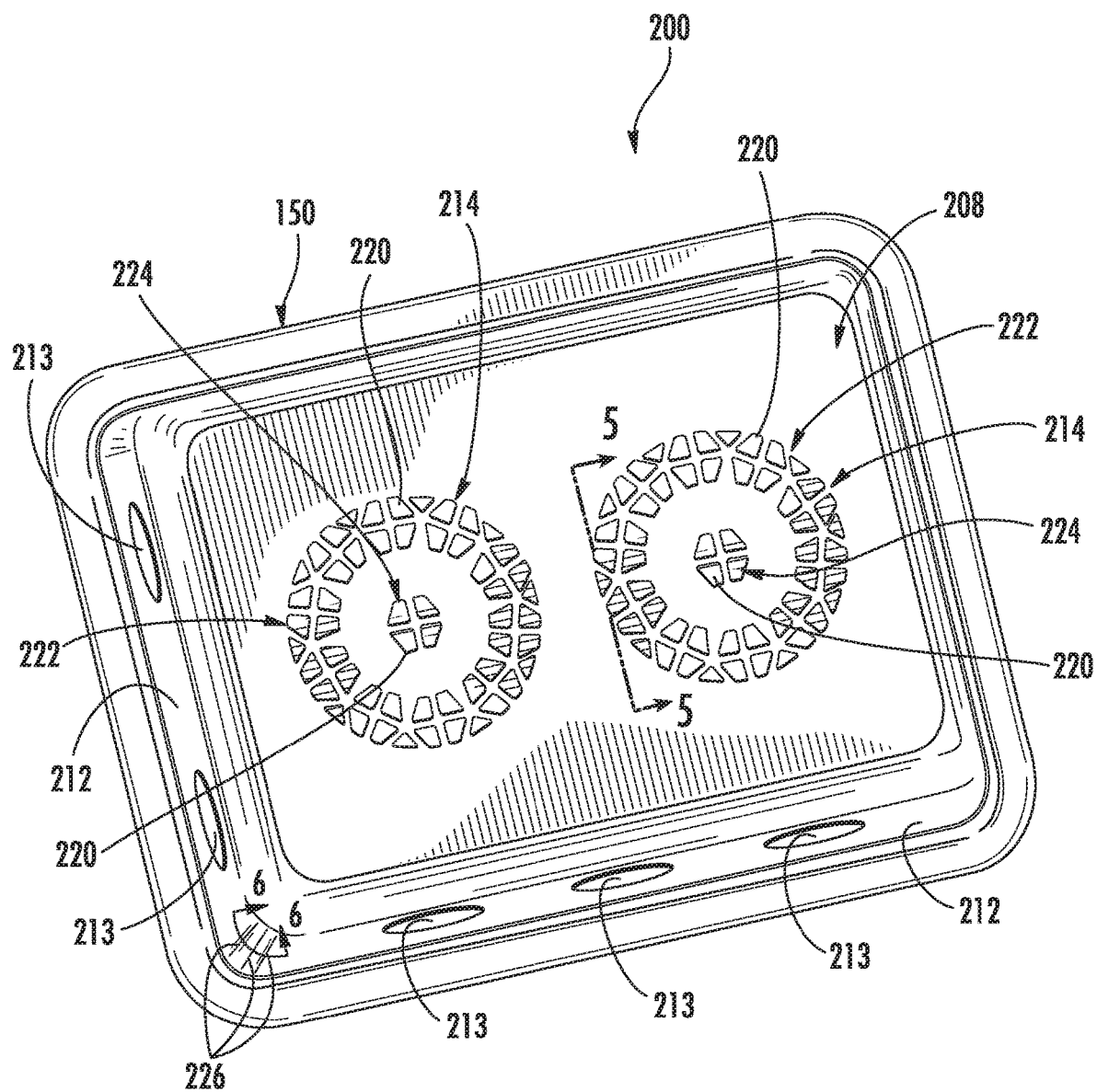
FIG. 4 is a schematic, perspective view of a composite container, namely a microwave interactive web mounted to the preformed container of FIG. 3, in accordance with a first version of the first exemplary embodiment of the present invention.

FIG. 4 is a schematic, perspective view of a composite container 200 comprising a microwave interactive web 208 mounted to a preformed three-dimensional support that is in the form of a container, or more specifically in the form of the preformed container 150 (also see FIG. 3), in accordance with a first version of the first embodiment of the present invention. More specifically, the microwave interactive web 208 is at least partially overlying and joined to the preformed container 150. The preformed container 150 can be more generally referred to as a dimensionally stable microwave inactive support.

Figure 5:
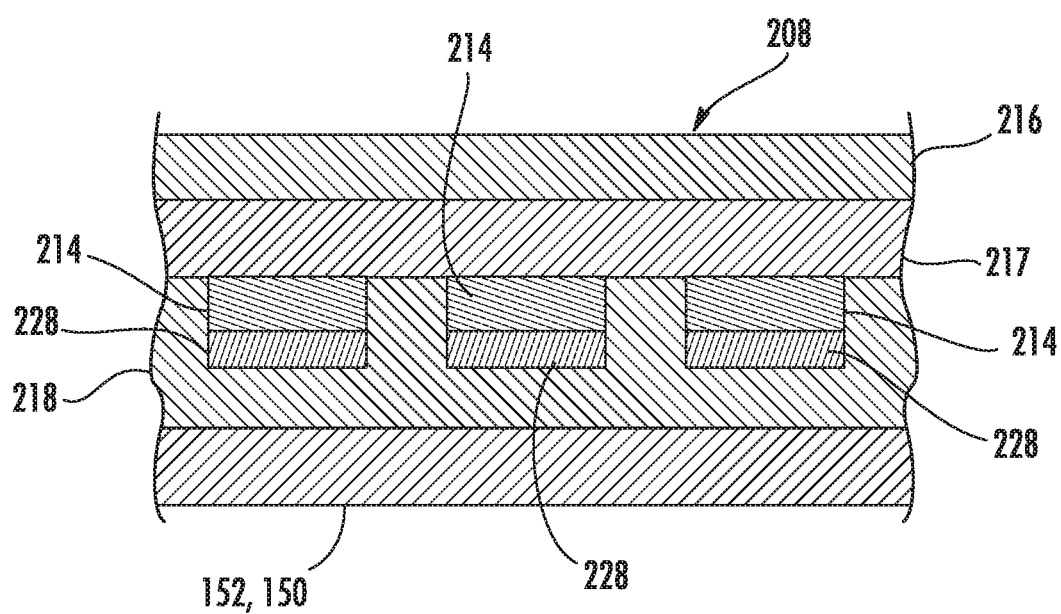
FIG. 5 is a schematic cross-sectional view of a portion of the composite container of FIG. 4, with the cross-section taken along line 5-5 of FIG. 4, and only the cross-section being shown.

More specifically and as best understood by also referring to the cross-sectional view of FIG. 5, the microwave interactive web 208 comprises a first microwave interactive element 212 (FIG. 4) and a second microwave interactive element 214 (FIGS. 4 and 5) supported on a polymer film 216 and joined thereto using a layer of adhesive 217. In this example, the microwave interactive web 208 is joined to the support (e.g., preformed container 150) by a layer of a heat seal coating 218. However, in this and other versions and embodiments of the invention, other suitable methods of joining the microwave interactive web and support (e.g., the preformed container 150) may be used, for example, adhesive bonding, thermal bonding, ultrasonic bonding, mechanical stitching, or any suitable process or technique. FIG. 5 is schematic because, for example, some of the features shown are not drawn to scale and are exaggerated for purposes of clarity and visibility.

The first microwave interactive element 212 is generally continuous and extends around the perimeter of the base 152 (FIG. 3) of the preformed container 150 and partially upward along the walls 154 (FIG. 3) of the preformed container. In this example, the first microwave interactive element 212 is a metal foil band, for example, an aluminum foil, having a thickness sufficient to shield at least partially the microwave energy directed toward the food item (not shown) contained by the composite container 200. The first microwave interactive element includes obround apertures 213.

The second microwave interactive element 214 includes two sets of microwave interactive element segments 220, each including an annular grouping 222 and a central grouping 224. Each of the segments 220 is somewhat triangular or somewhat trapezoidal in shape. However, it will be understood that any suitable shape may be used to form the segments 220, for example, circles, ovals, and other curvilinear shapes, for example, symmetrical curvilinear shapes, triangles, squares, rectangles, and other polygonal shapes, for example, right polygonal shapes, equilateral polygonal shapes, or any combination thereof. As used herein the term "symmetrical curvilinear shape" means a closed curvilinear shape that can be divided in half such that the two halves are symmetrical about an axis dividing them. As used herein, the term "right polygon" means a polygon that can be divided in half such that the two halves are symmetrical about an axis dividing them. Equilateral polygons are therefore a subset of right polygons. Each set of microwave interactive element segments 220 tends to act as an antenna that directs microwave energy to a portion of the food item, for example, that would otherwise tend to be underheated.

In accordance with the first version of the first embodiment, the second microwave energy interactive element 214 can be formed into the desired pattern by applying an etch-resistant coating 228 to the metal and etching the uncoated areas. However, any suitable process for forming the element 214 may be used. In the composite container 200 of the first version of the first embodiment, the microwave interactive web 208 can be replaced with a wide variety of microwave interactive webs, such as any of those disclosed herein.

Figure 6:
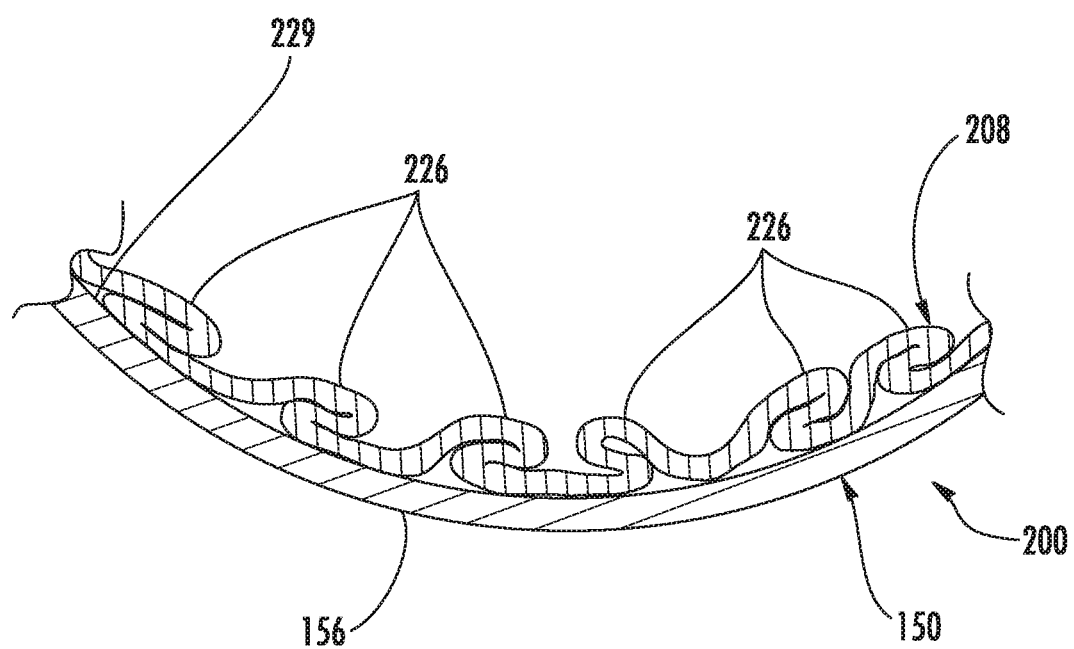
FIG. 6 is a schematic, generally horizontal cross-sectional view taken substantially along line 6-6 of FIG. 4, for illustrating pleats of the microwave interactive web, and only the cross-section is shown.

In the composite container 200, the microwave interactive web 208 is somewhat pleated, for example to accommodate the microwave interactive web fitting snugly into rounded corners 156 (FIG. 3) of the preformed container 150. FIG. 4 is schematic because, for example, numerous of the pleats are not shown in detail; only a few representative pleats 226 are schematically shown as extending substantially for the entire length of one of the corners 156 (FIG. 3) (e.g., substantially from the bottom to the top of the representative corner). FIG. 6 is a schematic, horizontal cross-sectional view taken substantially along line 6-6 of FIG. 4. Only a portion of the subject corner 156 is shown in FIG. 6, and only the cross section is shown. As schematically shown in FIG. 6, the folded-over nature of the pleats 226 is in contrast to the smoothly curved nature of the concave inner surface 229 of the preformed container 150 that at least partially defines the corner. As shown in FIG. 6, each pleat 226 includes at least two (e.g., two or more) portions of the microwave interactive web 208 that are in overlapping, face-to-face relation (e.g., face-to-face contact) with respect to one another. Differently shaped inner surfaces 229, such as but not limited to pleated inner surfaces of alternative preformed containers, are also within the scope of the present invention.

Figure 7:
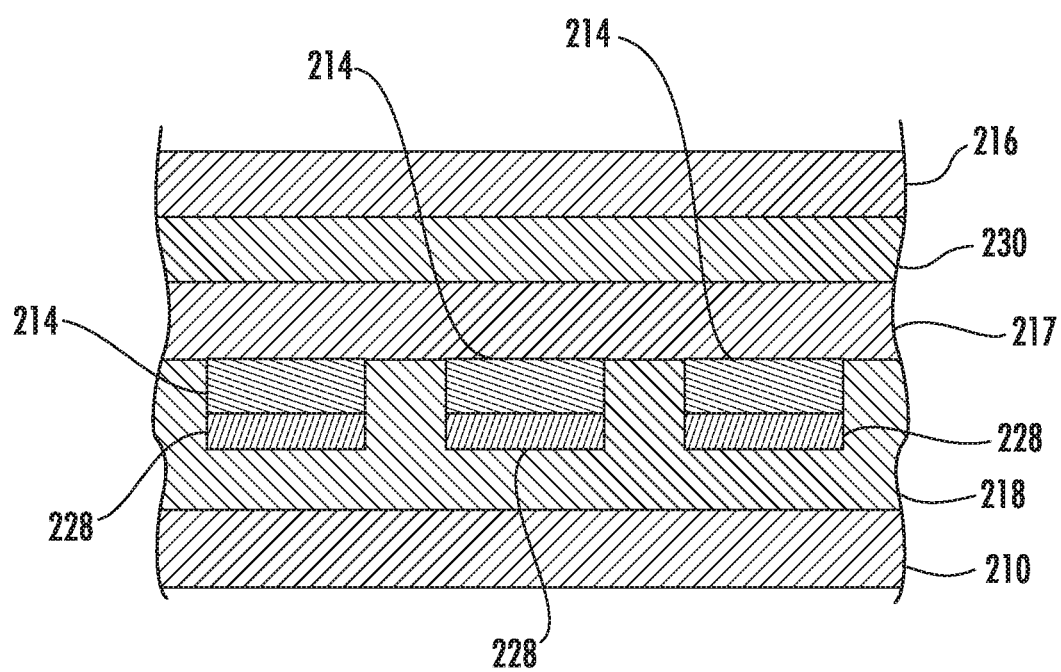
FIG. 7 is a cross-sectional view like that of FIG. 5, except that FIG. 7 is a cross section of a different composite container, namely a composite container that is like the tray of FIG. 4 except for including an additional layer of microwave interactive material, in accordance with a second version of the first exemplary embodiment of the present invention.

FIG. 7 is a cross-sectional view like that of FIG. 5, except that FIG. 7 is a cross section of a portion of a base of a composite container of a second version of the first embodiment of the present invention. The composite container of the second version of the first embodiment is like the composite container 200 of the first version of the first embodiment, except for variations noted and variations that will be apparent to those of ordinary skill in the art. The microwave interactive web of the composite container of the second version of the first embodiment further includes a browning and crisping element, for example a susceptor comprising a layer of microwave energy interactive material 230. By using the susceptor comprising the layer of microwave energy interactive material 230 in combination with the second microwave interactive element 214, the effectiveness of both of these features may be enhanced.

It will be understood that some of the features depicted in FIG. 7 are not to scale and are exaggerated merely for purposes of clarity and visibility. Further, it will be understood that numerous other combinations of various microwave energy interactive elements are contemplated hereby. Indeed, the microwave interactive web of the composite container of the second version of the first embodiment can be replaced with a wide variety of microwave interactive webs, such as any of those disclosed herein.

Figure 8:
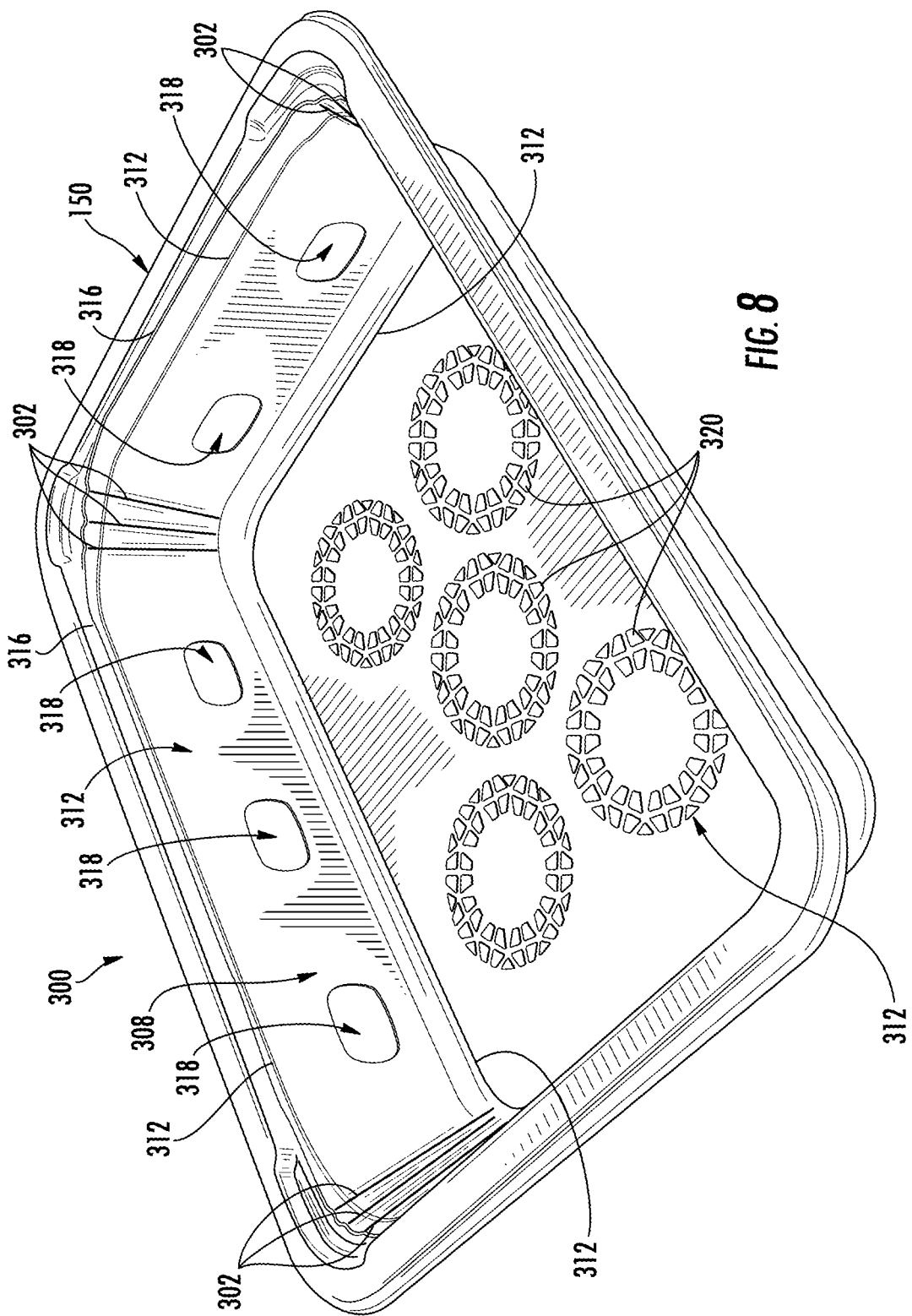
FIG. 8 is a perspective view of a composite container, namely a microwave interactive web mounted to the preformed container of FIG. 3, in accordance with a third version of the first exemplary embodiment of the present invention.

A third version of the first embodiment of the present invention can be like either of the first and second versions of the first embodiment, except for variations noted and variations that will be apparent to those of ordinary skill in the art. FIG. 8 is a schematic perspective view of a composite container 300 comprising a microwave interactive web 308 mounted to a preformed three-dimensional support that is in the form of a container, or more specifically in the form of the preformed container 150 (FIG. 3), in accordance with the third version of the first embodiment of the present invention.

The microwave interactive web 308 is somewhat pleated, for example to accommodate the rounded corners 156 (FIG. 3) of the preformed container 150. FIG. 8 is schematic because, for example, numerous of the pleats 302 are not shown in detail; only a few representative pleats 302 are schematically shown as extending substantially for the entire length of some of the corners (e.g., substantially from the bottom to the top of the representative corners). The pleats 302 of the composite container 300 are like the pleats 226 of the composite container 200 (e.g., see FIG. 6).

The microwave interactive web 308 comprises a first microwave interactive element 312 and a second microwave interactive element 314 supported on a polymer film 316. The first microwave interactive element 312 is a generally continuous metal foil that extends around the perimeter of the base 152 (FIG. 3) of the preformed container 150 and substantially upward along the walls 154 (FIG. 3) of the preformed container. Apertures 318 that each have a somewhat obround shape are defined by the first microwave interactive element 312 in a spaced apart configuration. The second microwave interactive element 314 includes five annularly arranged sets or groups of microwave interactive element segments 320 arranged in a staggered configuration. Each of the segments 320 within the sets is somewhat triangular or somewhat trapezoidal in shape.

In use, the foil portion of first microwave interactive element 312 tends to shield the food item (not shown) in the composite container 300 from microwave energy, while allowing the microwave energy to pass through the apertures 318. Each set of microwave interactive element segments 320 tends to act as an antenna, directing the microwave energy to particular areas of the food item (not shown) in the composite container 300. In the composite container 300 of the third version of the first embodiment, the microwave interactive web 308 can be replaced with a wide variety of microwave interactive webs, such as any of those disclosed herein.

Figure 9:
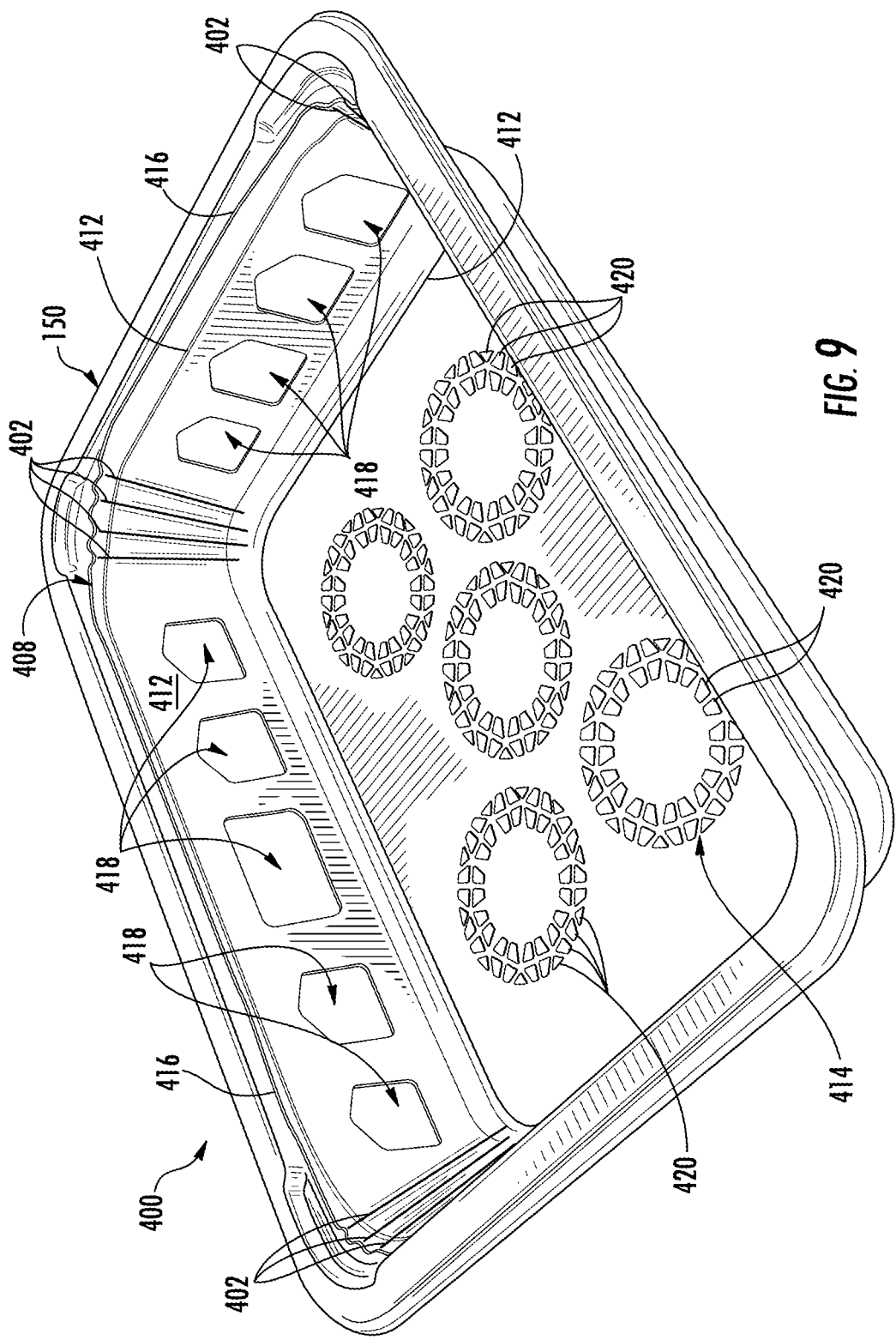
FIG. 9 is a perspective view of a composite container, namely a microwave interactive web mounted to the preformed container of FIG. 3, in accordance with a fourth version of the first exemplary embodiment of the present invention.

A fourth version of the first embodiment of the present invention can be like the other versions of the first embodiment, except for variations noted and variations that will be apparent to those of ordinary skill in the art. FIG. 9 is a schematic, perspective view of a composite container 400 comprising a microwave interactive web 408 mounted to a preformed three-dimensional support that is in the form of a container, or more specifically in the form of the preformed container 150, in accordance with a fourth version of the first embodiment of the present invention.

The microwave interactive web 408 is pleated in the manner described above for the other versions of the first embodiment, although only a few representative pleats 402 are schematically shown in FIG. 9. The microwave interactive web 408 comprises a first microwave interactive element 412 and a second microwave interactive element 414 supported on a polymer film 416. The first microwave interactive element 412 is a generally continuous metal foil that extends around the perimeter of the base 152 (FIG. 3) of the preformed container 150 and substantially upward along the walls 154 (FIG. 3) of the preformed container. Apertures 418 that each have a somewhat rectangular shape or a somewhat pentagonal shape are defined within the first microwave interactive element 412 along the walls 154 of the container 400 in a spaced apart configuration. The second microwave interactive element 414 includes five annularly arranged groups or sets of microwave interactive element segments 420 in a staggered configuration. Each of the segments 420 within the sets is somewhat triangular or somewhat trapezoidal in shape.

In use, the foil portion of the first microwave interactive element 412 tends to shield the food item (not shown) in the composite container 400 from microwave energy, while allowing the microwave energy to pass through the apertures 418. In accordance with the fourth version of the first embodiment, the microwave interactive element segments 420 are in combination with a susceptor, so that in addition to acting as antenna for directing the microwave energy, each set of microwave interactive element segments 420 tends to act as a shielding element upon exposure to microwave energy, thereby decreasing the amount of microwave energy that passes through the base 152 (FIG. 3) of the composite container 400. In the composite container 400 of the fourth version of the first embodiment, the microwave interactive web 408 can be replaced with a wide variety of microwave interactive webs, such as any of those disclosed herein.

An acceptable example of an intermittent motion machine or manufacturing system 500 and associated methods for forming the composite containers of the first embodiment (e.g., the composite containers 200, 300, 400 discussed above) is discussed in the following beginning with FIG. 10, in accordance with the first embodiment. In the manufacturing system 500, various process steps occur in concerted cycles of movement and rest to create a generally continuous overall manufacturing process. While certain features and steps are described herein, it is understood that numerous other features or steps may be added or used to replace those described herein. Although the manufacturing system 500 is primarily described in the following in the context of an intermittent-motion type of manufacturing system, it may be modified to be, or to be more like, a continuous-motion manufacturing system.

Figure 10:
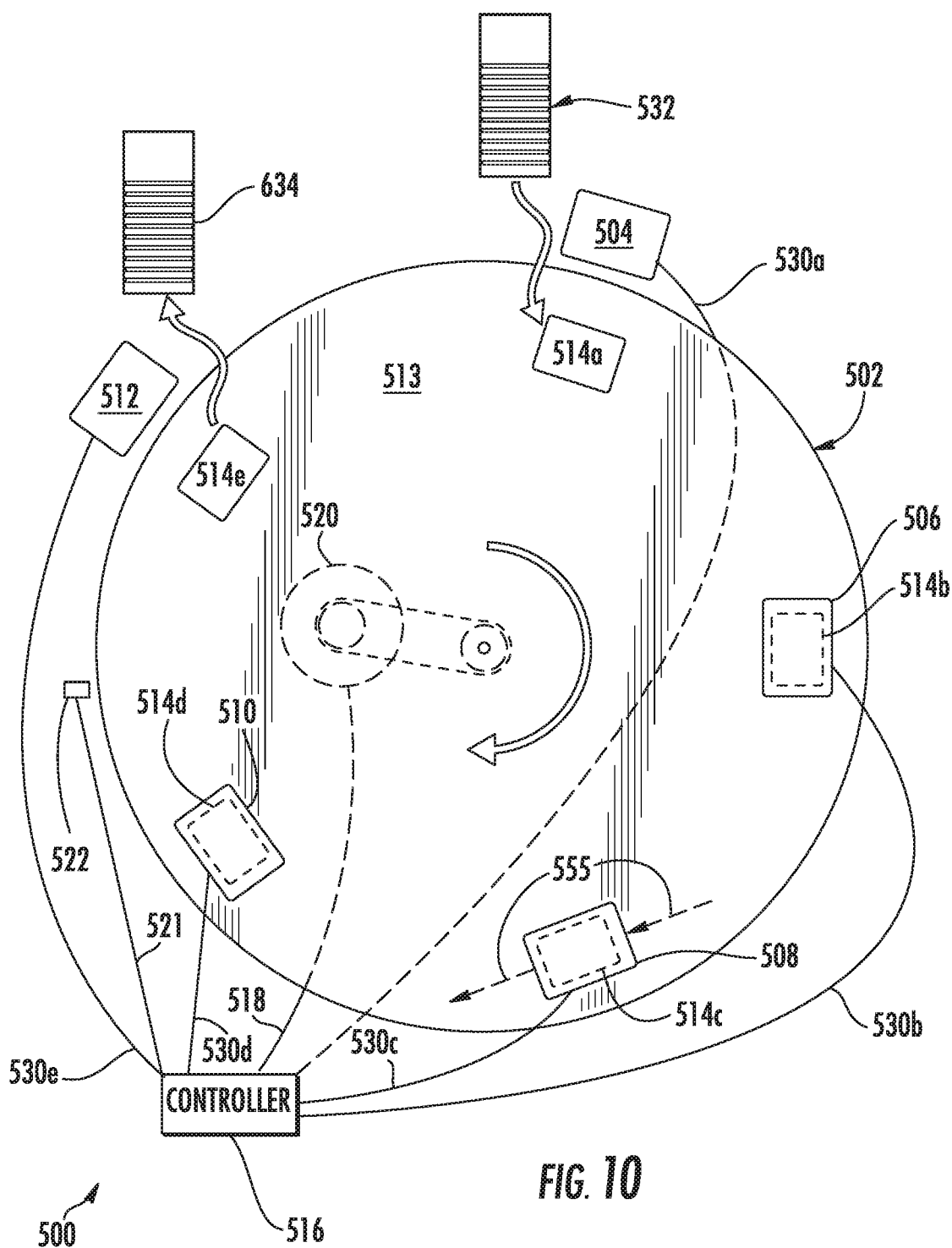
FIG. 10 is a schematic, generally top plan view of portions of a manufacturing system for combining a microwave interactive web to a preformed container to create a composite container, in accordance with the first exemplary embodiment of the present invention.

As best understood with reference to the schematic top plan view of FIG. 10, the manufacturing system 500 includes a container transporting apparatus for serially moving containers along a path of travel. As shown in FIG. 10, the container transporting apparatus is in the form of a rotary turntable 502 type of conveyor that defines an endless circular path of travel, although other types of conveyors are within the scope of the present invention, including conveyors with upper and lower runs.

The turntable 502 cycles through a series of indexed positions or stations, and the stations can be respectively equipped with a supplying apparatus 504, pretreating apparatus 506, installing apparatus 508, post-treating apparatus 510, and receiving apparatus 512. As shown in FIG. 10, the upper surface 513 of the turntable 502 includes or otherwise has associated therewith upwardly open, cavity-like, container-receiving receptacles 514a-514e in a number corresponding to the number of stations around the turntable 502. As shown in FIG. 10, the receptacles 514b-514d are respectively hidden from view beneath the pretreating, installing and post-treating apparatuses 506, 508, 510; therefore, these hidden receptacles are schematically illustrated by dashed lines. Additional receptacles (e.g., like receptacles 514a-514e) may be incorporated in the turntable 502 to allow for the incorporation of additional stations in the manufacturing system 500. The manufacturing system may alternatively include a lesser number of stations and receptacles.

As will be discussed in greater detail below, the manufacturing system 500 includes mechanism(s) for controlling the coordinated operation of the components of the manufacturing system, and an electrical central controller 516 with a microprocessor, or the like, can be central to the mechanisms for controlling the coordinated operation according to the first embodiment of the present invention. Alternatively, the electrical central controller 516 could be replaced with a mechanical or pneumatic control system, or any other type of suitable control system for coordinating the operation of the respective components of the manufacturing system 500.

As schematically shown in FIG. 10, the central controller 516 communicates via a signal communication path 518 with the controller of a motor 520 that drives the rotatably mounted turntable 502. As shown in FIG. 10, the motor 520 and associated drive belt or chain and pulleys or sprockets are hidden from view beneath the turntable's upper surface 513; therefore, they, like some of the signal communication paths are schematically shown by dashed lines. Similarly, the central controller 516 communicates via a signal communication path 521 with a position sensor 522 that monitors the rotary position of the turntable 502. The position sensor 522 can be any type of sensor for detecting and reporting the rotary position of the turntable 502 to the central controller 516. For example, the position sensor 522 can be an optical sensor or Hall effect sensor that senses position-indicating marks, magnets or the like (not shown) on the peripheral edge of, or at another acceptable position with respect to, the turntable 502. The central controller 516 also respectively communicates, such as via signal communication paths 530a-530e, with the other components of the manufacturing system, typically so that the position of the turntable 502 determines the initiation of the operations of the supplying apparatus 504, pretreating apparatus 506, installing apparatus 508, post-treating apparatus 510, and receiving apparatus 512, as will be discussed in greater detail below. The signal communication paths 518, 521, 530a-530e of the manufacturing system 500 can be any type of conventional signal communication paths that would be sufficient. For example, they can be electrical wires that extend all the way between the respective components, or they can be any type of conventional wireless communication systems, such as infrared communication systems, radio frequency communication systems, or the like.

The central controller 516 operates in a coordinated fashion with the motor 520 and the position sensor 522 so that, as shown in FIG. 10, the turntable 502 rotates in a clockwise direction between five positions, with the turntable remaining stationary in each of the five positions for a predetermined period of time that is sufficient for the apparatuses 504, 506, 508, 510, 512 to complete their functions, as will be discussed in greater detail below.

In the first position of the turntable 502, the receptacle 514a is adjacent the supplying apparatus 504, the receptacle 514b is adjacent the pretreating apparatus 506, the receptacle 514c is adjacent the installing apparatus 508, the receptacle 514d is adjacent the post-treating apparatus 510, and the receptacle 514e is adjacent the receiving apparatus 512. In the turntable's second position, which directly follows the first position of the turntable 502 after the predetermined period of time, the receptacle 514e is adjacent the supplying apparatus 504, the receptacle 514a is adjacent the pretreating apparatus 506, the receptacle 514b is adjacent the installing apparatus 508, the receptacle 514c is adjacent the post-treating apparatus 510, and the receptacle 514d is adjacent the receiving apparatus 512. In the turntable's third position, which directly follows the second position of the turntable 502 after the predetermined period of time, the receptacle 514d is adjacent the supplying apparatus 504, the receptacle 514e is adjacent the pretreating apparatus 506, the receptacle 514a is adjacent the installing apparatus 508, the receptacle 514b is adjacent the post-treating apparatus 510, and the receptacle 514c is adjacent the receiving apparatus 512. In the turntable's fourth position, which directly follows the third position of the turntable 502 after the predetermined period of time, the receptacle 514c is adjacent the supplying apparatus 504, the receptacle 514d is adjacent the pretreating apparatus 506, the receptacle 514e is adjacent the installing apparatus 508, the receptacle 514a is adjacent the post-treating apparatus 510, and the receptacle 514b is adjacent the receiving apparatus 512. In the turntable's fifth position, which directly follows the fourth position of the turntable 502 after the predetermined period of time, the receptacle 514b is adjacent the supplying apparatus 504, the receptacle 514c is adjacent the pretreating apparatus 506, the receptacle 514d is adjacent the installing apparatus 508, the receptacle 514e is adjacent the post-treating apparatus 510, and the receptacle 514a is adjacent the receiving apparatus 512.

In some situations, it might be acceptable for the manufacturing system 500 to include a mechanical drive system, with suitable linkages, gearing and the like, by way of which one or more features of one or more of the apparatuses 504, 506, 508, 510, 512 are driven or at least partially driven by the turntable and/or its motor 520. On the other hand, and in accordance with the first embodiment, the supplying apparatus 504, pretreating apparatus 506, installing apparatus 508, post-treating apparatus 510, and receiving apparatus 512 each include their own power supply(s), controller(s) and other features needed to carry out their respective functions, with their controllers being respectively connected to the central controller 516 via the signal communication paths 530a-530e for purposes of providing the exemplary coordinated operations that are discussed below.

In the following, for the purpose of providing a representative example, operations are discussed in the context of the turntable 502 moving the representative receptacle 514a sequentially to the stations of the manufacturing system 500. Nonetheless and in accordance with the first embodiment, each of the receptacles 514a-514e is moved along the endless flowpath defined by the turntable 502, and the apparatuses 504, 506, 508, 510, 512 serially and respectively act upon the contents of the receptacles 514b-514e in the same manner in which they act upon contents of the receptacle 514a.

As best understood with reference to FIG. 10, a cycle for the receptacle 514a begins with the turntable 502 being stationary while the receptacle 514a is empty and adjacent to the supplying apparatus 504. For ease of explanation, this position is referred to herein as the "first position", although the process can be described with different terms and other frames of reference. At the first position, the supplying apparatus 504 typically retrieves a pre-formed microwave inactive support, such as the conventional preformed container 150 (FIG. 3). As schematically shown in FIG. 10, the preformed container 150 is received from a stack 532 of preformed containers. The stack 532 may be maintained in a hopper or other suitable stacking device. Any suitable stacking device or other device for supplying preformed containers 150 may be used, for example, a moving conveyor or gravity feed, with the preformed containers typically being provided in a controlled fashion to the supplying apparatus 504. In one specific example, the supplying apparatus 504 can more specifically be a de-nesting and transferring device, or even more specifically a "pick-and-place" feeder or feeding unit. Such pick-and-place feeders are commercially available, for example, from Minnesota Automation (Crosby, Minn.). Minnesota Automation is affiliated with Graphic Packaging International, Inc. (Marietta, Ga.). Pick-and-place feeding units typically come in one of two basic formats: reciprocating and rotary. In the first embodiment, the supplying apparatus 504 comprises a reciprocating pick-and-place unit. However, it may also be possible to use a rotary pick-and-place unit, or any other suitable unit, such as a gravity or conveyor feed unit or the like, to place a preformed container 150 or other suitable support in the receptacle 514a.

The supplying apparatus 504, when in the form of a pick-and-place feeding unit, typically moves one or more vacuum cups into contact with one of the preformed containers 150 (FIG. 3) in the stack 532. The vacuum cup then "grips" the preformed container 150 and removes it from the stack 532. In doing so, a vacuum may be created between the preformed container 150 being removed and the remaining preformed containers 150 in the stack 532. In an effort to prevent misfeeding or "double-feeding", the stack 532 may be vibrated or bounced in its hopper. Also in an effort to prevent misfeeding or double-feeding, the supplying apparatus 504 can further include a rotary screw device or other suitable device for removing one of the preformed containers 150 from the stack 532 at a time, so that the pick-and-place feeding unit "grabs" the preformed container 150 that has already been removed from the stack 532. The preformed container 150 that has been "grabbed" by the pick-and-place feeding unit is transported by the pick-and-place feeding unit to proximate the receptacle 514a. Then, the pick-and-place unit typically places the preformed container 150 into the receptacle 514a. After placing the preformed container 150 in the receptacle 514a, the pick-and-place unit releases the preformed container 150 in the receptacle 514a, and the transporting arm or the like of the pick-and-place unit is moved away from the receptacle 514a.

Then, the turntable 502 is rotated to the next position, so that the receptacle 514a containing the preformed container 150 (FIG. 3) is adjacent to (e.g., within) the pretreating apparatus 506. At this "second" position, the optional pretreating apparatus 506 can pre-treat the preformed container 150 in the receptacle 514a. The pretreating carried out by the pretreating apparatus 506 can be a heat treatment and/or a corona treatment for enhancing the mounting/bonding to be carried out at the next step by the installing apparatus 508.

More specifically, the pretreating apparatus 506 can include a downwardly open chamber that defines a cavity that is open to and/or in receipt of the preformed container 150 (FIG. 3) in the receptacle 514a while the receptacle 514a is in the second position. The chamber of the pretreating apparatus 506 can be in the form of an oven that includes one or more heating elements or the like, and/or the pretreating apparatus can include equipment for generating a corona atmosphere within the chamber of the pretreating apparatus or for otherwise corona treating the preformed container 150.

After the optional pretreatment, the turntable 502 is rotated to the next position, so that the receptacle 514a containing the optionally pretreated, preformed container 150 (FIG. 3) is adjacent to the installing apparatus 508. Very briefly described, and as will be discussed in greater detail below, at this "third position" a microwave interactive web (e.g., see the microwave interactive web 100 of FIG. 2) is mounted to the preformed container 150 in the receptacle 514a, to create a composite container (e.g., see the composite containers 200, 300, 400 of FIGS. 4, 8 and 9).

Figure 11:
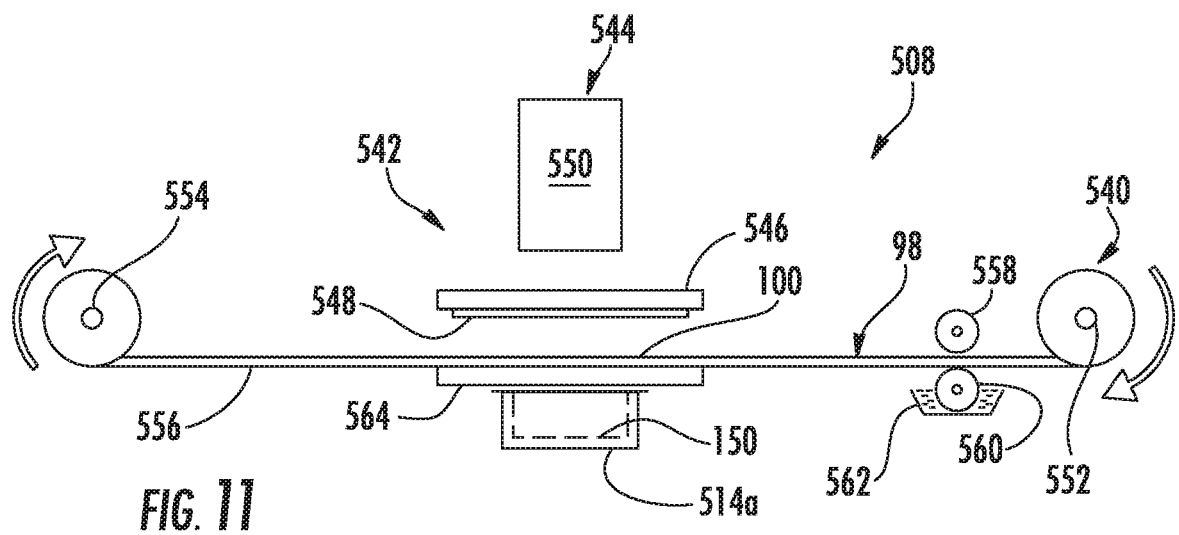
FIG. 11 is a schematic, side elevation view of an installing apparatus of the manufacturing system of FIG. 10, with a receptacle of a turntable of the manufacturing system being positioned below the installing apparatus, and a forming tool and die plate of the installing apparatus being in a retracted configuration.
Figure 12:
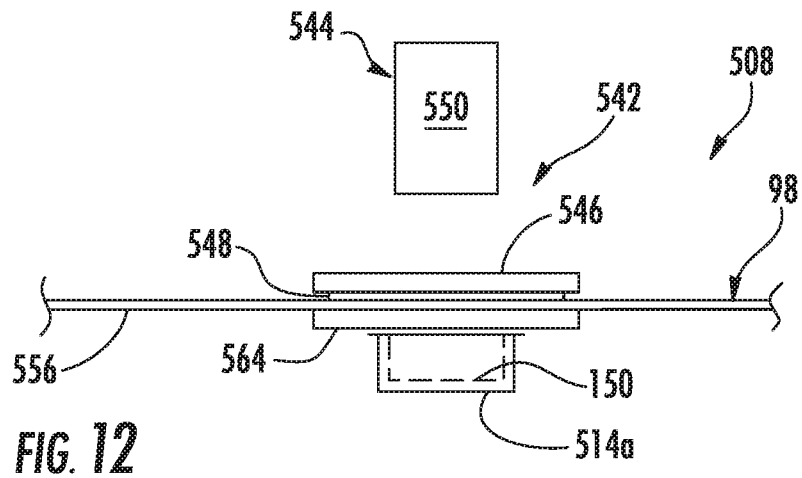
FIG. 12 is like FIG. 11, except that reels and associated rolls of material are not shown, and the die plate is in an extended configuration.
Figure 13:
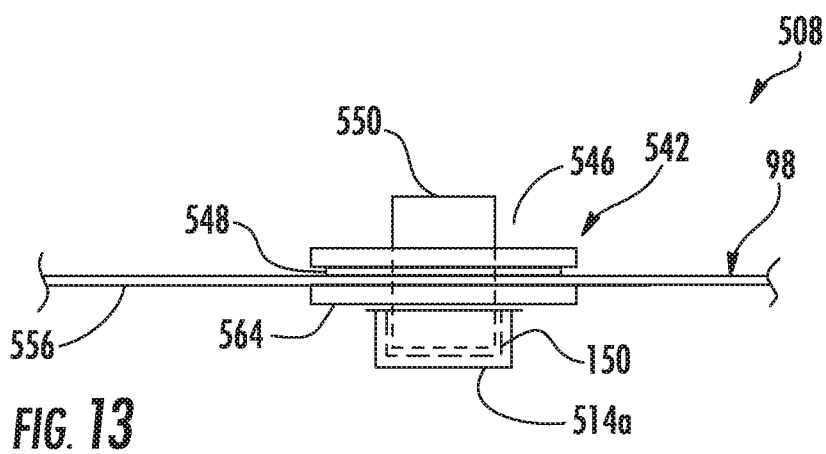
FIG. 13 is like FIG. 12, except that the forming tool is also in an extended configuration.

FIG. 11 is a schematic, side elevation view of the preformed container 150 in the receptacle 514a in the third position, in which they are positioned beneath the installing apparatus 508. The installing apparatus 508 of the first embodiment includes a web transporting apparatus 540, a cutting apparatus 542 and a mounting apparatus 544. As will be discussed in greater detail below, the cutting apparatus 542 of the version of the first embodiment that is illustrated in FIGS. 11-13 includes a die plate 546 that carries a cutter in the form of one or more blades or knives 548 (e.g., "steel rules" that can be generally characterized as being long razor plates) or other cutting devices for cutting the microwave interactive web 100 (also see FIGS. 1 and 2) from the composite web 98 (also see FIG. 1). The mounting apparatus 544 includes a forming tool 550 for mounting the microwave interactive web 100 to the preformed container 150 in the receptacle 514a, to create the composite container. When the receptacle 514a containing the preformed container 150 initially becomes adjacent to the installing apparatus 508, the installing apparatus is in the configuration shown in FIG. 11, in which the forming tool 550 and the die plate 546 are each in their retracted configurations.

The web transporting apparatus 540 includes an upstream reel 552 for carrying an upstream roll from which the composite web 98 is drawn. The upstream reel 552 can be a traditional unwind stand with a braking device for maintaining optimal tension in the composite web 98. Additionally, a web splicing apparatus (not shown) may be provided to allow for one expiring roll of composite web 98 to be attached to a new one. A pair of driven nip rolls (not shown) or any other suitable mechanism may be used to unwind the composite web 98 from the upstream reel 552 at the desired rate. The drawing of the composite web 98 from the upstream reel 552 may also be aided by the winding-up action of a downstream reel 554 upon which remnants 556 (e.g., a web of remnants) of the composite web 98 are wound into a roll, as will be discussed in greater detail below. At least some of the remnants 556 can also or alternatively be collected by other collection mechanisms, such as those that draw the remnants under the force of a partial vacuum. Also, conventional devices (not shown) can be provided between the upstream and downstream reels 552, 554 for aiding in the proper guiding and positioning of the composite web 98 and remnants 556. These additional devices can include conveyor type devices such as conventional tenter frames, or the like, for carrying or otherwise guiding and/or supporting the side edges of the composite web 98 and remnants 556.

The composite web 98 will be moved (e.g., indexed) in a controlled manner to ensure that one of the microwave interactive webs 100 of the composite web 98 is in register with the preformed container 150 in the receptacle 514a that is at the third position. This can be facilitated using a sensor, such as a photo-eye device or other device, that detects the position of one or more of the microwave interactive webs 100 of the composite web 98, or another appropriate frame of reference provided by the composite web, and controls the components for drawing the composite web 98 and remnants 556 along the path of travel that extends between the upstream and downstream reels 552, 554. The path of travel that extends between the upstream and downstream reels 552, 554 is schematically illustrated in FIG. 10 by the arrows 555 drawn with dashed lines.

The tray 150 in the receptacle 514a that is at the third position has traveled along an upstream portion of the path of travel defined by the turntable 502 (FIG. 10), and the receptacle 514a will subsequently travel along a downstream portion of the path of travel defined by the turntable. The path of travel of the composite web 98/remnants 556, which extends between the upstream and downstream reels 552, 554, extends above and crosses the receptacle's path of travel defined by the turntable 502. The web transporting apparatus 540 is operated so that a microwave interactive web 100 of the composite web 98 is moved along the path of travel defined by the web transporting apparatus, so that the microwave interactive web is superposed with the tray 150 in the receptacle 514a that is at the third position. More specifically, the microwave interactive web 100 is moved to a position in which it is vertically aligned with and positioned above the tray 150 in the receptacle 514a that is at the third position.

The side of the composite web 98 that includes the above-discussed one or more microwave interactive elements may be provided with a heat-activated adhesive or a heat seal coating perhaps prior to being wound into the form a supply roll that is received by the upstream reel 552. Alternatively, an adhesive or heat seal coating may be applied to the side of the composite web 98 that includes the one or more microwave interactive elements after being unwound from the upstream reel 552 and typically prior to reaching the position in which the microwave interactive web 100 to be mounted is vertically aligned with and positioned above the tray 150 in the receptacle 514a that is at the third position. The adhesive or heat seal coating may be applied in any suitable manner including, but not limited to, one or more of roll coating, printing, spraying, dipping, or other processing techniques. For example, FIG. 11 schematically illustrates the adhesive or heat seal coating being applied at a nip defined between an upper roller 558 and a lower roller 560 that is partially immersed in a bath 562 of the adhesive or heat seal coating. Alternatively, the adhesive, heat seal coating or other suitable material may initially be applied to the interior of the preformed container 150 instead of, or in addition to, being initially applied to the composite web 98.

The cutting apparatus 542 is mounted so that it is aligned with the superpositioned microwave interactive web 100/ preformed container 150/receptacle 514a in the third position. In accordance with the first embodiment, the cutting apparatus 542 includes the overhead, platen-type die plate 546 that is positioned above a fixed, plate-like anvil 564 (e.g., die). In the third position, the receptacle 514a and the preformed container 150 that it contains are positioned below the anvil 564, and the microwave interactive web 100 that is to be mounted is positioned between the die plate 546 and the anvil 564 while the die plate is in its retracted configuration shown in FIG. 11.

As mentioned above and in accordance with one version of the first embodiment, the lower face of the die plate 546 includes one or more knives 548 with downwardly oriented cutting tips for cutting the microwave interactive web 100, which is to be mounted, from the composite web 98. This cutting is facilitated by the die plate 546 being moved to an extended configuration shown in FIG. 12, such as through the action of pneumatic actuators (not shown) or the like, or by any other suitable means. In the extended configuration of the die plate 546, the knives 548 cut the microwave interactive web 100, which is to be mounted, from the composite web 98, and the tips of the knives typically abut the anvil 564.

As will be discussed in greater detail below, the cutting apparatus 542 can be in many different configurations. For example, the fixed anvil 564 that stays proximate to (e.g., aligned with) the die plate 546 could be omitted. As an alternative to the fixed anvil 564, the turntable 502 (FIG. 10) can include anvils that respectively encircle each of the receptacles 514a-514e. Irrespective, the face of the die plate 546 can include die rubber projections (not shown), or other suitable means, such as on opposite sides of each of the knives 548, for holding the microwave interactive web 100 that is to be mounted and the remnants 556 stationary against the anvil 564 while the die plate is in its extended configuration and the forming tool 550 is in its retracted configuration, as shown in FIG. 12.

Figure 14:
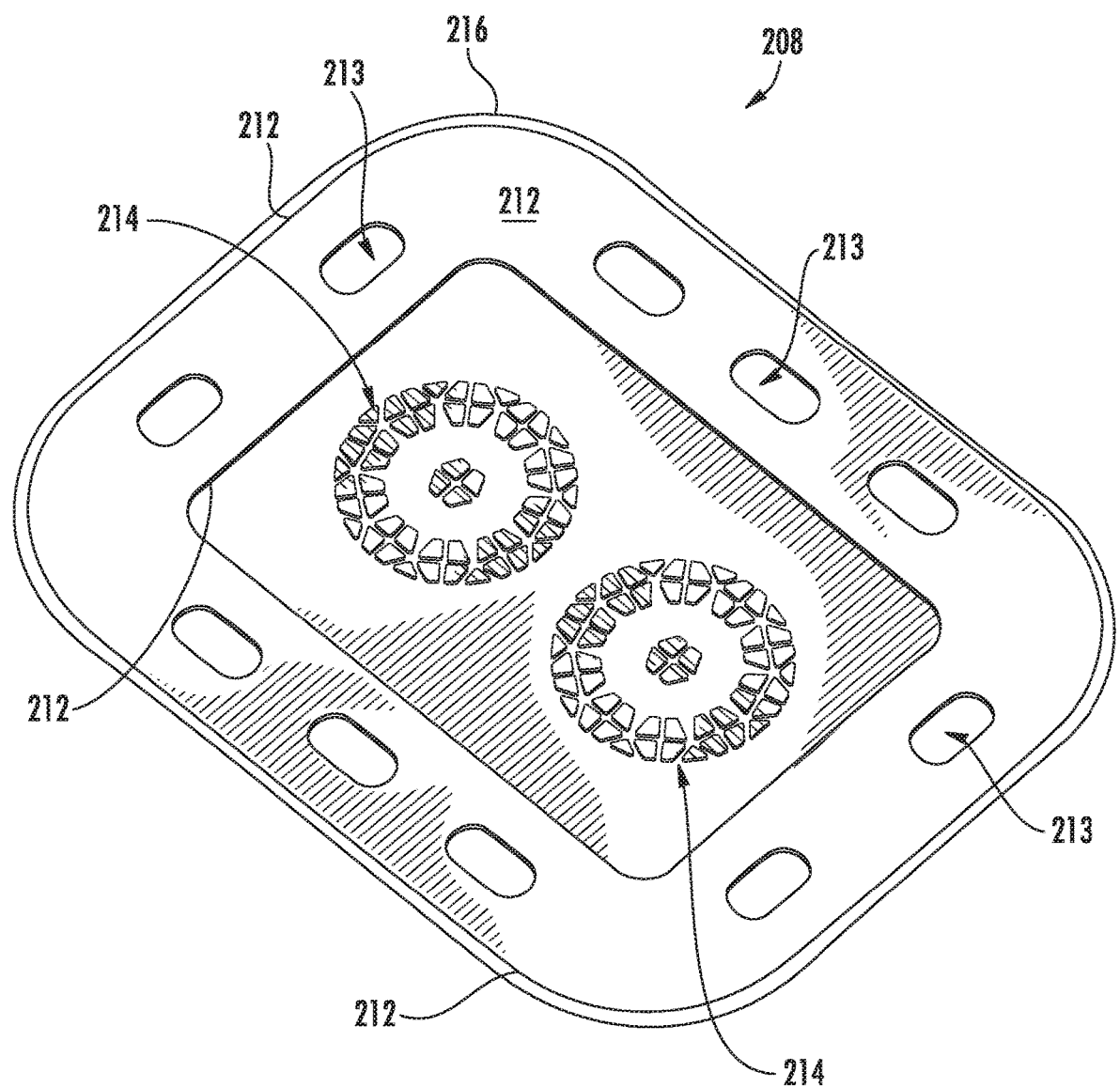
FIG. 14 is a schematic, isolated, perspective view of the microwave interactive web of the composite container of FIG. 4 in a substantially flat configuration.

For example and not for the purpose of limiting the scope of the present invention, some aspects of the manufacturing system 500 will be described in the following in the context of the composite container 200 (FIG. 4) of the first version of the first exemplary embodiment. In this regard, FIG. 14 is a schematic, isolated, perspective view of the microwave interactive web 208 of the composite container 200 of FIG. 4 in a substantially flat configuration. FIG. 14 is illustrative of how this microwave interactive web 208 would appear, in isolation, while in the installing apparatus 508 (FIGS. 10-13) after the installing apparatus is in the configuration shown in FIG. 12 and before the installing apparatus is in the configuration shown in FIG. 13.

After the configuration of FIG. 12, the configuration of FIG. 13 is achieved by moving the forming tool 550 to its extended configuration. More specifically, the forming tool is forced downwardly, so that it passes through both a central opening 566 (FIGS. 16 and 17) in the die plate 546 and a central opening 568 (FIGS. 15 and 17) in the anvil 564, and extends into the cavity of the preformed container 150 (FIG. 3) in the receptacle 514a. In the process, the previously cut microwave interactive web 208 (FIG. 14) is released from (e.g., pulled away from) the rubber projections of the die plate 546, or the like, and forced into the cavity of preformed container 150 in the receptacle 514a. During this process, the forming tool 550 engages the microwave interactive web 208 and the microwave interactive web 208 is caused to conform to the shape of respective portions of both the forming tool 550 and the preformed container 150. That is, the microwave interactive web 208 is bent so that it defines a cavity that corresponds to the respective portion of the forming tool 550. In this regard, FIG. 13 schematically illustrates the forming tool 550 extending into the cavity defined by the microwave interactive web 208, and the cavity defined by the microwave interactive web 208 conforming to the shape of the respective portions of the forming tool. Stated differently and in accordance with the first embodiment, the forming tool 550 pushes the microwave interactive web 208 through the central opening 568 in the anvil 564 and into the cavity of the preformed container 150 in the receptacle 514a. Accordingly, the forming tool 550 of the first embodiment can be characterized as a pusher, since it pushes the microwave interactive web 208 as described above.

The previously cut microwave interactive web 208 (FIG. 14) is mounted to the interior surface of the preformed container 150 (FIG. 2) in the receptacle 514a in response to being forced into the cavity of the preformed container by the forming tool 550. More specifically, after pressing the microwave interactive web 208 onto the cavity of the preformed container 150 in the receptacle 514a, the forming tool 550 typically remains in this extended configuration for a duration sufficient to activate the adhesive or heat seal coating and thereby joins the microwave interactive web 208 to the preformed container 150 in the receptacle 514a, thereby forming the resulting composite container 200 (FIG. 4). When heat is used to activate the adhesive or heat seal coating that bonds the microwave interactive web 208 to the preformed container 150, the forming tool 550 may be heated to a temperature within a range of from about 200° F. to about 400° F., for example from about 225° F. to about 350° F., or from about 250° F. to about 300° F. Electric resistance heaters (not shown) or the like can be within or mounted to the forming tool 550 for this purposes, or the forming tool may include internal passageways (not shown) for receiving a flow of heated oil, or the like. Any type of heater that carries out the heating in a satisfactory manner may be used. If such heaters are used, the receptacles 514a-514e may be associated with one or more features (e.g., cooling fins) that assist with cooling of the composite container 200 after the sealing/bonding process to minimize warping and/or buckling of the container. Any suitable cooling elements or features may be used for cooling one or more of the receptacles 514a-514e or the composite containers within the receptacles 514a-514e. The cooling can be provided by features that circulate a cooling medium, such as water or air, or any other type of cooling or refrigeration system that can provide the desired heat transfer. In some situations, this heating and cooling may not be required.

In the above, the adherence between the microwave interactive web 208 and the preformed container 150 is discussed as being at least partially facilitated by an adhesive or heat seal coating activated by heat and/or pressure. One such coating is a polyester heat seal coating that is commercially available from Coim (United Kingdom) under the trade name EX-8056 HEAT SEAL. In one example, the adhesive or heat seal coating may comprises a thermosetting polymeric material, a thermoplastic polymeric material, or any combination thereof. Such coatings may be applied in any amount needed to achieve the desired adhesion between the materials. More generally, the adherence between the microwave interactive web 208 and the preformed container 150 can be provided using adhesive bonding, thermal bonding, ultrasonic bonding, or any other suitable technique.

As mentioned above and in accordance with one acceptable example, the forming tool 550 remains in its extended configuration for a duration sufficient to activate the adhesive or heat seal coating and join the microwave interactive web 208 to the preformed container 150 in the receptacle 514a, thereby forming the resulting composite container 200. Thereafter, both the forming tool 550 and the die plate 546 are moved to their retracted positions shown in FIG. 11, so that: 1) the turntable 502 (FIG. 10) can be rotated so that the preformed container 150 that is being carried by the next receptacle 514b (FIG. 10) becomes positioned beneath/vertically aligned with the cutting apparatus 542 and the forming tool 550, at which time the rotation of the turntable temporarily ceases; and 2) the web transporting apparatus 540 (FIG. 11) can resume its above-described transporting functions, so that the next microwave interactive web 208 in the composite web 98 can be moved downstream (along the path of travel established by the web transporting apparatus) to be superposed with the preformed container 150 that is being carried by the receptacle 514b, at which time the transporting function provided by the transporting apparatus temporarily ceases. That is and in accordance with the first embodiment, the incremental transporting operations of the turntable 502 and web transporting apparatus 540: 1) occur while both the forming tool 550 and the die plate 546 are in their retracted positions shown in FIG. 11; 2) do not occur while the die plate and/or the forming tool are in their extended configurations respectively shown in FIGS. 12 and 13; and 3) resume when (e.g., in response to) both the forming tool and the die plate returning to their retracted positions shown in FIG. 11.

As discussed in greater detail below, the cutting apparatus 542 (FIGS. 11-13) can be in many different configurations. For example, the reciprocating die plate 546 with the knives 548 may be omitted in an alternative embodiment. Omitting the reciprocating die plate 546 can result in the incremental transporting operations of the turntable 502 and web transporting apparatus 540: 1) occurring while the forming tool 550 is in its retracted position; 2) not occurring while the forming tool is in its extended configuration; and resuming when (e.g., in response to) the forming tool returning to its retracted position. That is, there can be variations to the aspects of the present invention that relate to the various simultaneous and sequential steps of the manufacturing system 500.

Figure 15:
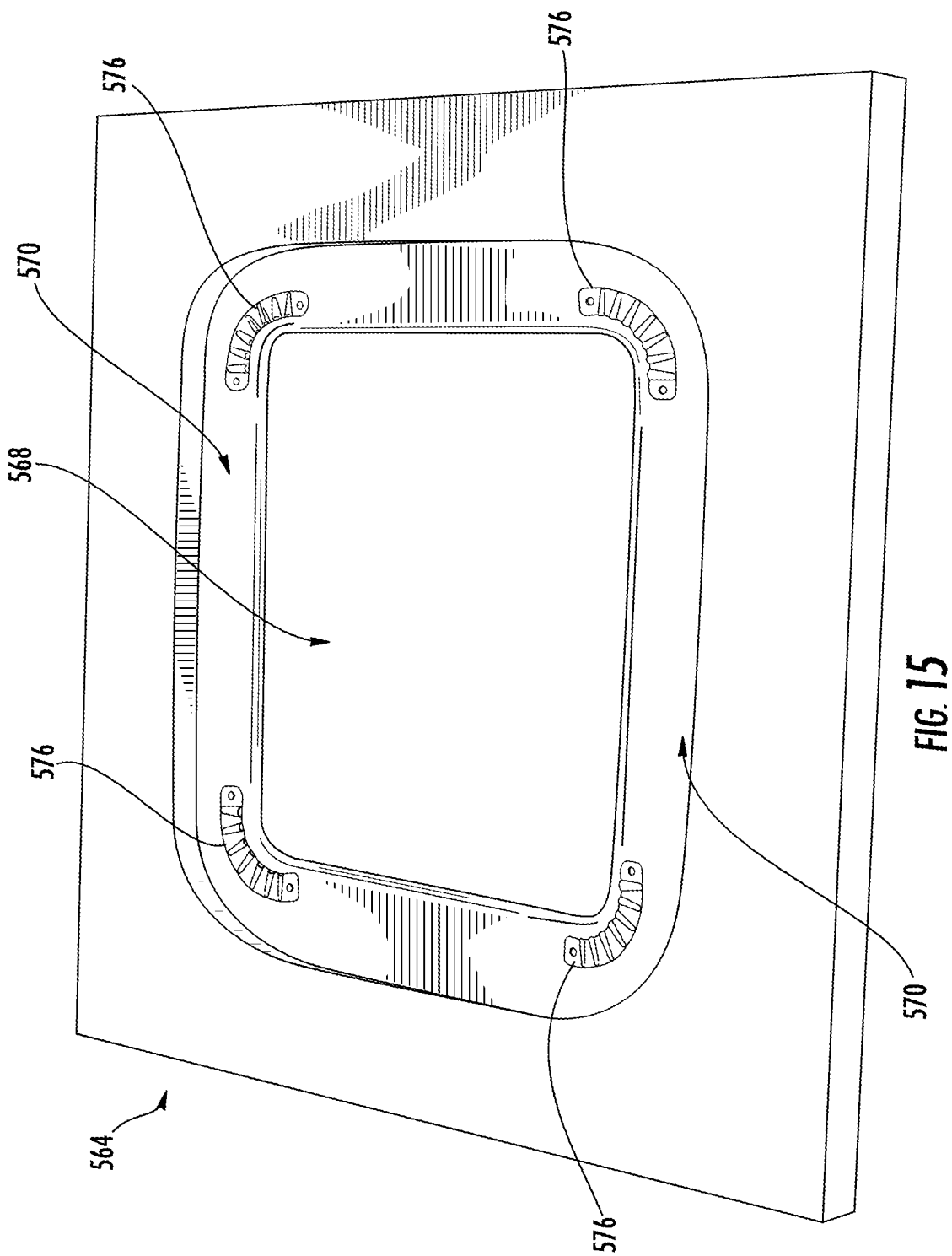
FIG. 15 is a schematic, isolated, top perspective view of an anvil of the installing apparatus of FIG. 10.
Figure 16:
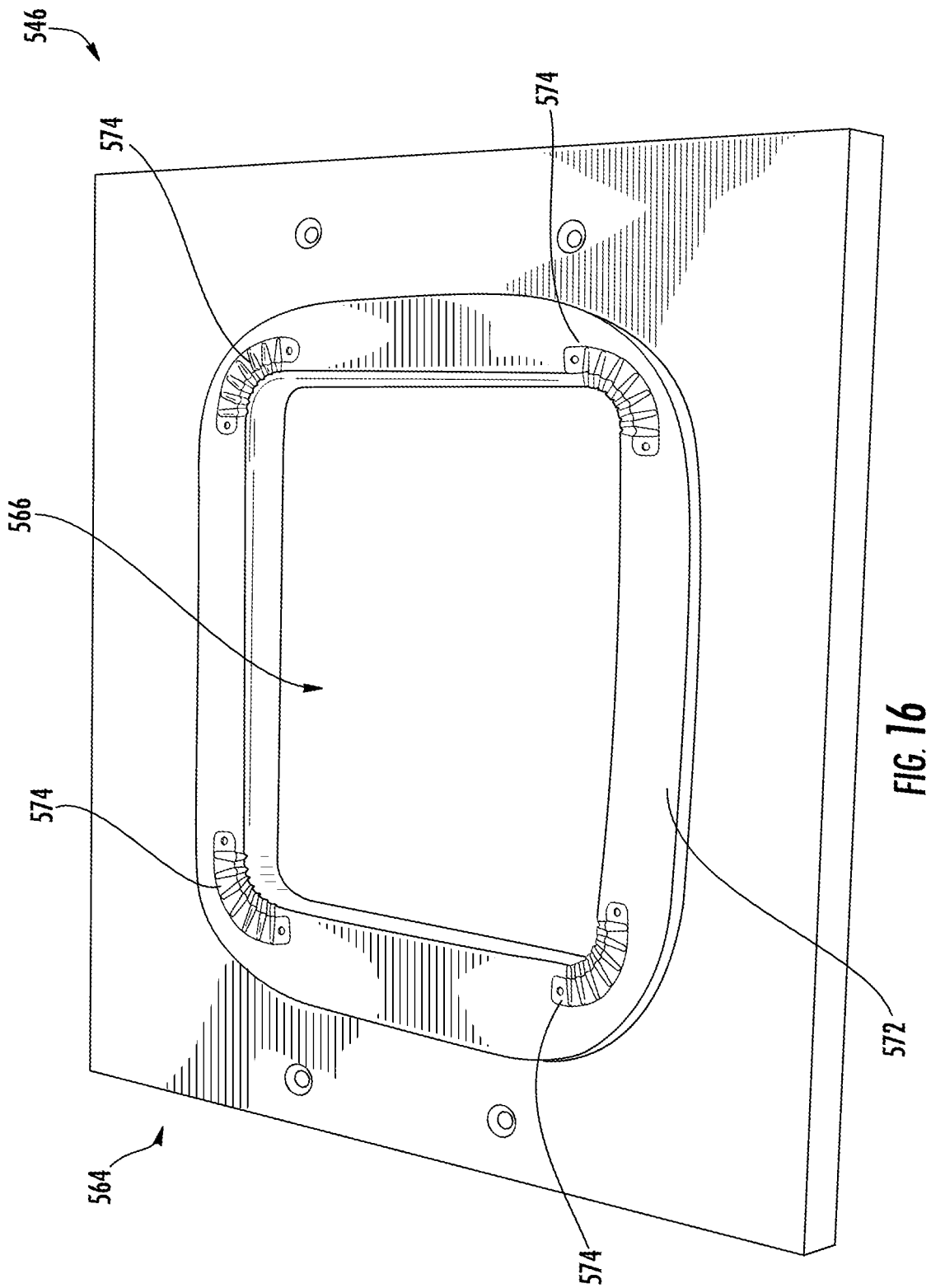
FIG. 16 is a schematic, isolated, bottom perspective view of a die plate of the installing apparatus of FIG. 10.

Referring to the cutting apparatus 542 (FIGS. 11-13) in greater detail, FIG. 15 is a schematic, isolated, top perspective view of the generally plate-like anvil 564 of the cutting apparatus, and FIG. 16 is a schematic, isolated, bottom perspective view of the die plate 546 of the cutting apparatus. As mentioned above in accordance with one example of the first embodiment, the die plate 546 carries one or more knives 548 (FIGS. 11-13) or other cutting devices (e.g., steel rules that can be generally characterized as being long razor plates) for cutting the microwave interactive web 208 from the composite web 98. Although the knives 548 are not shown in FIG. 16, they could be mounted at an appropriate place on the die plate 546, such as around the periphery of a raised portion 572 of the die plate or in one or more grooves in the die plate. Alternatively the knives 548 can be omitted, as discussed in greater detail below.

Figure 17:
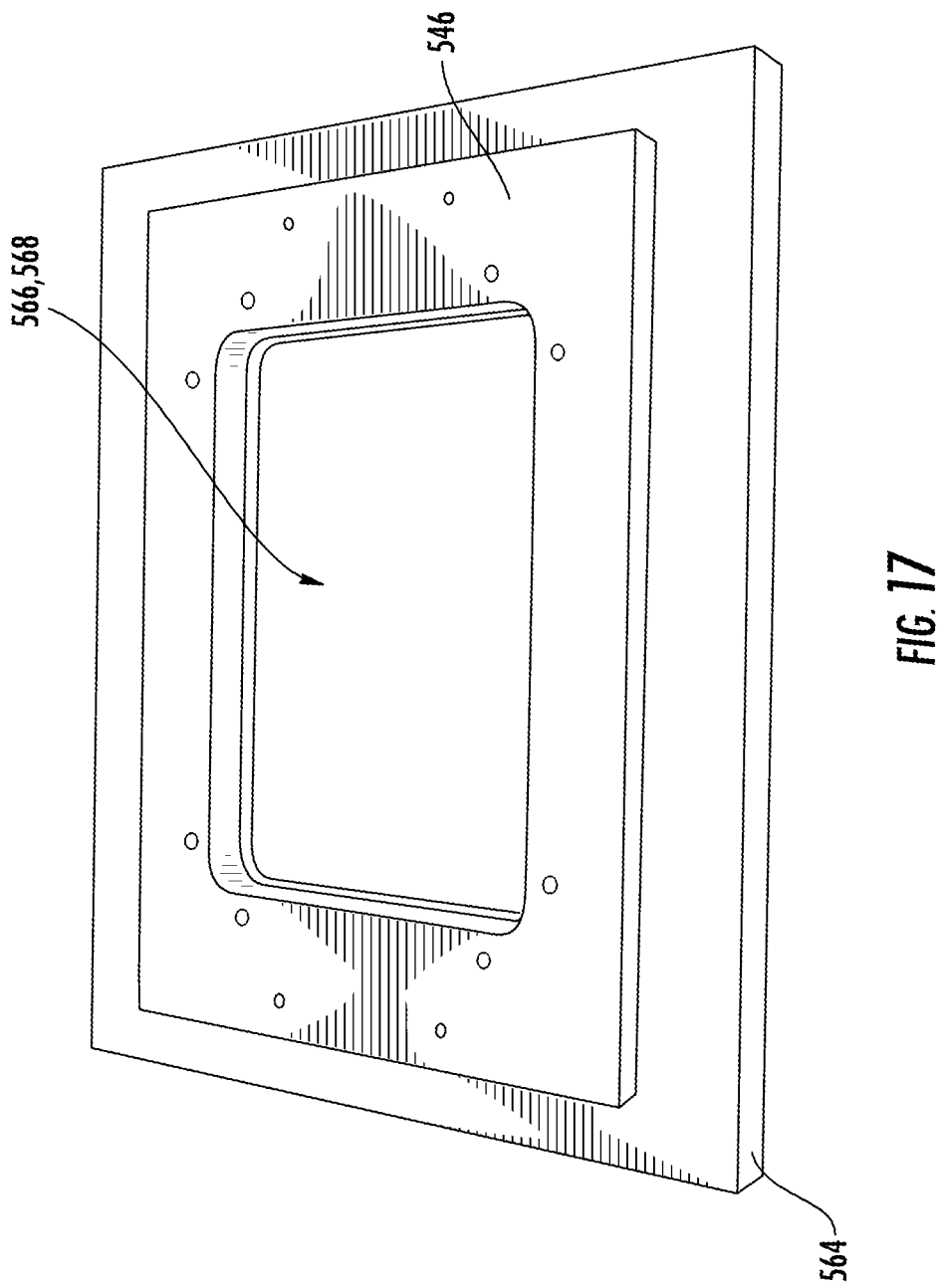
FIG. 17 is a top perspective view of the anvil of FIG. 15 and the die plate of FIG. 16 mated with one another while the die plate is in the extended configuration shown in FIGS. 12 and 13.

As mentioned above, the anvil 564 includes a central opening 568 through which the forming tool 550 extends when the forming tool is in its extended configuration shown in FIG. 13. Likewise, the die plate 546 includes a central opening 566 through which the forming tool 550 extends when the forming tool is in its extended configuration. In the embodiment shown in FIGS. 15-17, the anvil 564 defines a recess 570 that extends around its central opening 568, and the die plate 546 includes a raised area 572 that extends around its central opening 566. When the die plate 546 is in its extended configuration shown in FIGS. 12 and 13, it may mate with the anvil, such as by the raised area 572 of the die plate fitting into the recess 570 of the anvil 564. FIG. 17 is a top perspective view of the anvil 564 of FIG. 15 and the die plate 546 of FIG. 16 mated with one another in the manner described immediately above.

To assist with forming orderly pleats 226 (FIGS. 4 and 6) of the microwave interactive web 208 in the interior corners of the composite container 200, one or both of the die plate 546 and the anvil 564 can include features for initiating or otherwise at least partially controlling the pleats/pleating. For example, these features can be notches, groves, protrusions or any other suitable features. As one particular example shown in FIGS. 15 and 16, female pleating plates 574 (e.g., pleating dies) are mounted to the die plate 546, and male pleating plates 576 (e.g., pleating dies) are mounted to the anvil 564. Alternatively, the female pleating plates 574 can be mounted to the anvil 564, and male pleating plates 576 can be mounted to the die plate 546. The pleating plates 574, 576 extend at least partially around the respective central openings 566, 568 and they may extend completely around the central openings (e.g., when the containers are round bowls). Each of the female pleating plates 574 includes elongate recesses (e.g., indentions). Each of the male pleating plates 576 includes elongate protrusions. Protrusions of the male pleating plates 576 are for being respectively at least partially received in, or for being proximate, recesses of the female pleating plates 574.

More specifically, as the microwave interactive web 208 is being forced into the preformed container 150, respective portions of the microwave interactive web are positioned between, and slide between, the respectively mated female and male pleating plates 574, 576 in a manner that seeks to optimally control the pleating of the microwave interactive web. Although hidden from view in FIG. 17, the female and male pleating plates 574, 576 are respectively mated with respect to one another while the anvil 564 and die plate 546 are mated together as shown in FIG. 17. For a representative pair of mated female and male pleating plates 574, 576, the plates/dies of the mated pair are in opposing face-to-face relation with respect to one another and define a narrow gap (having an undulating shape) therebetween, with the distance across and perpendicular to the gap being about the same as the thickness of the microwave interactive web 208. The microwave interactive web 208 slides through this gap. This sliding through the gap defined between the pleating plates 574, 576, which occurs in response to the microwave interactive web 208 being forced toward/into the preformed container 150, tensions/controls tensioning of the microwave interactive web in a manner that aids in the formation of the orderly pleats 226. Accordingly, the die plate 546 and the anvil 564, or more specifically the pleating plates 574, 576, are cooperative to releasably hold and tension the microwave interactive web 208 while the forming tool 550 moves the microwave interactive web.

As alluded to above, the pleating plates 574, 576 can be more generally referred to as dies, and they can be replaced with a variety of types of dies or other features suitable for carrying out the desired functionality, such as, but not limited to, features formed in or otherwise defined by the die plate 546 and the anvil 564. Also, whereas the above-discussed gap has been described as being respectively defined between the pleating plates 574, 576, it can be more generally characterized as being defined between the die plate 546 and the anvil 564, such as when the pleating plates 574, 576 are omitted, such as when the pleating plates 574, 576 are replaced with features formed in or otherwise defined by the die plate 546 and the anvil 564. Other changes are also within the scope of the present invention.

It can be advantageous for the male pleating plates 576 to be mounted in the recess 570 of the anvil 564 so that the composite web 98/microwave interactive web 208 can slide across or otherwise be proximate the upper surface of the anvil while they are being moved by the web transporting apparatus 540 (FIG. 11). However, a wide variety of different arrangements are within the scope of the present invention. For example, although only the corners of the microwave interactive web 208 are manipulated with the pleating plates 574, 576 in the illustrated embodiment, the pleating plates may be configured in numerous ways to provide pleats or other patterns in other portions of microwave interactive webs. For example, although the central openings 566, 568 of the die plate 546 and anvil 564, the forming tool 550 and the pleating plates 574, 576 are typically shown herein such that they are for use when the preformed containers and composite containers are trays, the various components can be reconfigured such that the preformed containers and composite containers are other shapes, such as bowl-shaped.

In some versions of the manufacturing system 500 of the first embodiment, the knives 548 (FIGS. 11-13) are omitted from the die plate 546, and the microwave interactive web 208 is cut, torn or otherwise separated from the composite web 98 by way of one or more other mechanisms. In one version of the first embodiment of the manufacturing system 500 that can be best understood with reference to FIG. 18, the microwave interactive web 208 is cut from the composite web 98 and the remnants 556 by a laser beam 580 that is schematically illustrated by a dashed line in FIG. 18. In one particular example, the laser 582 is used after the microwave interactive web 208 has been mounted to the preformed container 150 and at least the forming tool 550 (FIGS. 11-13) has been returned to its retracted configuration. Cutting at this relatively late time may be advantageous, for example, because it can allow the pleating plates 574, 576 (FIGS. 15 and 16) to at least partially control movement of the microwave interactive web 208 for a longer period of time than if the microwave interactive web is cut to its final size before the forming tool 550 is moved to its extended configuration.

Even though the pleating plates 574, 576 might be interacting solely with what will become remnants 556 of the composite web 98 toward the end of the downward movement of the forming tool 550, this can still help to control the formation of the pleats 226 (FIGS. 4 and 6) in the microwave interactive web 208. For example, because the microwave interactive web 208/what will become remnants 556 of the composite web 98 slide between the pleating plates 574, 576 throughout the completion of the downward stroke of the forming tool 550, tension can be maintained/controlled in the composite web 98 throughout the completion of the downward stroke of the forming tool 550, with this tension/controlling of the tension aiding in the formation of the orderly pleats 226. Even though the downward stroke of the forming tool 550 is referred to in the foregoing, it is within the scope of the present invention for the forming tool and other components to be positioned such that the present invention is not limited to any particular orientation of the forming tool and other components.

Figure 18:
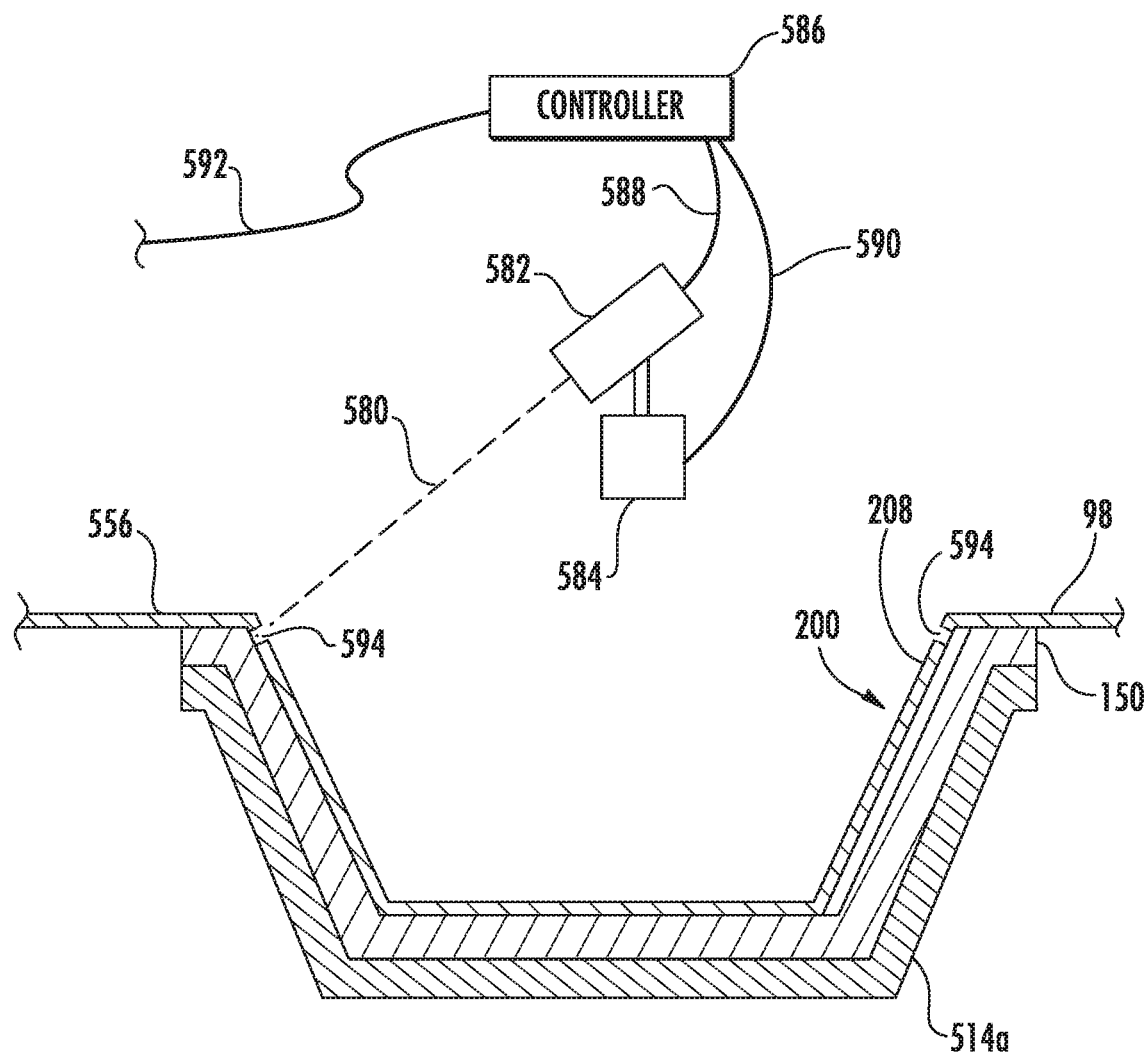
FIG. 18 schematically illustrates a computerized numerical control laser cutting machine cutting the composite web and remnants of the composite web from the microwave interactive web that has already been mounted to a preformed container that is in a representative receptacle of the turntable, with only a vertical cross-section of some of the features being shown, in accordance with a version of the first exemplary embodiment of the present invention.

Generally described, the laser 582 and/or mirrors for reflecting the laser beam 580 can be movably mounted and controlled by a computer controller (e.g., a computerized numerical control ("CNC") cutting machine that uses the laser for cutting). As a more specific example that is schematically shown in FIG. 18, an actuator mechanism 584 carries the laser 582. The actuator mechanism 584 can include one or more electric motors or other types of suitable actuators along with one or more movable arms, turret-like mechanisms or other types of features for facilitating controlled movement of the laser 582. For control purposes, the laser 582 and the actuator mechanism 584 are respectively in communication with a local controller 586 (e.g., a CNC controller) by way of signal communication paths 588, 590. For coordinating with the operations of the other components of the overall system 500 (FIG. 10), the local controller 586 is operatively in communication with the central controller 516 (FIG. 10) via one or more signal communication paths 592 and/or 530c (FIG. 10). The signal communication paths 588, 590, 592 can be any type of conventional signal communication paths that would be sufficient. For example, they can be electrical wires that extend all the way between the respective components, or they can be any type of conventional wireless communication systems, such as infrared communication systems, radio frequency communication systems, or the like.

In the example shown in FIG. 18, the microwave interactive web 208 has been mounted to the preformed container 150, the forming tool 550 (FIGS. 11-13) has been retracted therefrom, the composite container 200 is still in the receptacle 514a, and the laser beam 580, or the like, from the laser 582 is completing the forming of a cut line 594 that separates the remnants 556 and the composite web 98 from the composite container. According to one acceptable method for forming the cut line 594, the laser beam 580 is directed into the opening of the container 150, 200 and moved (e.g., by way of the actuator mechanism 584 moving the laser 582) all the way around an interior portion of the container proximate the opening so that the microwave interactive web 208 is cut from the composite web 98 and the remnant 556. Typically, none of the remnants 556 will be adhered to the preformed container 150, whereas the microwave interactive web 208 will be adhered to the preformed container 150 proximate the cut line 594. More specifically, the microwave interactive web 208 will be adhered at substantially the entire interface between the microwave interactive web and the portion of the preformed container 150 that is below the cut line 594.

At least in theory, the laser beam 580 may be tuned or otherwise controlled (e.g., via the speed at which it is moved), to cut through the composite web 98 without cutting into, or only slightly cutting into, the preformed container 150. This may require the cutting strength or dwell time of the laser 582 to be adjusted to compensate for variations in thickness of the microwave interactive web 208, for example in the area of the pleats 226 (FIGS. 4 and 6). In this regard and at least in theory, it might be desirable to use a laser cutter system (e.g., CNC laser cutter) that can sense variations in the thickness (and/or other attributes) of the microwave interactive web 208 (e.g., such as due to pleating) and automatically adjust to them (e.g., such as by changing the intensity of the laser beam 580, or the speed at which it is moved and thus its dwell time) to cleanly cut the microwave interactive web 208 from the composite web 98 and remnants 556 with minimal or no damage to the underlying preformed container 150. An acceptable CNC laser cutter may be available from Preco, Inc. of Lenexa, Kans.

Alternatively, the cutting of the microwave interactive web 208 from the composite web 98 and the remnants 556 can be carried out using one or more "through-cut" reciprocating cutting blades (not shown) (e.g., with jagged teeth). The reciprocating cutter could be a movably mounted jig saw, or the like, where the movement and other operations of the saw are controlled by a computer controller (e.g., a CNC cutting machine that uses a cutting blade made of metal or other suitable material). In this example, around each of the receptacles 514a-514e (FIG. 10), the turntable 502 (FIG. 10) may include a blade receiving slot or recess (not shown) in the same pattern in which the through-cut blade is to cut the microwave interactive web 208 from the composite web 98 and the remnants 556. In one example, the cutting blade is retracted into the slot when not used for cutting. Similarly, the periphery of the die plate 546 (FIGS. 11-13, 16 and 17) and the anvil 564 (FIGS. 11-13, 15 and 17) could be shaped so that the cutting blade travels outwardly from, and around the periphery of, the die plate and the anvil. The jig saw or other type of mechanical cutter could be replaced with a laser cutter or any other type of suitable cutter.

Other changes can also be made. For example, the microwave interactive webs 208 may be initially connected to the rest of composite web 98 by tear lines (not shown) (e.g., formed by perforations or spaced apart slits), such that the microwave interactive webs are torn from the composite web when respectively forced into the preformed containers 150, so that cutting blades, lasers and the like for cutting the microwave interactive webs from the composite web may be omitted from the manufacturing system 500.

Figure 19:
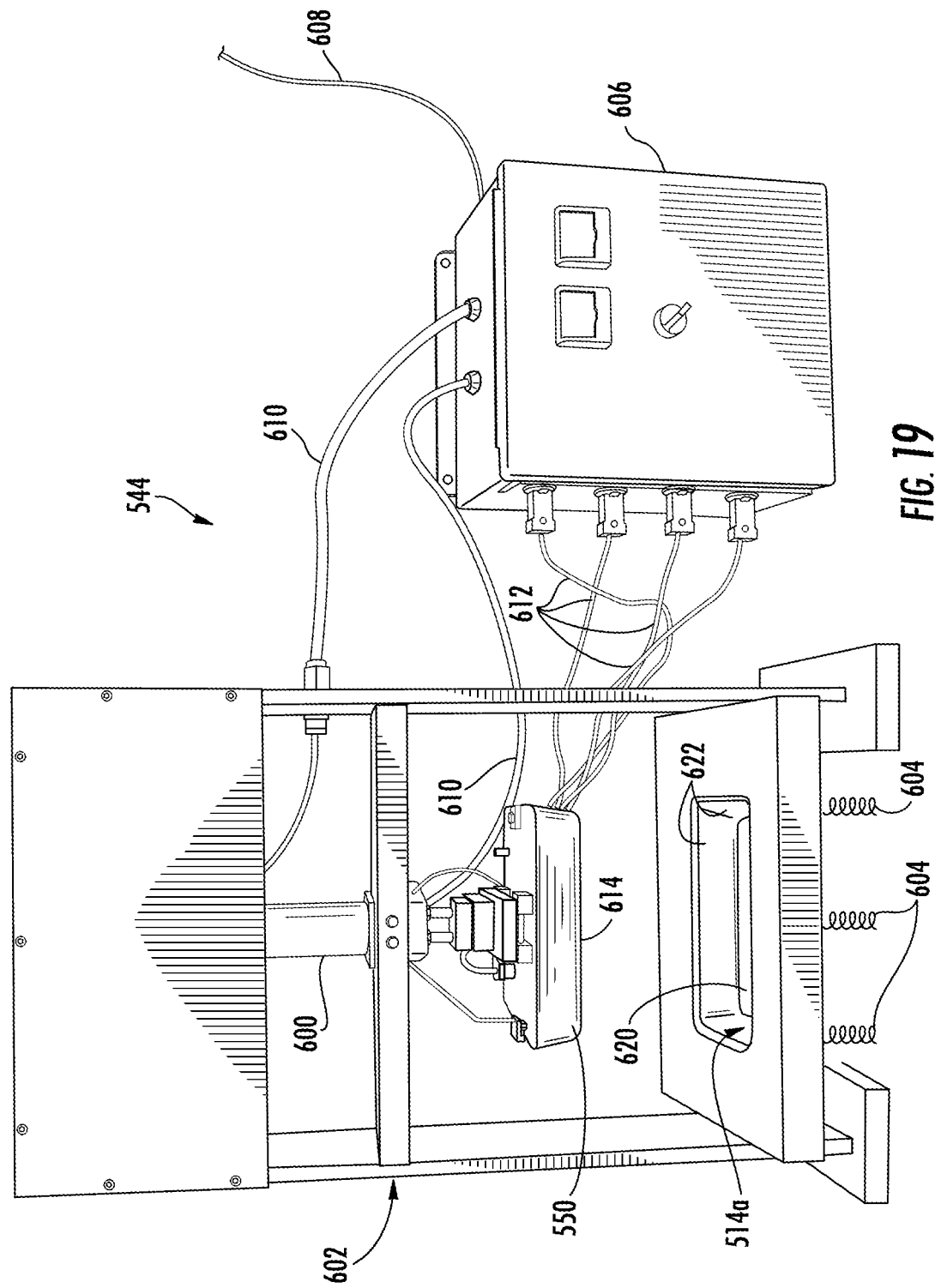
FIG. 19 is a schematic perspective view of a mounting apparatus of the installing apparatus of FIGS. 10-13, with the forming tool of the mounting apparatus in its retracted configuration and positioned above a representative one of the turntable's receptacles, in accordance with the first exemplary embodiment of the present invention.

Referring to the mounting apparatus 544 (FIGS. 11-13) of the installing apparatus 508 (FIGS. 10-13) in greater detail, FIG. 19 is a schematic perspective view of the mounting apparatus positioned above the representative receptacle 514a, with the forming tool 550 in its retracted configuration, in accordance with the first exemplary embodiment. As shown in FIG. 19, the forming tool 550 (e.g., seal head) is mounted to the piston rods of a pneumatic cylinder 600 that is mounted to a frame 602. FIG. 19 is schematic, for example, because for ease of illustration the receptacle 514a is schematically shown as not being mounted to the turntable 502 (FIG. 10). Nonetheless and alternatively, the mounting apparatus 544 could be a "stand-alone" unit as generally shown in FIG. 19. That is, although the manufacturing system 500 (FIG. 10) of the first embodiment is described herein primarily in the context of a machine in which the operations of the various components are coordinated so as to continually and serially form the composite containers, alternatively the respective components of the manufacturing system 500 may not be integrated so that many of the steps of forming the composite containers are carried out more separately from one another in a batch-type manner. For example, the receptacle 514a could be mounted to the frame 602 rather than being carried by the turntable 502 (FIG. 10). In additional or alternatively, the receptacle 514a can be mounted for moving in the same direction that the forming tool 550 moves (e.g., vertically), such as by the receptacle 514a being mounted to, and carried by, a series of springs 604, dampers or other flexing mechanisms, as will be discussed in greater detail below. Typically such springs 604, or the like, for movably carrying the receptacles 514a-514e are incorporated into the turntable 502.

As shown in FIG. 19, the mounting apparatus 544 includes a local controller 606 that is connected to the overall controller 516 (FIG. 10) of the manufacturing system 500 (FIG. 10) by the signal communication path 608 and/or the signal communication path 530c (FIG. 10). The local controller 606 is connected to the pneumatic cylinder 600 by way of one or more pneumatic lines 610 for controlling actuation of the pneumatic cylinder. Similarly, the local controller 606 is connected to the forming tool 550 by way of one or more electrical lines 612 for controlling features of the forming tool and monitoring the forming tool. The local controller 606 is connected to supplies of electrical power and pneumatic pressure that are not shown in the figures. The pneumatic cylinder 600 may be replaced with other types of actuators, and similarly the electrical lines 612 and pneumatic lines 610 can be replaced with any other type of suitable features.

Figure 20:
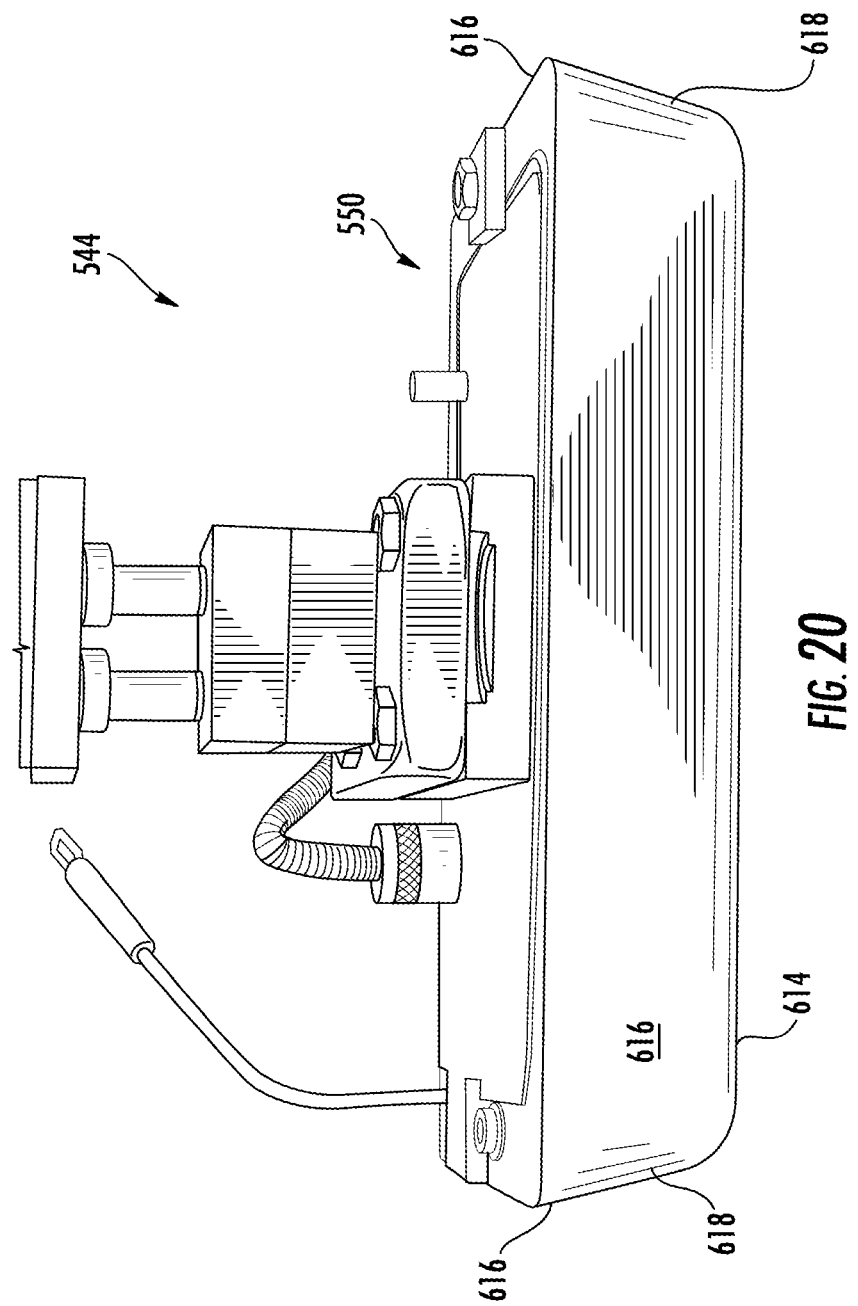
FIG. 20 is a schematic perspective view of a portion of the mounting apparatus, showing the forming tool in greater detail, in accordance with the first exemplary embodiment of the present invention.

FIG. 20 is a schematic perspective view of a portion of the mounting apparatus 544, and it shows the forming tool 550 in greater detail. As shown in FIG. 20, the forming tool 550 includes a lower face 614, and side walls 616 along with somewhat rounded corners 618 that extend upwardly/obliquely/outwardly from the periphery of the lower face. That is, the shape of the forming tool at least generally corresponds to the shape of the cavity of the preformed containers 150 (FIG. 3) and composite containers. As mentioned above, a variety of differently shaped preformed containers 150 are within the scope of the present invention. Accordingly, a variety of correspondingly differently shaped forming tools 550 are within the scope of the present invention.

Figure 21:
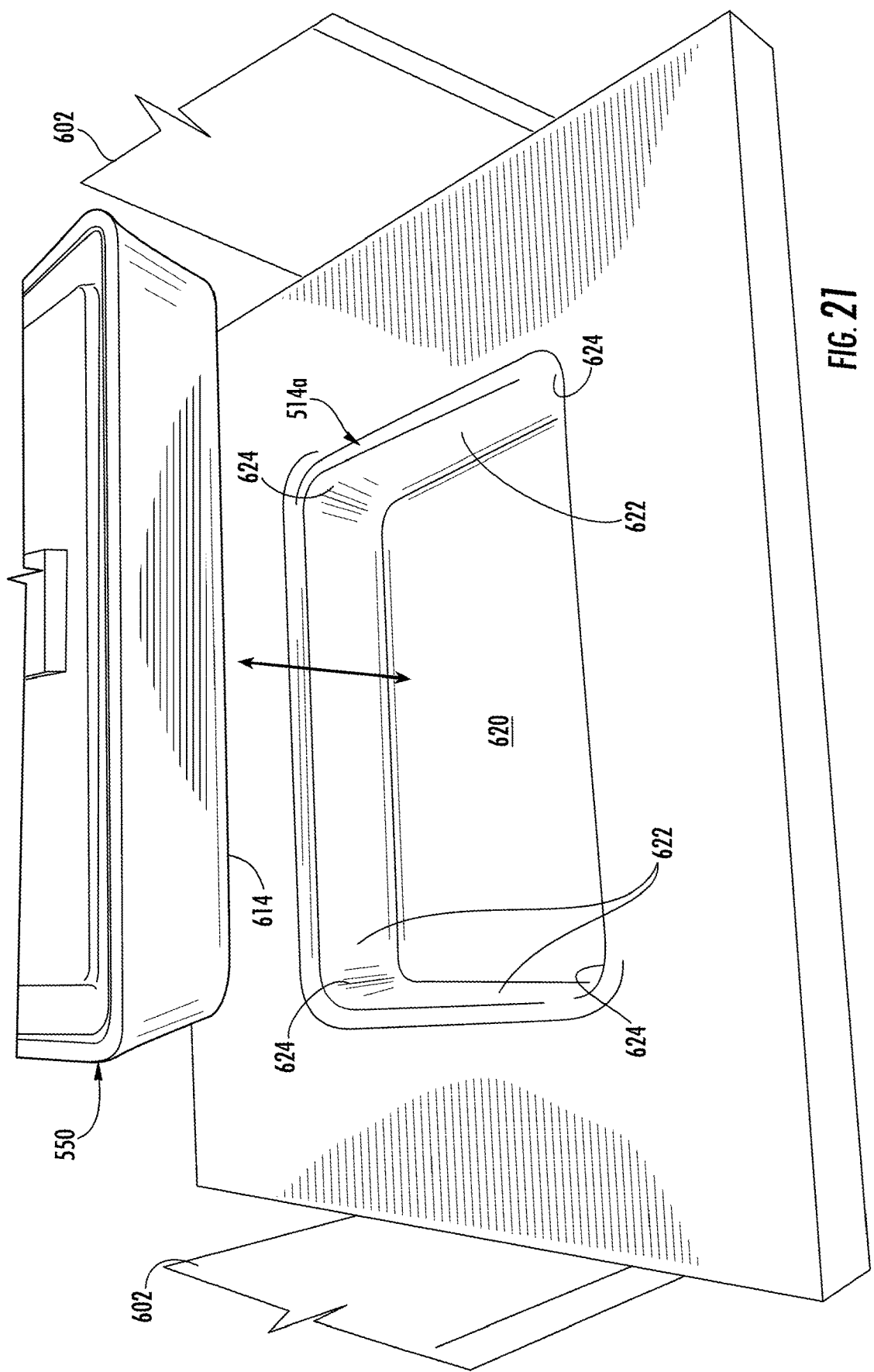
FIG. 21 is a schematic perspective view of a portion of the forming tool positioned above the representative receptacle, in accordance with the first exemplary embodiment of the present invention.

FIG. 21 is a schematic perspective view of a portion of the forming tool 550 positioned above the representative receptacle 514a. As shown in FIG. 21, the representative receptacle 514a includes a base 620, and upstanding walls 622 and somewhat rounded corners 624 that together extend around the cavity of the receptacle. The side walls 622 and corners 624 extend upwardly/obliquely/outwardly from the base 620. That is, the shape of the receptacles 514a-514e at least generally corresponds to the shape of the preformed containers 150 (FIG. 3). As mentioned above, a variety of differently shaped preformed containers 150 are within the scope of the present invention. Accordingly, a variety of correspondingly differently shaped receptacles 514a-514e are within the scope of the present invention.

Figure 22:
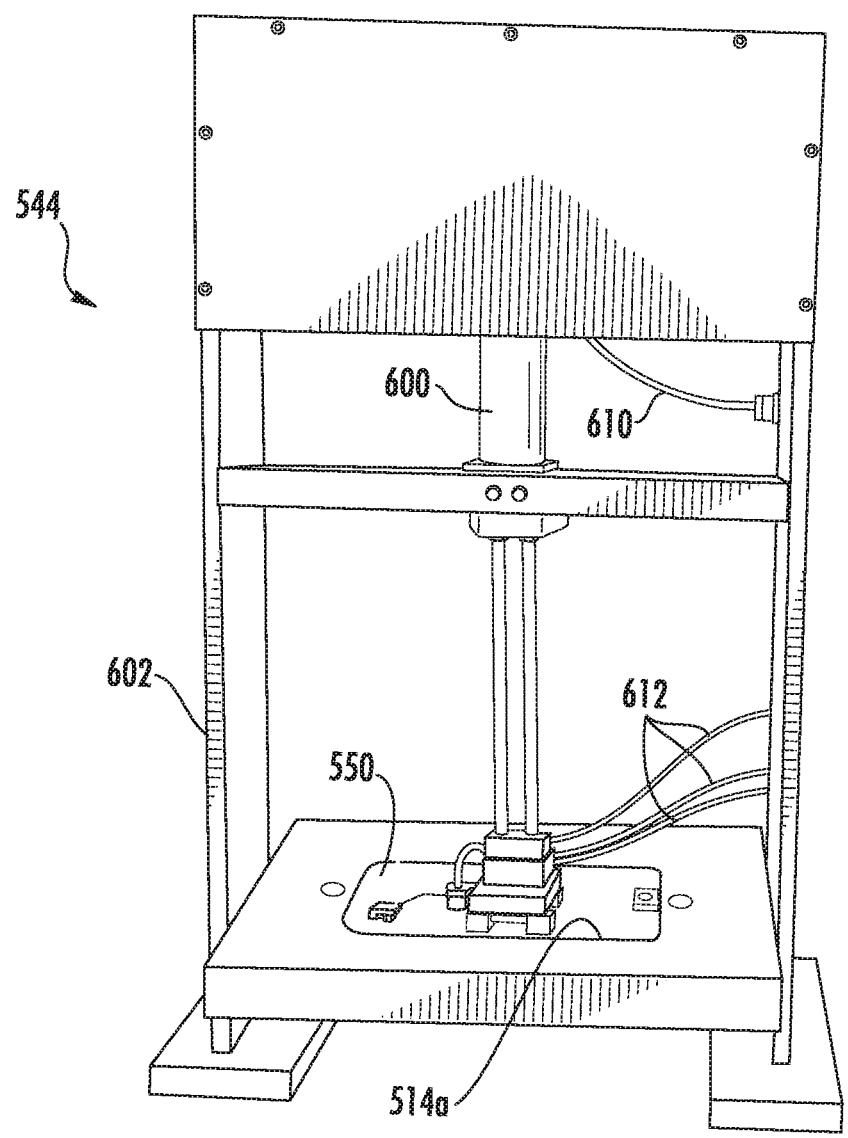
FIG. 22 is a schematic perspective view of a portion of the mounting apparatus showing the forming tool in its extended configuration, in which it extends into the representative receptacle, in accordance with the first exemplary embodiment of the present invention.

FIG. 22 is a schematic perspective view of a portion of the mounting apparatus 544, showing the forming tool 550 in its extended configuration, in which it extends into the receptacle 514a. As shown in FIGS. 19-22, the shape of the forming tool 550 at least generally corresponds to the shape of the representative receptacle 514a, although other relative configurations may be used, as will be discussed in greater detail below. More specifically and in accordance with one example, the shape and size of the forming tool 550, the shape and size of the cavity defined by the receptacle 514a, the shape and size of the cavity defined by the microwave interactive web 208 of the composite container 200, and the shape and size of the cavity defined by the preformed container 150 substantially correspond to one another, although the sizes vary sufficiently to facilitate the tightly nested configurations that are at least partially shown in FIGS. 13 and 22.

Ideally, the microwave interactive web 208 is joined to the preformed container 150 in the receptacle 514a with substantially no unbonded portions and substantially no air gaps between the microwave interactive web and the preformed container. However, each composite container 150 may exhibit dimensional variations and, therefore, may not be sealed in the same manner or to the same extent. In an effort to mitigate this variability, the receptacles 514a-514e and/or the forming tool 550 may be designed in various ways to improve the seal between the preformed containers and the microwave interactive webs. For example, all or a portion of the forming tool 550 may be formed from a somewhat compliant material, for example, a silicone elastomer or other material, to improve contact between the microwave interactive web 208 and the preformed container 150. Additionally, by using a compliant material to form the forming tool 550, it is possible to use a forming tool that initially has greater dimensions than those of the interior of the preformed container 150, thereby further improving contact between the microwave interactive web 208 and the preformed container 150. The remaining portions of the forming tool 550 may be made from a relatively light-weight, conductive material, such as aluminum or any other suitable material.

Figure 23:
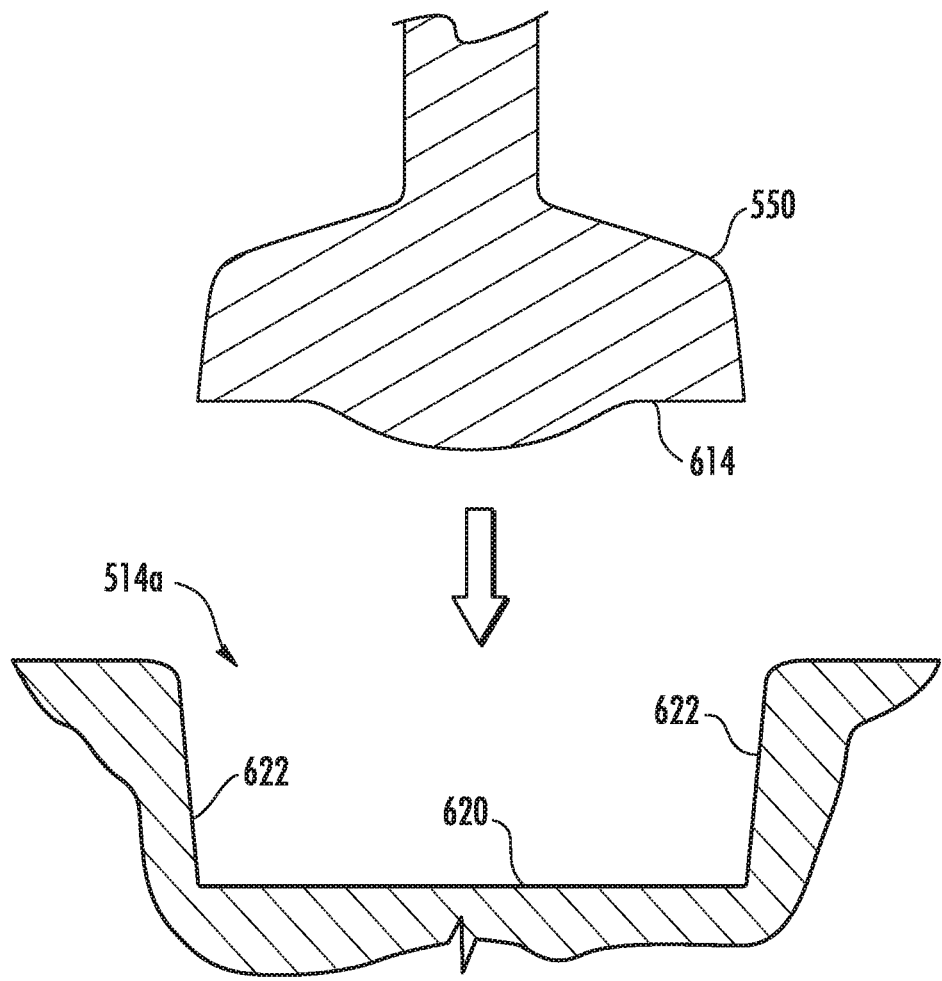
FIG. 23 is a schematic cross-sectional view showing how the forming tool and the representative receptacle can be shaped, with the cross-section being taken vertically through the center of the forming tool and the representative receptacle, and only the cross-section being shown, in accordance with the first exemplary embodiment of the present invention.

If desired, the lower face 614 of the forming tool 550 and/or the base 620 of the receptacles 514a-514e may include a protrusion (e.g., an arcuate protrusion) or otherwise be crowned, or the like, to create an initial point of contact between the microwave interactive web 208 and the preformed container 150, as shown schematically in FIG. 23. More specifically, FIG. 23 is a schematic, cross-sectional view showing how the forming tool 550 and the representative receptacle 514a can be shaped, with the cross-section being taken vertically through the center of the forming tool and the representative receptacle, and only the cross-section being shown. As the forming tool 550 advances toward the preformed container 150, the contact area between the microwave interactive web 208 and the preformed container increases from the center, thereby gradually forcing the air outwardly from between the microwave interactive web and the preformed container. As a result, a smooth, tight seal between the microwave interactive web 208 and the interior surface of the preformed container 150 may be formed.

Alternatively, the forming tool 550 may be designed to: expand in use to increase contact between the microwave interactive web 208 and preformed container 150, and then contract upon formation of the seal between the microwave interactive web and preformed container.

As another example, the receptacles 514a-514e may be designed to allow the dimensions of the receptacles 514a-514e to adjust as needed to conform to the outer dimensions of the preformed containers 150. For example, the interior of each of the receptacles 514a-514e may be formed from a flexible material, such as a natural or synthetic polymer, for example rubber, that conforms to and grips the exterior of the preformed container 150 as the forming tool 550 presses the microwave interactive web 208 against the preformed container 150.

As another example, with the representative receptacle 514a being movably mounted, such as by being mounted to the springs as shown in FIG. 19, the receptacle 514a can move to accommodate for a wide variety of variations that might occur, such as due to varying tolerances that may exist in a wide variety of the features of the present invention.

In another example, the base 620 of the representative receptacle 514a may be vertically movable relative to the side walls 622 of the representative receptacle, such as by the side walls 622 being fixedly mounted to the turntable 502 (FIG. 10) or the frame 602 (FIGS. 19, 21 and 22) and the base 620 being movably carried by the springs 604, dampers or other flexing mechanisms. This arrangement could allow the preformed container 150 to be inserted more deeply and snugly into the representative receptacle 514a. Further regarding this "self-tightening" feature, as the forming tool 550 brings the microwave interactive web 208 into contact with the preformed container 150, the preformed container is pressed further into the representative receptacle 514a against the spring-loaded bottom, and the forces typically increase as the springs are compressed, due to the increased resistance provided by the springs as they are compressed further.

In some circumstances, the composite containers may become lodged within the receptacles 514a-514e as a result of the force asserted by the forming tool 550. As such, the manufacturing system 500 may include various features to prevent the composite containers from being pressed too far into the receptacles 514a-514e. Alternatively, the manufacturing system 500 may include various features to dislodge the preformed containers if they become lodged in the receptacles 514a-514e. For example, a blocking or arresting feature (not shown) may be included within the receptacles 514a-514e to prevent the composite containers from being forced too far into the receptacles. Alternatively, one or more ejection features may be associated with the receptacles 514a-514e. For example, a mechanical ejection pin (not shown) or the like may be forced into the cavity of a receptacle to help eject a composite container from the receptacle. Similarly, one or more ports other types of openings or passages may be associated with the receptacles 514a-514e, so that compressed air or another medium can be blasted into or otherwise introduced into the cavity of a receptacle to help eject a composite container from the receptacle.

As another example and as discussed in greater detail below with reference to the third exemplary embodiment of the present invention (e.g., see the below discussion about FIG. 29), the forming tool 550 may include one or more vacuum ports for having a partial vacuum supplied to the face 614 of the forming tool to cause the microwave interactive web to be held securely by the forming tool throughout the plunge stroke. Such ports also may be used to aid in releasing the microwave interactive web from the forming tool 550 after the microwave interactive web becomes part of a composite container, such as by being used to blast compressed air or another medium against the microwave interactive web. The forming tool 550 also may include a mechanical ejection pin or other device to help the forming tool release a composite container that inadvertently becomes stuck to the forming tool.

Referring back to FIG. 10, after the composite container 200 is formed in the receptacle 514a and separated from the remnants 556 and the composite web 98 at the third position that is shown in FIGS. 11-13, the turntable 502 is rotated to the next position, so that the receptacle 514a containing the composite container 200 is adjacent to the post-treating apparatus 510. At this "fourth" position, the optional post-treating apparatus 510 can post-treat the composite container 200 in the receptacle 514a.

Figure 24:
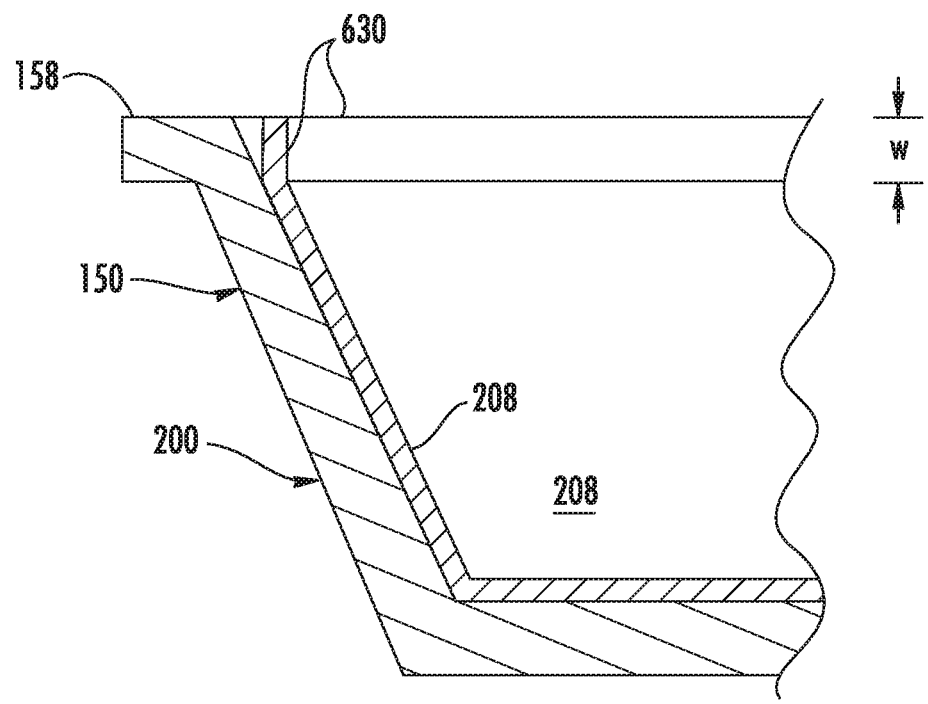
FIG. 24 is a schematic, vertical cross-sectional view of a portion of a composite container, showing how a peripheral edge of the microwave interactive web of the composite container may be a flap-like feature that is not adhered to the preformed container, in accordance with a version of the first exemplary embodiment of the present invention.

Depending upon which of the options for manufacturing the composite containers is used, and the tolerances that are chosen or otherwise exits, a peripheral edge of the microwave interactive web 208 of the composite container 200 may be a flap-like feature that is not adhered to the preformed container 150. Such an unadhered edge/flap-like feature 630 is schematically shown in FIG. 24. FIG. 24 is a schematic, vertical cross-sectional view of a portion of the composite container 200, showing how a peripheral edge of the microwave interactive web 208 of the composite container may be a flap-like feature 630 that is not adhered to the preformed container 150, in accordance with a version of the first exemplary embodiment of the present invention. As partially shown in FIG. 24, the flap-like feature 630 can extend around the entire periphery of the microwave interactive web 208. Alternatively, the flap-like feature 630 may not be formed, or it may only be formed at one or more segments of the periphery of the microwave interactive web 208 that are spaced apart from one another.

Figure 25:
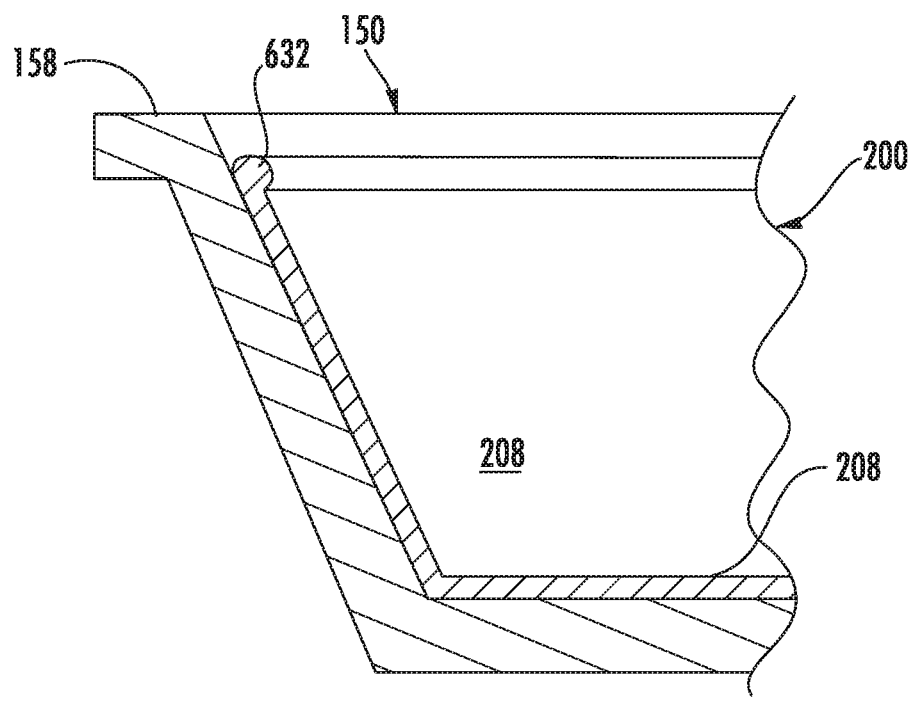
FIG. 25 is like FIG. 24, except that the flap-like feature has been transformed into a bead, such as through a post-treatment heating process, in accordance with a version of the first exemplary embodiment of the present invention.

The post-treating carried out by the post-treating apparatus 510 (FIG. 10) can be a heat treatment. In this regard, FIG. 25 is like FIG. 24, except that it shows that the flap-like feature 630 has been transformed into a bead 632, such as through a post-treatment heating process, in accordance with a version of the first exemplary embodiment of the present invention. As partially shown in FIG. 25, the bead 632 can extend around the entire periphery of the microwave interactive web 208. Alternatively, the bead 632 may not be formed, or it may only be formed at one or more segments of the periphery of the microwave interactive web 208 that are spaced apart from one another. The bead 632 is typically in the form of a small globular or cylindrical or bulbous body. As apparent from comparing FIGS. 24 and 25, the bead 632 is typically shorter and fatter/thicker than the flap-like feature 630 from which it was formed. That is, the bead 632 is typically thicker than the microwave interactive web 208, or at least thicker than the polymer film substrate 112 of the microwave interactive web 208.

In some situations, it may be desirable to ensure that the portion of the microwave interactive web 208 that includes any microwave interactive material is securely adhered to the previously formed container 150 such that the flap-like feature 630 consist solely of the polymer film substrate 112. In these situations, the bead 632 will be formed solely from the polymer film substrate 112. Nonetheless, different configurations are also within the scope of the present invention, as discussed in greater detail below.

FIGS. 24 and 25 are schematic because, for example, they exaggerate the flap-like feature 630 and bead/feature 632. For example, in practice, the bead 632 would be small and barely noticeable with the naked eye. The bead 632 will typically accumulate at the boundary where the film substrate 112 has been well adhered to the interior surface of the preformed tray 150 or the flange 158 of the preformed tray. In accordance with one example of the first embodiment, the film substrate 112 may be very thin (e.g., about 0.00048 inches thick) and the width W (FIG. 24) of the flap-like feature 630 may be less than ⅜ of an inch; therefore, a very small volume per lineal inch of film edge (approximately 0.00018 cubic inches per lineal inch) would constitute the bead 632 left after shrinkage of the flap-like feature 630.

As alluded to above, the shrinkage of the flap-like feature 630, which creates the bead 632, or the like, can be caused by the application of heat. In one example, the flap-like feature 630 is exposed to sufficient heat to raise its temperature above its heat set temperature, which causes rapid and significant shrinkage of the flap-like feature 630, so that it is transitioned into the bead 632, or the like. A short duration of heat application may be sufficient to cause this shrinkage, for example because the thermal mass of the flap-like feature 630 of the film substrate 112 is small compared to that of the flange 158 and body of the composite container 200.

The post-treating apparatus 510 (FIG. 10) can include a downwardly open chamber that defines a cavity that is open to and in receipt of the composite container 200 in the receptacle 514a while the receptacle 514a is in the fourth position. The chamber of the post-treating apparatus 510 can be in the form of an oven that includes one or more heating elements, blowers or any other suitable mechanism for heating the composite container 200 in the receptacle 514a. For example, the post-treating apparatus 510 can operate such that the entire cavity of the post-treating apparatus is heated to about the same temperature, or the increased temperature may be directed more specifically to the area where it is desired (i.e., the flap-like feature 630), such as through the use of one or more electromechanical devices designed to (and mounted for) blowing hot air at the targeted areas. More specifically, each of the electromechanical devices can include coils of wire, which have a high electric resistivity and that heat rapidly as current flows through them, a fan that blows ambient through the hot coils, and a passageway through which the heated air is directed to the targeted area. More generally these electromechanical devices can be referred to as hot air guns. The heating with the post-treating apparatus 510 can also or alternatively be provided by way of gas flames.

As mentioned above, it may be desirable in some situations for the entire portion of the microwave interactive web 208 that includes the microwave interactive material (e.g., the first and second microwave interactive elements 212, 214 of FIGS. 4 and 14) to be securely adhered to the previously formed container 150 such that the flap-like feature 630 consist solely of the polymer film substrate 112. On the other hand, in some situations the flap-like feature 630 can include a thin layer of microwave interactive material that tends to absorb microwave energy, thereby generating heat when exposed to microwave energy. For example, the microwave interactive web 208 may be or include a MICRORITE® susceptor available from Graphic Packaging International, Inc. (Marietta, Ga.), and the flap-like feature 630 may include a portion of this or another type of susceptor. When the flap-like feature 630 includes a thin layer of microwave interactive material that tends to absorb microwave energy, the post-treating apparatus 510 may be at least generally in the form of a microwave oven, or the like, so that the susceptor-like flap-like feature 630 shrinks to form/transforms into the bead 632 in response to being exposed to a short application of microwave energy. The heating of the flap-like feature 630 that transforms it into the bead 632 typically occurs prior to loading the composite container 200 with contents such as food (not shown).

Referring back to FIG. 10, after the composite container 200 is post-treated at the fourth position, the turntable 502 is rotated to the next position, so that the receptacle 514a containing the composite container 200 is adjacent to the receiving apparatus 512. At this "fifth" position, the composite container 200 is removed from the receptacle 514a and stacked in a nested configuration for later use or otherwise prepared for further processing. The receiving apparatus 512 can be any suitable device for removing the composite container 200 from the turntable 502. For example, a pick-and-place machine, such as described above, may be used. After the turntable 502 comes to rest with the receptacle 514a in the fifth position, the composite container 200 within the receptacle 514a is grasped and removed from the receptacle such as by the pick-and-place machine. It then may be placed in a nested stack 634 that is processed using any conventional devices or equipment. For instance, the nested stack 634 may be manipulated by an indexing conveyor system in which a counting device detects that the stack 634 has reached the correct height and quantity and signals the conveyor to move the finished stack 634 to another location for subsequent processing or shipping. A new stack is started, and the cycle repeats itself.

In another example, the receiving apparatus 512 can be an "up-stacking" mechanism located proximate the final position, in this example, the fifth position. In this example, the finished composite container 200 is pushed upward and out of the receptacle 514a and directly into the stack 634 that is being formed directly above the receptacle 514a. As discussed immediately above, when the stack 634 of composite containers 200 reaches the correct height and count, it is repositioned and a new stack is started.

The operations described above with respect primarily to the receptacle 514a are repeated numerous times in a serial fashion for each of the receptacles 514a-514e so that the manufacturing system 500 creates numerous composite containers 200 in a serial fashion. As one example, the computer processor, or the like, of the central controller 516 can run/execute a software program/one or more software modules that are affective so that the central controller 516 is responsive to and/or respectively provides signals over the signal communication paths of the manufacturing system 500 with respect to local controllers of the manufacturing system to control and coordinate the operations of the manufacturing system. Those of ordinary skill in the art will be able to provide suitable hardware and software for these purposes. Whereas the overall control of the manufacturing system 500 is described above as being dominated by electronic hardware and software, or the like, at least some of the overall control system of the manufacturing system 500 can alternatively include one or more of mechanical or pneumatic control systems, or any other type of suitable control systems.

One of the numerous advantages of the manufacturing system 500 and associated methods of the present invention is that they can provide flexibility in the manufacture of composite containers. As one example of this flexibility, a multi-compartment container with more than one cavity (e.g., a container with one or more interior walls or dividers that separate the cavities/food items or multiple servings of a particular food item) can have different types of microwave interactive webs respectively mounted in its cavities, with the mounting of each of the webs in its respective cavity being carried out generally as described above. For example and referring to FIG. 10, there could be two or more of the installing apparatuses 508 that are side by side at the third position. Alternatively, multi-compartment containers could be supplied to the manufacturing system 500 two or more times, with the manufacturing system reconfigured accordingly for the first and subsequent passes through the manufacturing system, so that the different cavities of a container respectively have microwave interactive webs mounted therein during the container's passes through the manufacturing system.

Figure 26:
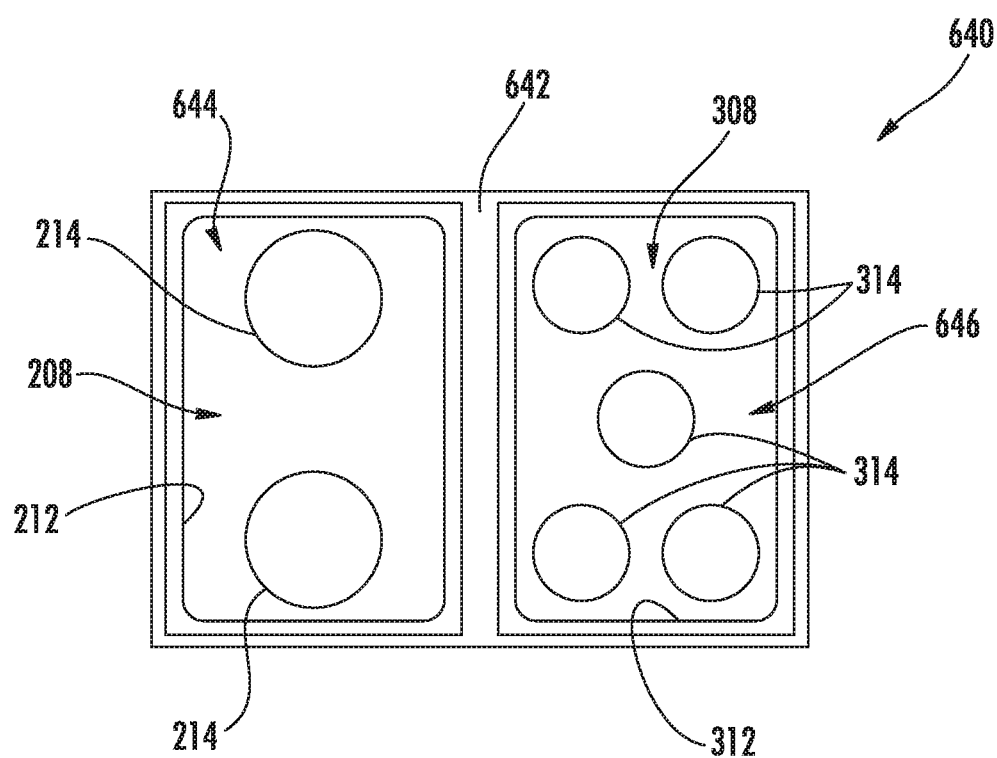
FIG. 26 is a schematic, top plan view of a multi-compartment composite container in accordance with a version of a second embodiment of the present invention.

As one specific example, FIG. 26 is a schematic top plan view of a multi-compartment composite container 640 in accordance with a version of a second exemplary embodiment of the present invention. The second embodiment is like the first embodiment, except for variations noted and variations that will be apparent to those of ordinary skill in the art. For example, the multi-compartment composite container 640 is like the above-discussed composite containers, except that it includes an upright barrier 642 (e.g., a middle wall), or the like, so that the multi-compartment composite container includes two cavities that are side by side. As schematically shown in FIG. 26, a first cavity 644 of the two cavities has mounted therein a microwave interactive web 208 of the type discussed above with reference to FIGS. 4 and 14, whereas the second cavity 646 of the two cavities has mounted therein a microwave interactive web 308 of the type discussed above with reference to FIG. 8. Accordingly, the microwave interactive web 208 in the first cavity 644 may be distinct from the microwave interactive web 308 in the second cavity 646. Alternatively, the microwave interactive web 208 in the first cavity 644 may be similar to or the same as the microwave interactive web 308 in the second cavity 646. In accordance with an alternative embodiment that is not illustrated in the drawings, the microwave interactive webs 208, 308 that are distinct from one another are positioned in the same cavity.

In the embodiment of FIG. 26, each of the microwave interactive webs 208, 308 may be mounted in its respective cavity 644, 646 at least generally as discussed above for the first embodiment of the present invention, such that the microwave interactive webs of the multi-compartment composite container 640 are typically not directly connected to one another. In addition, any of the microwave interactive webs disclosed herein can be substituted for the microwave interactive webs shown mounted in the first and second cavities 644, 646, and either of the first and second cavities may not have any microwave interactive web mounted therein, such that a wide variety of combinations are possible. Although the first and second cavities 644, 646 are about the same size in FIG. 26, they can be differently sized and there can be more than two cavities in the same multi-compartment composite container. That is, a variety of differently shaped multi-compartment containers, with different numbers of cavities and different microwave interactive webs, are within the scope of the present invention.

Figure 27:
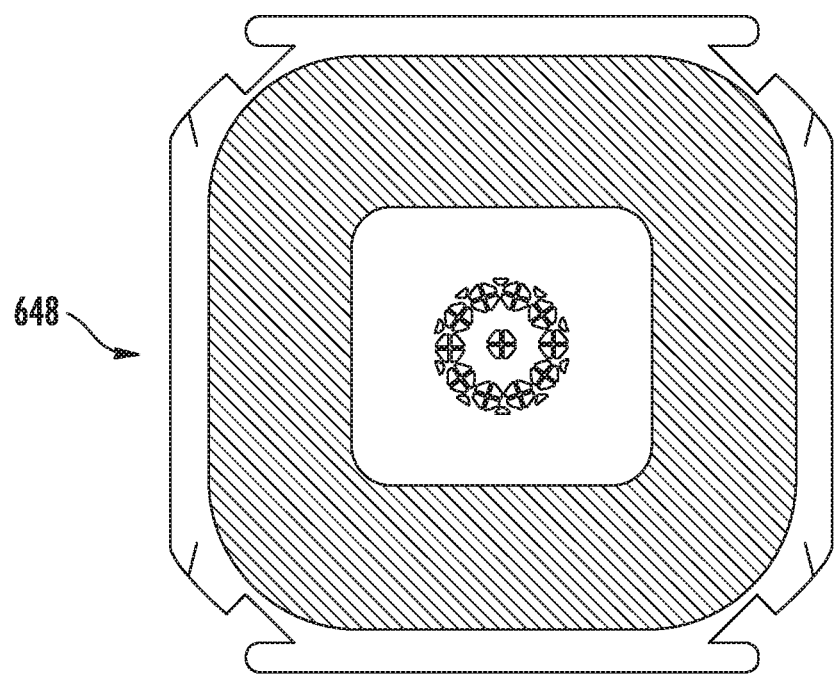
FIG. 27 is a schematic, isolated top plan view of a microwave interactive web in a flat configuration, wherein this microwave interactive web replaces one of the microwave interactive webs shown in FIG. 26, in accordance with a second version of the second embodiment of the present invention.
Figure 28:
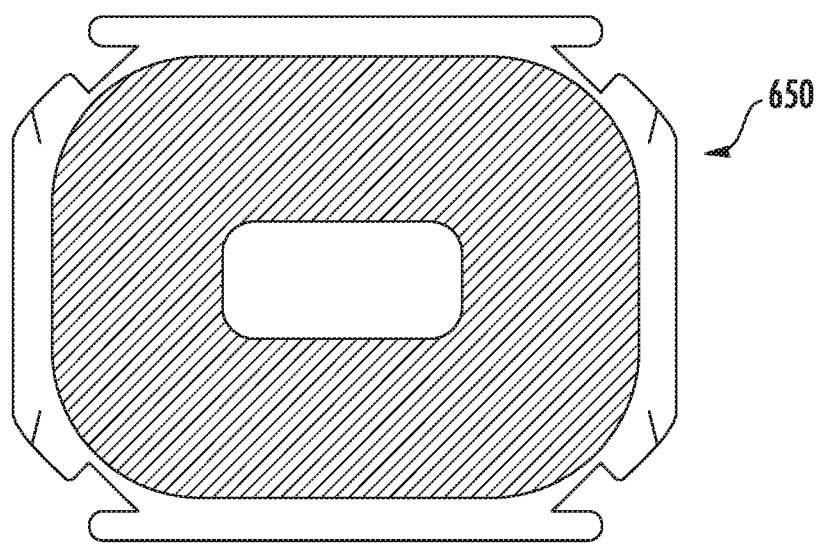
FIG. 28 is a schematic, isolated top plan view of a microwave interactive web in a flat configuration, wherein this microwave interactive web replaces one of the microwave interactive webs shown in FIG. 26, in accordance with the second version of the second embodiment of the present invention.

In accordance with a second version of the second embodiment, the microwave interactive webs 648, 650 schematically shown in FIGS. 27 and 28 are respectively substituted for the microwave interactive webs 208, 308 mounted in the first and second cavities 644, 646 of the multi-compartment composite container 640 of FIG. 26 to create a different multi-compartment composite container. In accordance with the second version of the second embodiment, the preformed multi-compartment composite container is formed from polyethylene terephthalate, for example coextruded polyethylene terephthalate, and the microwave interactive webs are a patterned foil film (7 micron thick aluminum on 48 gauge PET). In the second multi-compartment composite container, the cavity having the microwave interactive web 648 of FIG. 27 mounted therein can be characterized as a first compartment, and in one example meatloaf (not shown) or another meat product is contained in the first compartment. The cavity having the microwave interactive web 650 of FIG. 28 mounted therein can be characterized as a second compartment, and in one example potatoes or other vegetables are contained in the second compartment.

In the foregoing, the preformed containers (e.g., preformed container 150 of FIG. 3) were originally and more generally referred to as preformed supports. The preformed supports may, in isolation, not be in the form of containers (e.g., they may include holes, or other openings such that the containers are not formed until the preformed supports and the microwave interactive webs are mounted together. In one example, the microwave interactive webs comprise a "shrink film", and an exemplary method includes overlying a preformed support with the microwave interactive web, and activating the web (i.e., the shrink film) to create a uniform, tight seal between the microwave interactive web and the support, and thereby create a container (e.g., a composite container or a multi-compartment composite container that is at least generally as described above).

Figure 29:
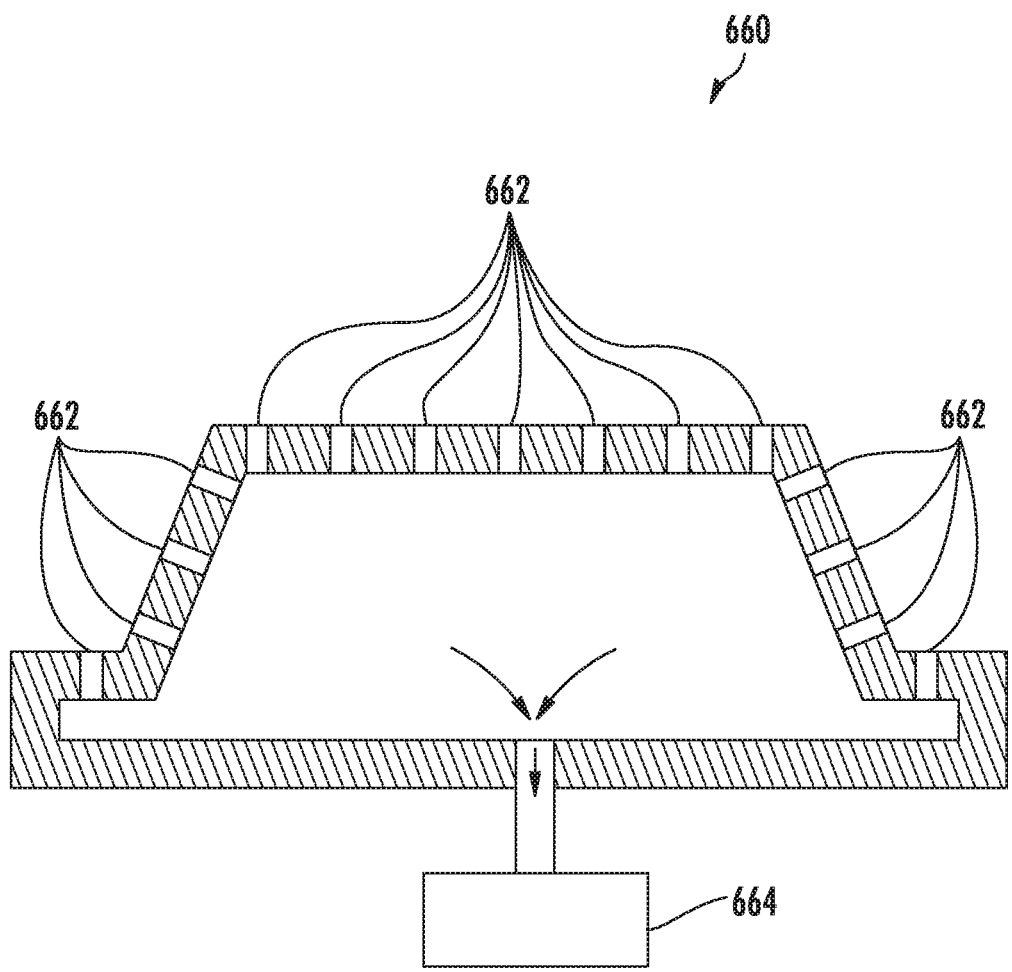
FIG. 29 is a schematic, partially cross-sectional view of a forming tool associated with a vacuum pump, or the like, in accordance with a third exemplary embodiment of the present invention.

A third exemplary embodiment of the present invention is like the first embodiment and/or second embodiment, except for variations noted and variations that will be apparent to those of ordinary skill in the art. FIG. 29 is a schematic, partially cross-sectioned view of a forming tool 660 associated with a vacuum pump 664, or the like, in accordance with the third exemplary embodiment of the present invention. As generally shown in FIG. 29, the face of the forming tool 660 of the third embodiment is shaped at least generally like the face of the forming tool 550 of the first embodiment, except that the forming tool 660 further includes vacuum ports 662 to which a partial vacuum is supplied by way of a chamber within the forming tool 660 and the vacuum pump 664, or the like. As shown in FIG. 29, the vacuum pump 664 draws air from the internal chamber of the forming tool 660 that is in communication with the vacuum ports 662.

Figure 30:
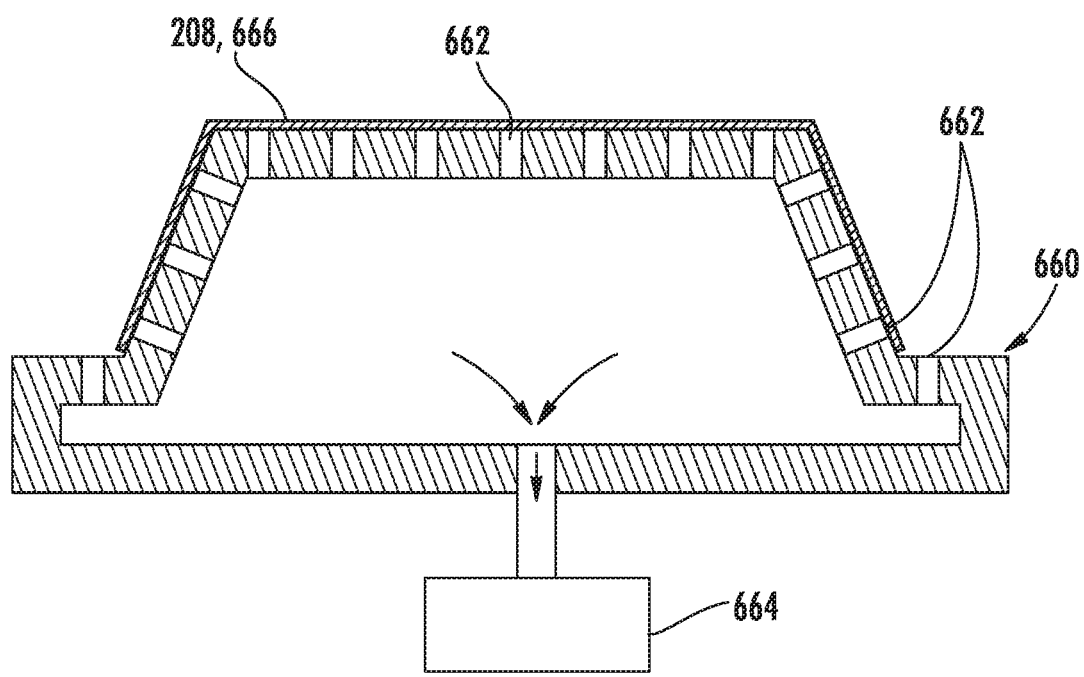
FIG. 30 is like FIG. 29, except that a microwave interactive web is shown drawn to the face of the forming tool, so that the microwave interactive web is conformed to the shape of the face of the forming tool to create a three-dimensional microwave interactive structure.
Figure 31:
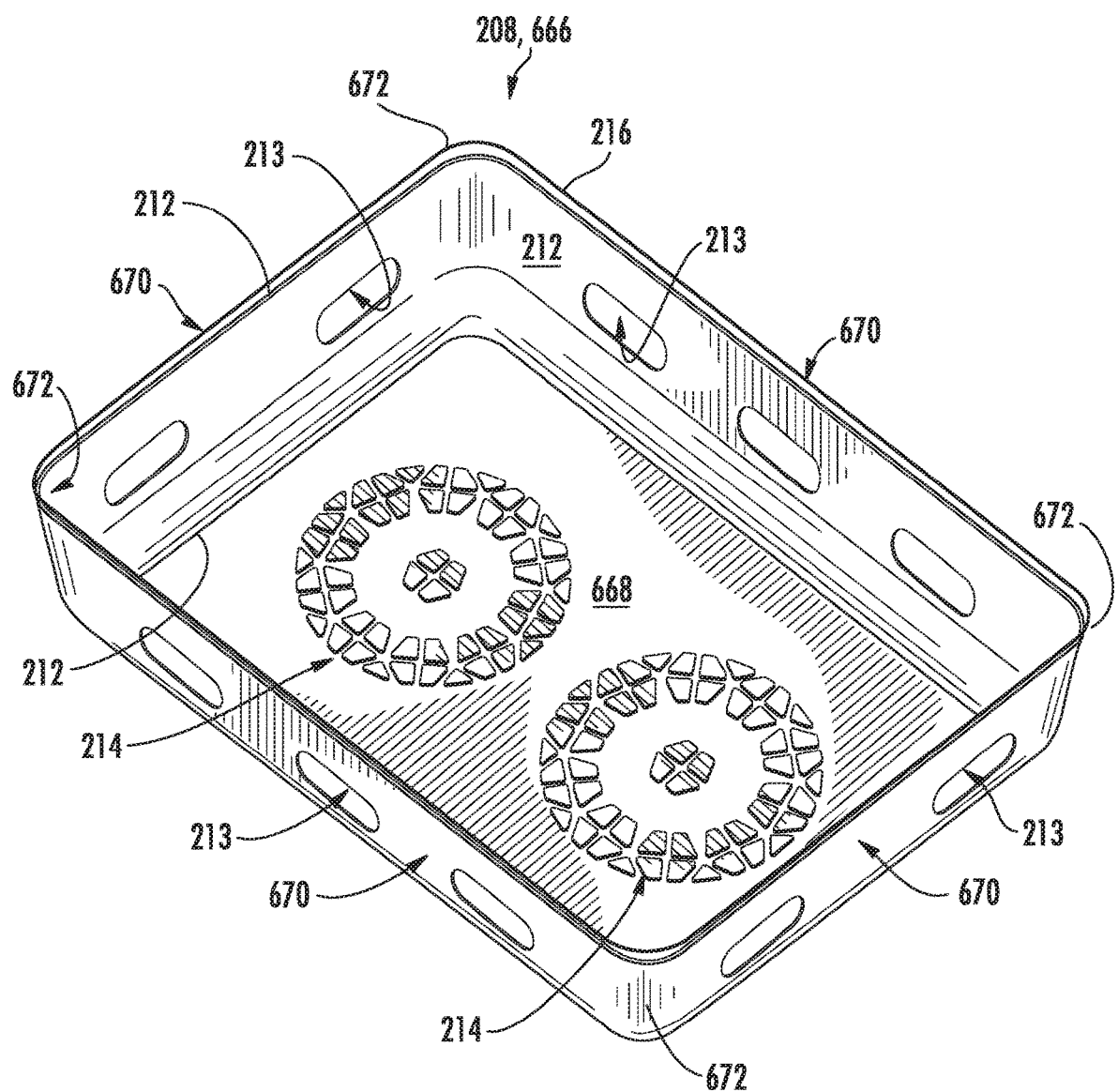
FIG. 31 is a schematic, isolated perspective view of the three-dimensional microwave interactive structure of FIG. 30.

In accordance with the third embodiment, any of the above-discussed microwave interactive webs, such as the microwave interactive web 208 of FIG. 14, can be placed over or otherwise associated with the face of the forming tool 600 while the partial vacuum is provided to the face of the forming tool. For example, FIG. 30 shows the microwave interactive web 208 drawn to the face of the forming tool by the partial vacuum supplied to the face of the forming tool, so that the microwave interactive web is conformed to the shape of the face of the forming tool to create a three-dimensional microwave interactive structure 666. FIG. 31 is a schematic, isolated perspective view of the three-dimensional microwave interactive structure 666 of FIG. 30. As apparent from FIGS. 30 and 31, the forming tool 660 extends into and shapes the cavity of the three-dimensional microwave interactive structure 666. The three-dimensional microwave interactive structure 666 includes a base 668 as well as walls 670 and corners 672 that together extend around the cavity of the three-dimensional microwave interactive structure. The walls 670 and corners 672 extend obliquely/outwardly from the base 668.

In one acceptable example of a first version of the third embodiment, the composite container 200 of FIG. 4, or a composite construct that is at least generally like the composite container 200 of FIG. 4, is formed by mounting (e.g., adhering) the preformed container 150 of FIG. 3 to the three-dimensional microwave interactive structure 666 while the three-dimensional microwave interactive structure is held to the face of the forming tool 660. As one option, the microwave interactive web 208/three-dimensional microwave interactive structure 666 may have a heat seal coating or other adhesive applied to the surface thereof that is facing away from the forming tool 660. More generally, the adhering can be facilitated by an adhesive material, heat seal coating, thermal bonding, ultrasonic bonding, or any other suitable technique. The forming tool 660 may be heated if needed or desired, for example, to activate a heat seal coating used to mount the preformed container 150 to the three-dimensional microwave interactive structure 666.

Figure 32:
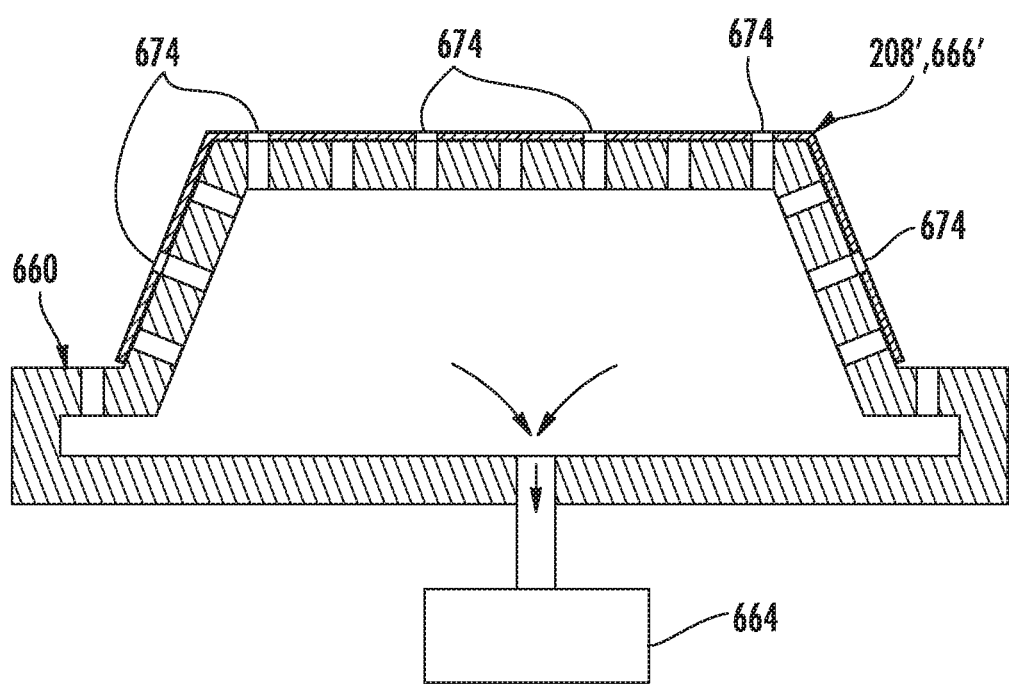
FIG. 32 is like FIG. 30, except that the three-dimensional microwave interactive structure drawn to the face of the forming tool includes holes, in accordance with a second version of the third exemplary embodiment of the present invention.
Figure 34:
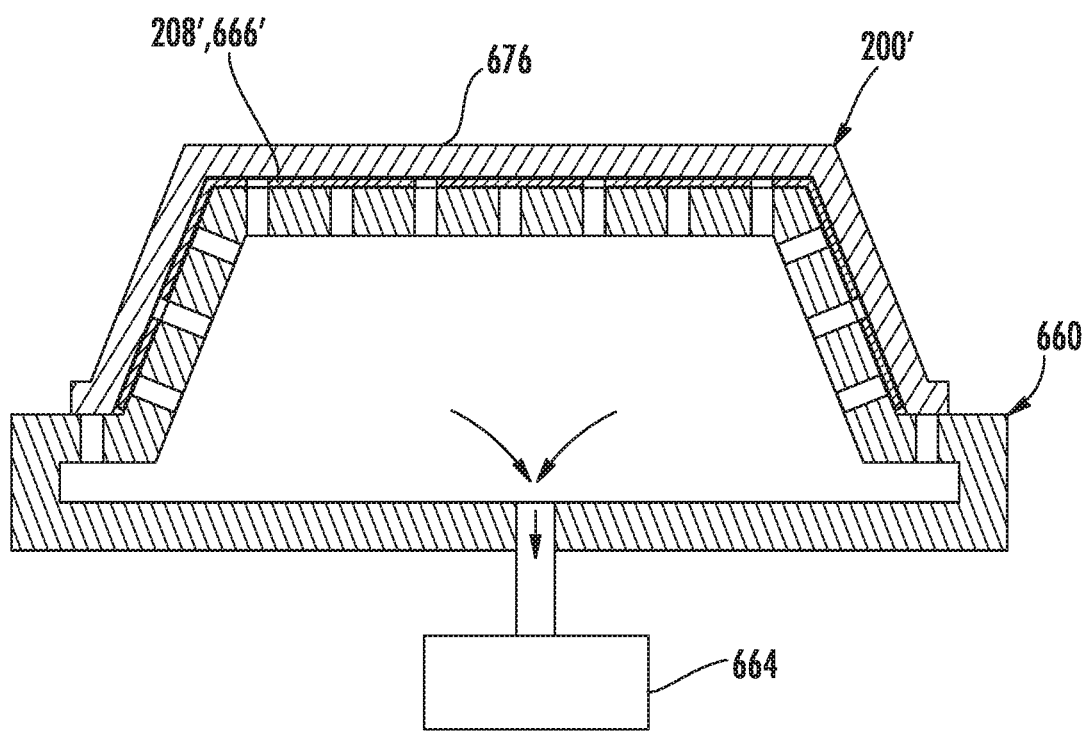
FIG. 34 is like FIG. 33, except for showing that the polymer sheet has been joined to the three-dimensional microwave interactive structure to create a composite container.

In one example of a second version of the third embodiment, a composite container 200' (FIG. 34) that is like the composite container 200 of FIG. 4, except for variations noted and variations that will be apparent to those of ordinary skill in the art. The composite container 200' is formed through the use of a modified microwave interactive web 208' and three-dimensional microwave interactive structure 666' that are respectively like the above-discussed microwave interactive web 208 and three-dimensional microwave interactive structure 666 of the first version of the third embodiment except for having slits or other physical apertures 674 extending completely therethrough, as shown in FIG. 32. The apertures 674 are sufficient in number and/or arrangement so that the partial vacuum at the face of the forming tool 660 both draws the microwave interactive web 208' and the three-dimensional microwave interactive structure 666' to the face of the forming tool 660 and causes a partial vacuum to be present at the face of the three-dimensional microwave interactive structure 666' that faces away from the face of the forming tool 660. The microwave interactive web 208'/three-dimensional microwave interactive structure 666' may have a heat seal coating or other adhesive material on its side that faces away from the forming tool 660.

Figure 33:
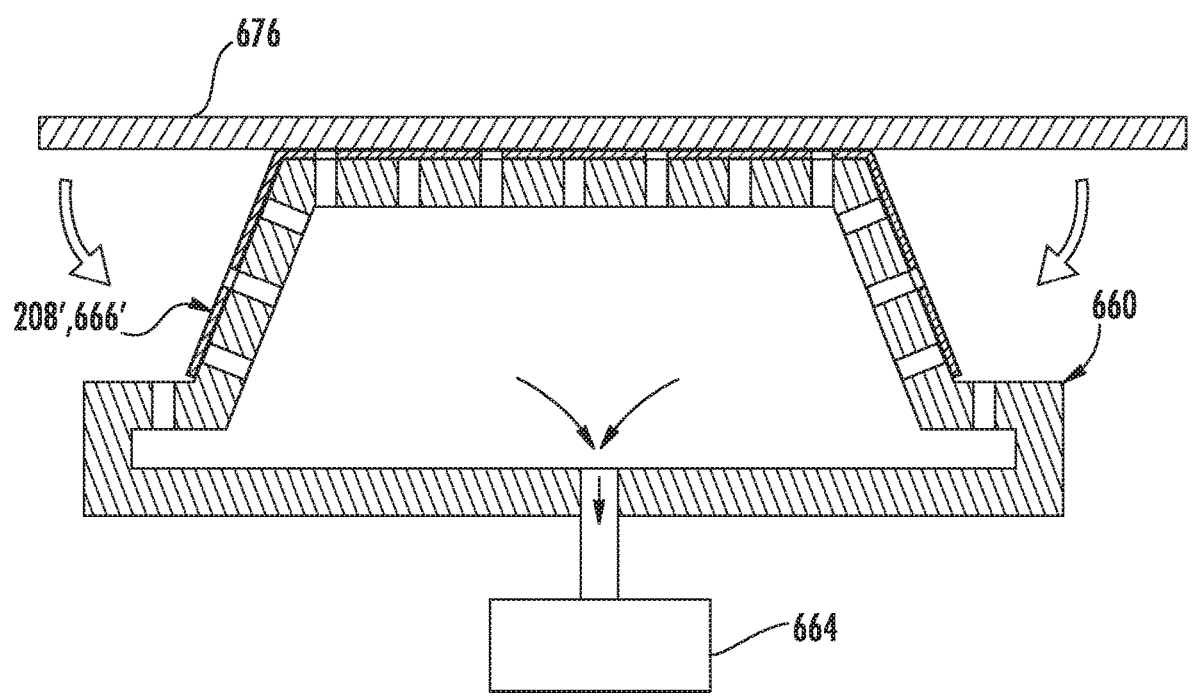
FIG. 33 is like FIG. 32, except that it further illustrates a polymer sheet that is schematically shown as being drawn toward the three-dimensional microwave interactive structure.

As schematically shown in FIG. 33, a polymer sheet 676, for example, a sheet of polyester or coextruded polyethylene terephthalate, is placed over the microwave interactive web 208'/three-dimensional microwave interactive structure 666'. Typically the polymer sheet 676 will be heated to a sufficient degree (or otherwise processed) so that it is sufficiently flexible so that the partial vacuum draws the polymer sheet toward the three-dimensional microwave interactive structure 666' and forms the polymer sheet 676 into the desired shape. In doing so, the polymer sheet 676 and the three-dimensional microwave interactive structure 666' are joined with the heal seal coating or adhesive, or by any other acceptable means, to form the composite container 200' schematically shown in FIG. 34. Typically after the polymer sheet 676 has been adhered to the three-dimensional microwave interactive structure 666' and conformed to the shape of the forming tool 660, the polymer sheet is allowed to cool enough (or is otherwise processed) so that it becomes sufficiently rigid to remain in the shape it has adopted from the forming tool. Then, the composite container 200' is removed from the forming tool 660, so that the next three-dimensional microwave interactive structure 666' and composite container 200' can be formed thereon.

It is also within the scope of the present invention for the composite containers (including the multi-compartment composite containers) to have the microwave interactive webs respectively mounted to the exterior surfaces (instead of the interior surfaces) of the corresponding supports (e.g., preformed containers).

It will be understood by those skilled in the art that while the present invention has been discussed above with reference to exemplary embodiments and examples of versions of the embodiments, various additions, modifications and changes can be made thereto without departing from the spirit and scope of the invention as set forth in the following claims.

What is claimed is:

1. A system for at least forming constructs that include microwave interactive material, the system comprising:
   a container transporting apparatus serially moving containers along a first path of travel;
   a web transporting apparatus serially moving microwave interactive webs along a second path of travel, wherein at least a portion of the first path of travel and a portion of the second path of travel are superposed with respect to one another so that the containers and microwave interactive webs are superposed with respect to one another in a serial fashion; and
   a mounting apparatus mounting at least one of the microwave interactive webs to at least one of the containers while the at least one of the microwave interactive webs and the at least one of the containers are in a superposed arrangement with respect to one another, wherein the mounting apparatus includes a forming tool having a first position in which the forming tool is in contact with the at least one of the microwave interactive webs in a flat configuration and having a second position in which the forming tool presses the at least one of the microwave interactive webs into an interior of the at least one of the containers so that the at least one of the microwave interactive webs conforms to the forming tool and to the at least one of the containers, the forming tool press-forms a cavity of the at the at least one of the microwave interactive webs when the forming tool is moved from the first position to the second position so that the cavity is present during the mounting of the at least one of the microwave interactive webs to the at least one of the containers, and the forming tool extends into the cavity of the at least one of the microwave interactive webs when the forming tool is in the second position.

2. The system according to claim 1, wherein
   the container transporting apparatus comprises a conveyor including a plurality of receptacles configured for serially traveling along an endless path,
   the system further includes a supplying apparatus for depositing the containers in the receptacles, so that the receptacles carry the containers;
   the mounting apparatus is positioned along the endless path so that the receptacles carry the containers, with the microwave interactive webs respectively mounted thereto, in a downstream direction along the endless path and away from the mounting apparatus; and
   the system further includes a receiving apparatus that is positioned along the endless path at a position downstream from the mounting apparatus, with the receiving apparatus being for receiving the containers, with the microwave interactive webs respectively mounted thereto, from the container transporting apparatus.

3. The system according to claim 2, further comprising a treating apparatus positioned along the endless path at a position between the mounting apparatus and the receiving apparatus, wherein the treating apparatus is for treating at least marginal edges of the microwave interactive webs of the containers.

4. The system according to claim 1, wherein the forming tool comprises a pusher for pushing the at least one of the microwave interactive webs at least partially into a cavity of the at least one of the containers.

5. The system according to claim 4, wherein the pusher is mounted for reciprocating along an axis.

6. The system according to claim 1, further comprising a cutting apparatus for cutting the at least one of the microwave interactive webs, wherein the forming tool extends through a central opening in the cutting apparatus and is moved relative to the cutting apparatus when the forming tool is in the second position.

7. The system according to claim 1, wherein the container transporting apparatus is in the form of a rotary turntable, the first path of travel is a circular path of travel defined by the rotary turntable, and the second path of travel extends above and crosses the first path of travel.

8. A system for forming containers including microwave interactive material, the system comprising:
   an installing apparatus including a forming tool;

a web transporting apparatus serially providing microwave interactive webs to the installing apparatus with the microwave interactive webs in a flat configuration; and a support transporting apparatus serially supplying supports to the installing apparatus, wherein the installing apparatus is operative to serially combine the microwave interactive webs and the supports to form the containers, so that each container includes at least one of the supports supporting at least one of the microwave interactive webs, with the at least one of the microwave interactive webs extending at least partially around and at least partially defining a cavity of the container, and the forming tool has a first position in which the forming tool is in contact with the at least one of the microwave interactive webs in the flat configuration and has a second position in which the forming tool extends at least partially into the cavity of the container to at least partially facilitate mounting of the at least one of the microwave interactive webs to the at least one of the supports, wherein the forming tool contacts and presses the at least one of the microwave interactive webs into an interior of the at least one of the supports and against the at least one of the supports to press-form the cavity of the container so that the at least one of the microwave interactive webs conforms to the forming tool and to the at least one of the supports.

9. The system according to claim 8, further comprising a treating apparatus for serially treating the containers, with the treating of the containers comprising treating at least marginal edges of the microwave interactive webs of the containers.

10. The system according to claim 8, wherein the installing apparatus, the web transporting apparatus and the support transporting apparatus are cooperative so that the at least one of the microwave interactive webs is positioned between the forming tool and the at least one of the supports.

11. The system according to claim 8, wherein:

the web transporting apparatus, which is for supplying the microwave interactive webs to the to the installing apparatus, comprises a reel for carrying a roll from which a composite web, which includes the microwave interactive webs, is drawn; and the system comprises a cutter for cutting the microwave interactive webs from the composite web.

12. The system according to claim 11, wherein:

the composite web and the cutter are cooperative so that remnants of the composite web result from the cutting the composite web; and the system further comprises a remnant collector for collecting at least some of the remnants of the composite web.

13. The system according to claim 12 wherein the remnant collector comprises a reel for rolling the remnants onto a roll.

14. The system according to claim 8, wherein:

the support transporting apparatus includes at least one receptacle having at least one cavity;

the forming tool and the receptacle are mounted with respect to one another so that there can be relative movement between the forming tool and the receptacle so that the forming tool and the receptacle can be transitioned between the second position in which the forming tool is at least partially inserted into the cavity of the receptacle, and a retracted configuration in which the forming tool is at least partially retracted from the cavity; and the installing apparatus includes at least one actuator for causing relative movement between the forming tool and the receptacle, to transition between the retracted and inserted configurations.

15. The system according to claim 14, wherein at least one of the forming tool and the receptacle is heated.

16. The system according to claim 14, wherein:

the installing apparatus further includes an apparatus for creating a partial vacuum at a face of the forming tool; and the face of the forming tool is for being in opposing face-to-face relation with the microwave interactive webs.

17. The system according to claim 8, wherein the installing apparatus further comprises a cutting apparatus for cutting the at least one of the microwave interactive webs, wherein the forming tool extends through a central opening in the cutting apparatus and is moved relative to the cutting apparatus when the forming tool is in the second position.

18. A system for forming at least one container including microwave interactive material, the system comprising:

a die plate positioned above an anvil;

first pleating plates mounted to the die plate and second pleating plates mounted to the anvil for releasably holding at least one microwave interactive web;

an apparatus supporting at least one support; and a forming tool having a first position and a second position, wherein the forming tool is in contact with the microwave interactive web in the flat configuration in the first position, the forming tool moves relative to the apparatus, the die plate, and the anvil when moved from the first position to the second position to thereby move the microwave interactive web relative to the support and at least partially form the container, so that the forming tool extends at least partially into a cavity of the container and the microwave interactive web conforms to the forming tool and to the support, wherein the first pleating plates and the second pleating plates cooperate for at least tensioning the microwave interactive web while the forming tool moves the microwave interactive web relative to the support.

19. The system according to claim 18, wherein the first pleating plates and the second pleating plates define at least one gap for slidingly receiving the microwave interactive web.

20. The system according to claim 19, wherein a distance extending across and perpendicular to the gap is about the same as a thickness of the microwave interactive web.

21. The system according to claim 19, wherein the gap defines an undulating shape.

22. The system according to claim 18, wherein the first pleating plates are female pleating plates, and the second pleating plates are male pleating plates.

23. The system according to claim 18, wherein the forming tool extends through a central opening in the die plate and the anvil when the forming tool extends at least partially into the cavity of the container.

* * * * *